United States Patent [19]

Hamada et al.

[11] Patent Number: 4,922,279
[45] Date of Patent: May 1, 1990

[54] AUTOMATIC FOCUS ADJUSTING APPARATUS

[75] Inventors: Masataka Hamada, Minamikawachi; Tokuji Ishida, Osaka; Yasuaki Akada, Sakai, all of Japan

[73] Assignee: Minolta Camera Kabushiki Kaisha, Osaka, Japan

[21] Appl. No.: 367,979

[22] Filed: Jun. 19, 1989

Related U.S. Application Data

[60] Division of Ser. No. 186,882, Apr. 27, 1988, which is a continuation of Ser. No. 819,865, Jan. 16, 1986, abandoned.

[30] Foreign Application Priority Data

Jan. 14, 1985 [JP] Japan ................................. 60-11250
Jan. 17, 1985 [JP] Japan ................................. 60-7179

[51] Int. Cl.$^5$ ............................................. G03B 3/00
[52] U.S. Cl. .................................. 354/400; 354/195.1
[58] Field of Search .............. 354/400, 401, 402, 195.1

[56] References Cited

U.S. PATENT DOCUMENTS

| | | | |
|---|---|---|---|
| 4,348,089 | 9/1982 | Shenk | 354/401 |
| 4,359,276 | 11/1982 | Tomori | 354/400 |
| 4,387,975 | 6/1983 | Araki . | |
| 4,445,761 | 5/1984 | Ishikawa et al. . | |
| 4,477,167 | 10/1984 | Ishikawa et al. . | |
| 4,477,169 | 10/1984 | Terui et al. | 354/402 |
| 4,482,234 | 11/1984 | Takagi et al. | 354/402 |
| 4,492,448 | 1/1985 | Ishikawa et al. . | |
| 4,509,842 | 4/1985 | Taniguchi et al. . | |
| 4,525,053 | 6/1985 | Sniokama et al. | 354/400 |
| 4,536,072 | 8/1985 | Taniguchi et al. . | |
| 4,825,238 | 4/1989 | Akashi | 354/402 |

Primary Examiner—Russell E. Adams
Attorney, Agent, or Firm—Price, Gess & Ubell

[57] ABSTRACT

An automatic focus adjusting apparatus for adjusting automatically a focus condition of an objective lens includes a CCD array for receiving light from an object and producing a accumulated charge signal representing the accumulated charge. Using the accumulated charge signal it is detected whether or not the brightness of the object is above a predetermined level, and at the same time, the focusing condition of the objective lens is calculated. Using the calculated result, the focusing condition of the objective lens is adjusted in a controlled manner such that: when the brightness of the object is above the predetermined level, the objective lens moves even during the CCD array is operated to carry out the charge accumulation; but when the brightness of the object is below the predetermined level, the CCD array is operated only during when the objective lens is making no movement.

2 Claims, 20 Drawing Sheets

Fig. 10a
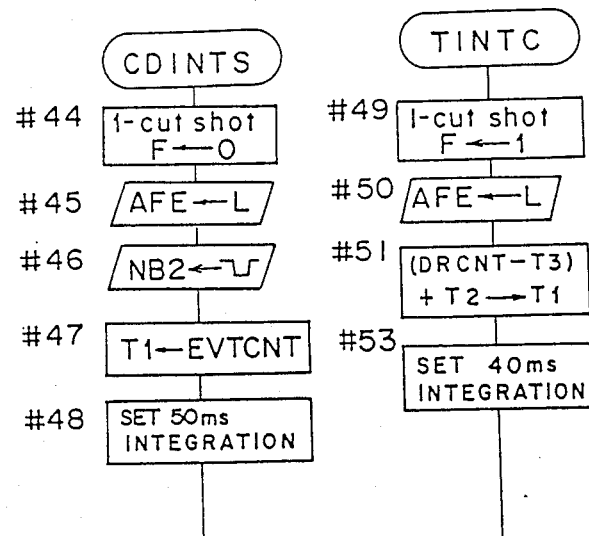
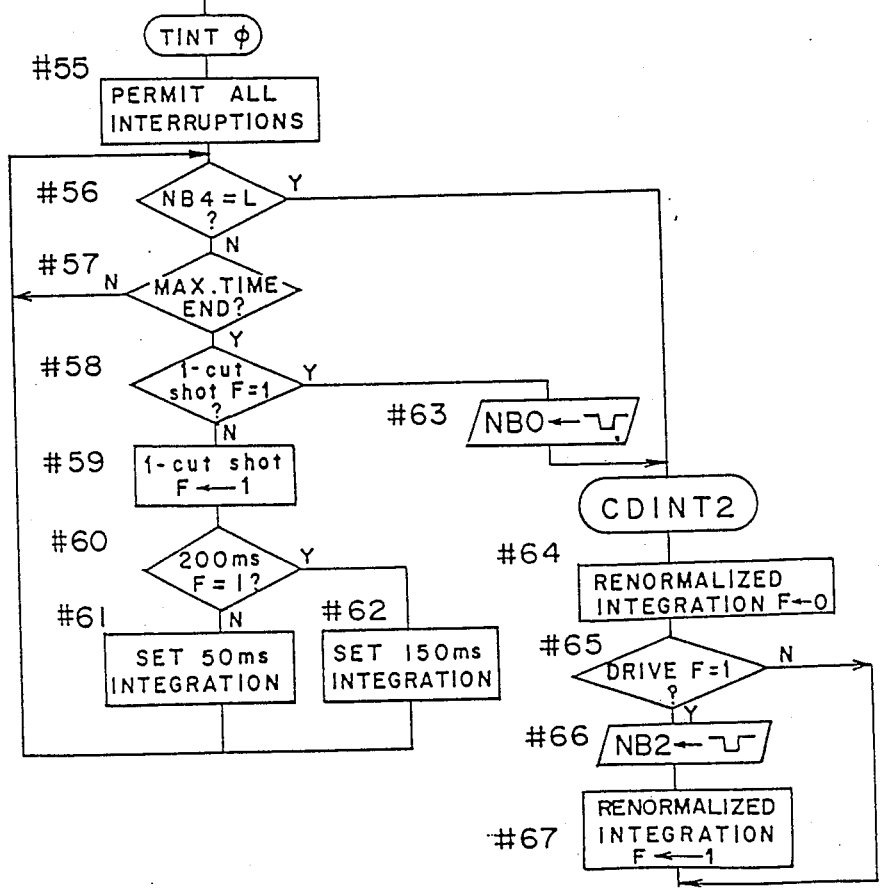
Fig. 10

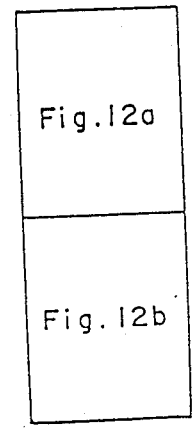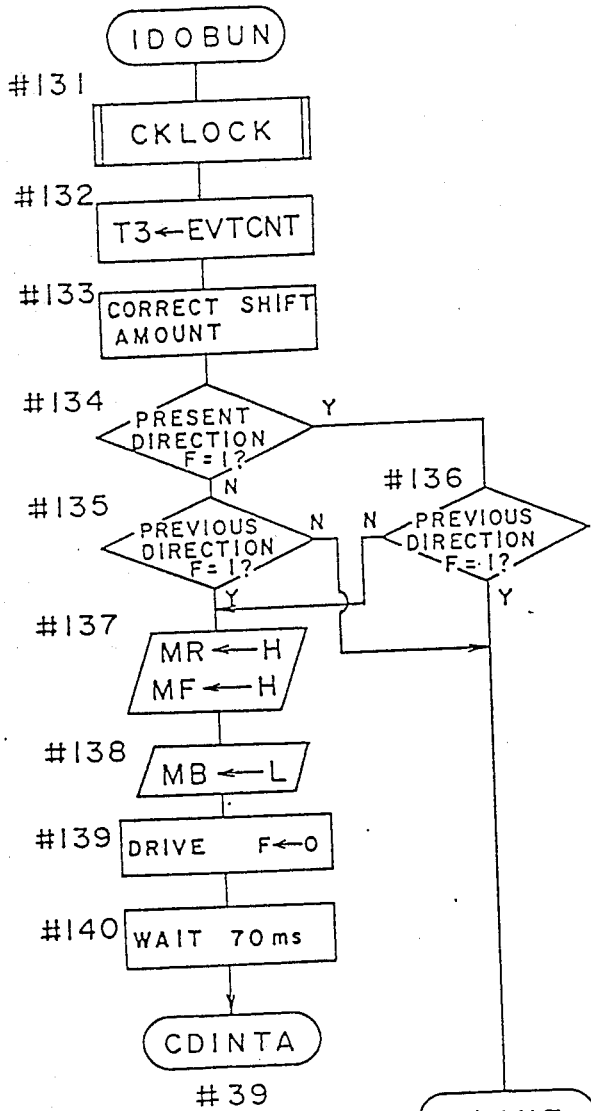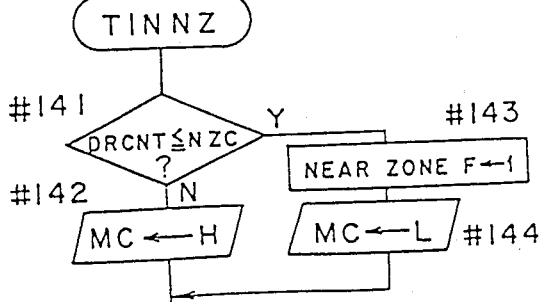
Fig. 12a
Fig. 12

| Fig. 14a |
| Fig. 14b |

AUTOMATIC FOCUS ADJUSTING APPARATUS

This is a division of application Ser. No. 186,882, filed Apr. 27, 1988, which is a continuation of abandoned U.S. Ser. No. 819,865, filed Jan. 16, 1986, now abandoned.

BACKGROUND OF THE INVENTION

1. Field of the Invention

The present invention relates to a camera system and, more particularly, to an automatic focus control in response to the focus detection through an objective lens.

2. Description of the Prior Art

Conventionally, there has already been proposed a focus detection device which is so arranged that two images are formed by again bringing into focus, light bundles respectively having passed through corresponding first and second regions of an objective lens which are in a symmetrical relation with respect to an optical axis of said objective lens, and by finding the mutual positional relation of these two images, a degree of out of focus at the image forming position with respect to a predetermined focal plane and a direction thereof (whether the image forming position is at the front side or at the rear side of the predetermined focal plane, i.e., the focusing is in a front-focus or rear-focus) are to be obtained.

The optical system of the focus detection device as referred to above has a construction as shown in FIG. 19, which generally includes a condenser lens 6 disposed in a predetermined focal plane 4 behind an objective lens 2 or in a position further behind the focal plane 4, and re-focusing lenses 8 and 10 provided behind the condenser lens 6, while line sensor having, for example, CCD (charge coupled device) as light receiving device is disposed on the focusing planes of said respective re-focusing lenses 8 and 10 as at 12. The images formed on the line sensor approach the optical axis 14 so as to come close to each other in the case of the so-called front-focus condition in which the image of an object to be brought into focus is formed at a position before the predetermined focal plane 4, while on the contrary, they are respectively spaced away from the optical axis 14 in the case of the rear-focus condition. When the images are brought into focus, the interval between the corresponding two points of the two images reaches a specific distance as defined by the construction of the optical system for the focus detection device. Accordingly, in terms of principle, the state of focusing is to be found through detection of the interval between the two images.

In the focus detection device as described above, however, in the case where the focus detecting functions are repeatedly effected by a plurality of times with respect to the same object to be photographed at a predetermined distance, if the object to be photographed is altered in its position within a plane perpendicular to the direction for detecting the distance or the camera is subjected to a minor vibration due to wobbling or shaking during holding thereof, the results of detection are not necessarily coincident, thus being distributed through a slight scattering with respect to a certain value. In other words, there has been such a disadvantage that an accurate focus detecting information can not be obtained based on the detecting function only by one time.

Besides the scattering arising from the non-uniformity in the characteristics and arrangement of respective elements in a light receiving device composed of a large number of light receiving elements, and also, arising from instability of processing circuits, the scattering as referred to above may be attributable to the fact that in a measurement of illumination distribution (equivalent to the distribution of brightness for the object to be photographed) on the light receiving surface, spatial frequency characteristics possessed by the light receiving elements are determined by the pitch of the group of elements arranged in the array, thus it being made impossible to effect correct measurements with respect to the frequency component higher than the spatial frequency to be determined by the Nyquist sampling law, or such scattering may be ascribed to the fact that since the brightness distribution of the object to be photographed is discontinuously measured by the presence of insensitive regions between the elements, it is impossible to detect any possible brightness variation in such insensitive regions.

Accordingly, if the object to be photographed is altered in its position in a plane perpendicular to the detecting direction, the pattern of the image of the object projected onto the light receiving surface is altered, with a relative alteration of the sampling Position of the object image on the light receiving array, thus giving rise to such a phenomenon that the results of detection are not coincident by the above causes in the elements, and therefore, if similar measurements are repeated, the detection results are distributed through a slight scattering with respect to a certain value. Accordingly, even if the objective lens is adjusted for the focusing based on a defocus amount to be obtained in one detecting function, accuracy for the adjustment can not be guaranteed.

Such being the case, there has been proposed in Japanese Patent Laid-Open Application (Tokkaisho) No. 56-78811, a device which is so arranged that detection of focus condition is effected by a plurality of times to obtain data for a plurality of defocus amounts, thereby to obtain an average value thereof, and the focus adjustment of the objective lens is effected based on said average value. However, in the known device as described above, a quick focus adjustment can not be effected, since the arrangement is so made that the detecting function is repeated, with the objective lens being held stationary so as to start driving of the objective lens after the average value has been obtained.

Therefore, there has also been proposed U.S. Pat. Nos. 4,445,761 and 4,492,448 assigned to the same assignee as that in the present invention, a focus adjusting device which is so arranged that the focus detection is repeatedly effected during displacement of the objective lens towards the in-focus position, while the amount of displacement of the objective lens is detected through employment of an encoder in that case, and thus, the data for the respective defocus amounts taken at separate positions during the displacement of the objective lens are subjected to correction by the amount of displacement of the objective lens, thereby to convert the respective data into data which may be regarded as those taken, with one position set as a reference position so as to obtain the average value from the data after the conversion. In the above proposed device, the average value is calculated, with the same weight imparted to the respective data.

Meanwhile, in the case where a lens such as a telephoto lens with a long focal length, etc. in which the defocus amount can be increased, is to be employed, there may arise a region which is out of a range associated with the defocus amount detection of the focus detection device. In the region as described above, the focus detection device undesirably judges that the focus detection is impossible, since contrast of the object to be photographed is too low. In order to overcome the disadvantage as described above, there has further been proposed in Japanese Patent Laid-Open Application (Tokkaisho) No. 59-182441 also assigned to the same assignee as that of the present invention, a focus detection in which the case as referred to above, the lens is displaced by neglecting the defocus amount already obtained, to find out a position at high contrast, and if such a position has been found, the displacement of the objective lens is suspended for effecting a subsequent focus detection. In the above practice, however, the function is undesirable such that the lens is subjected to the scanning driving during low contrast, and upon finding a position at high contrast, the lens is necessarily stopped once and again displaced towards the in-focus position. In other words, in the above function, there is such a drawback that smooth and quick focus adjustment can not be effected at all times.

However, if an image sensor of a charge accumulation type such as CCD (charge coupled device) is employed for the focus detecting line sensor of an automatic focus control arrangement, the integrating time thereof becomes long as the brightness of the object is reduced. Accordingly, the lens displacing amount during the CCD integration varies to correspond to the brightness of the object, while owing to the fact that the image of the object to be photographed during the integration varies according to the brightness of the object, the error of the defocus amount itself as calculated is also altered. Meanwhile, if a practice for integrating the object image during displacement of the objective lens is adopted, the state is the same for the CCD as in the integration of a moving object even when the object remains stationary in the case where a long integrating time is required, and errors tend to be involved in the calculation of the defocus amount, with such a tendency being further increased if the object to be photographed is moving.

Moreover, in the conventional automatic focus control device, if the contrast of the object to be photographed is too low, there is such a disadvantage that the focus detection becomes impossible or detecting accuracy is extremely deteriorated.

More specifically, if the CCD integration is effected while the objective lens is being displaced when the object to be photographed is dark, the resultant accuracy of the defocus amount tends to be deteriorated, and there may possible arise such a case that the stopping position of the lens is not fixedly determined due to scattering of the results, thus requiring a long time until arrival at the in-focus condition. On the other hand, if the object to be photographed is bright, deterioration in the accuracy hardly takes place owing to a short integrating time, even when the CCD integration is effected, with the objective lens being displaced.

SUMMARY OF THE INVENTION

Accordingly, an essential object of the present invention is to provide an improved automatic focus control device which is capable of quickly effecting an automatic focus adjustment in an efficient manner, with simultaneous elimination of errors in the focus detection due to variation in brightness of an object to be photographed.

Another important object of the present invention is to provide an automatic focus control device of the above described type which is so arranged that focus detection under conditions as favorable as practicable is made possible even during a low contrast, and errors in the focus detection due to variation in the brightness of the object to be photographed is eliminated, whereby in the case where the object to be photographed is bright, smooth and quick automatic focus control is possible at high accuracy even when an objective lens such as a telephoto lens whose defocus amount tends to be large is employed, while even in the case where the object is dark, quick automatic focus detection may be effected without deterioration in the accuracy.

In accomplishing these and other objects, according to one aspect of the present invention, there is provided an automatic focus control device so arranged that focus adjusting state of the objective lens is calculated based on the accumulated charge transferred from a charge accumulation type image sensor which receives light from the object to be photographed so as to effect the focusing of said objective lens based on the result of the calculation, and characterized in that there are provided judging means for judging whether or not the brightness of the object to be photographed is above a predetermined value, and a control means for effecting the focusing according to the state of focus adjustment as computed after completion of the calculation, with said control means being so arranged that upon judgement that the brightness of the object is higher than the predetermined value, charge accumulation for the image sensor is effected even during focusing so as to effect focusing of the objective lens according to the latest focus adjusting state as calculated, and that upon judgement that the brightness of the object is lower than the predetermined value, the charge accumulation for the image sensor is effected only during stopping of the objective lens.

By the arrangement according to the present invention as described above, when the object to be photographed is bright, the focus detection is repeatedly effected during the displacement of the objective lens, while in the case where the object is dark, the focus detection is made, with the objective lens held stationary.

According to another aspect of the present invention, there is provided an automatic focus control device which is also arranged to calculate the focus adjusting state of the objective lens based on the accumulation type image sensor receiving light from the object to be photographed so as to effect the focusing of the objective lens based on the result of the calculation, and which includes a brightness judging means for judging whether or not the brightness of the object to be photographed is above a predetermined value, a contrast judging means for judging whether or not the contrast of the object to be photographed is above a predetermined value, and a control means for effecting accumulation of charge for the image sensor and the automatic focus adjustment, with said control means being so arranged that, upon judgement that the contrast is lower than the predetermined value, it displaces the objective lens to search for a position where the contrast is higher than the predetermined value, and when said position is found, the charge accumulation of the image sensor and the automatic focus control based thereon are effected, with the objective lens being moved, in the case where the brightness of the object is higher than the predetermined value, while the charge accumulation of the image sensor and the automatic focus control are effected, with the objective lens once stopped, in the case where the brightness of the object is lower than the predetermined value.

By the above arrangement of the present invention, when the brightness of the object is low, the objective lens is displaced to search for a position where contrast is high, and upon finding such a position at high contrast, the focus detection is repeatedly effected while the objective lens is being displaced in the case where the object is bright, while the focus detection is effected, with the objective lens stopped when the object is dark.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENT

Figure 1:
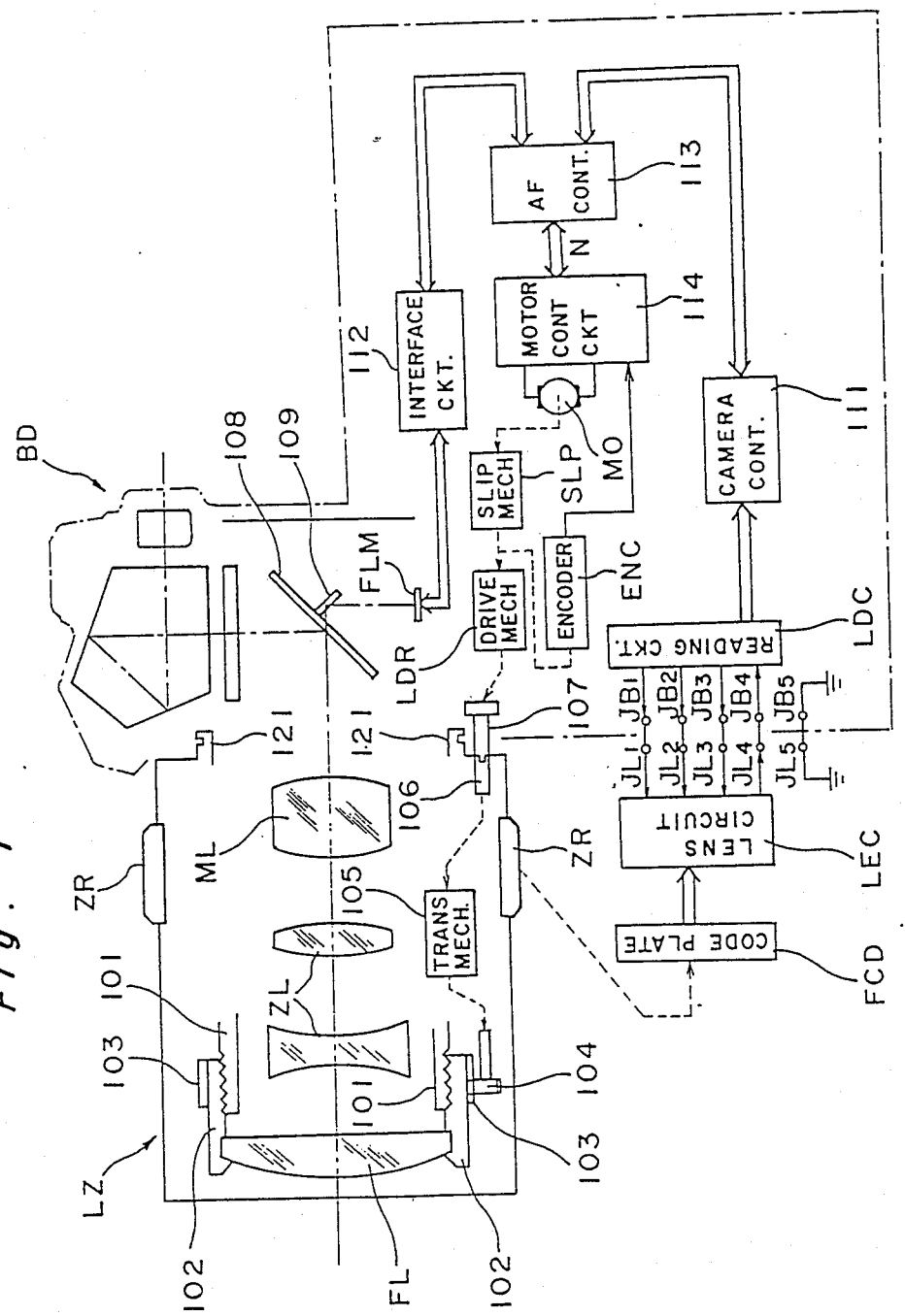
FIG. 1 is a block diagram of a camera system according to the present invention.

Referring to FIG. 1, a block diagram of a camera system having an auto-focus system according to the present invention is shown. In the drawing, parts shown on the left-hand side of a chain line belong to a zoom lens LZ, and parts shown on the right-hand side of the same belong to camera body BD. The zoom lens LZ is an interchangeable lens and is mounted on the camera body BD. The transmission of a driving force from body BD to lens LZ is effected by a clutch arrangement 106 and 107 and transmission of electric signals between body BD and lens LZ is effected by terminals JL1–JL5 and terminals JB1–JB5. According to the camera system shown, the light beams reflected or emitted from an object to be photographed path through focusing lens FL of the zoom lens LZ, zooming lens ZL, and master lens ML. The light beams further path through the central half-mirror portion of a reflection mirror 108 provided in the camera body BD, reflect on a sub-mirror 109, and impinges on a CCD image sensor FLM employed as a light receiving device for the focus detection.

An interface circuit 112 is provided for driving the CCD image sensor FLM incorporated in an in-focus detection module, for reading data of the object to be photographed from CCD image sensor FLM, and for sending the read data to an AF controller 113. Based on the signals from CCD image sensor FLM, AF controller 113 calculates and produces a defocus signal $|\Delta L|$ representing a degree of out of focus and a direction signal representing a direction of out of focus whether it is near focused or far focused. A motor MO is provided to be driven in accordance with these signals and its rotational force is transmitted to the zoom lens LZ through slip mechanism SLP, driving mechanism LDR and clutch 107 provided in the camera body. It is to be noted that slip mechanism SLP is provided to cut the transmission of rotational force to the driving mechanism thereby preventing motor MO from being overloaded such that slip mechanism SLP slips when a torque above a predetermined level is applied to a shaft after the slip mechanism SLP.

Zoom lens LZ shown has a focus adjustment member 102 for shifting focusing lens FL. Focus adjustment member 102 is formed with a female-helicoid thread on its inner surface which engages with a male-helicoid thread on the outer surface of a cylinder 101 provided integrally to lens mount 121. A large gear 103 is fixedly mounted on the peripheral outer surface of focus adjustment member 102. Large gear 103 is engaged to a small gear 104 which is connected through a transmission mechanism 105 to clutch 106 provided in the lens. By the above arrangement, the rotational force of motor MO is transmitted to focus adjustment member 102 through slip mechanism SLP in the camera body, clutch 107 in the camera body, clutch 106 in the lens, transmission mechanism 105 in the lens, small gear 104 and large gear 103. Then, by the engagement between the male- and female-helicoid threads, focusing lens FL is shifted in the optical axis direction, thereby effecting the focus adjustment. Also, in order to monitor the amount of shift of focusing lens FL, an encoder ENC is coupled to the driving mechanism in the camera body BD such that encoder ENC produces a train of pulses with its number corresponding the the amount of shift of the lens FL.

When terms are defined as follows:
NM (rot): the number of rotation of motor MO;
N: the number of pulses from encoder ENC;
$\rho$(1/rot): resolving power of encoder ENC;
$\mu$P: rate of speed reduction in the mechanical transmission arrangement between the shaft of motor MO and the shaft of encoder ENC;
$\mu$B: rate of speed reduction in mechanical transmission arrangement between the shaft of motor MO and clutch 107 of the camera body;
$\mu$L: rate of speed reduction in mechanical transmission arrangement between clutch 106 of the lens and large gear 103;
LH (mm/rot): a helicoid lead of the focus adjustment member 102; and
$\Delta$d (mm): amount of shift of the focusing lens FL, following relationships are obtained.

$$N = \rho \cdot \mu P \cdot NM$$

$$\Delta d = NM \cdot \mu B \cdot \mu L \cdot LH$$

Thus, $$\Delta d = N \cdot \mu B \cdot \mu L \cdot LH / (p \cdot \mu P). \quad (1)$$

Also, when a relation between the above given $\Delta d$ and $\Delta L$ (mm) representing the amount of shift of the image forming plane when the lens is shifted $\Delta d$ (mm) is defined as:

$$Kop = \Delta d / \Delta L, \quad (2)$$

a following equation (3) is obtained using equations (1) and (2).

$$N = Kop \cdot \Delta L \cdot p \cdot \mu P / (\mu B \cdot L \cdot LH) \quad (3)$$

When terms are defined as:

$$KL = Kop / (\mu L \cdot LH) \quad (4)$$

and $$KB = p \cdot \mu P / \mu B, \quad (5)$$

a following equation (6) is obtained.

$$N = KB \cdot KL \cdot \Delta L \quad (6)$$

In the equation (6) given above, $\Delta L$ is obtained as a signal produced from AF controller 113 for indicating amount of defocus and direction thereof. Furthermore, the term KL in equation (4) corresponds to the focal length of the zoom lens as set by the rotational operation of a zooming ring ZR, and is produced from a lens circuit LEC. In other words, a code plate FCD produces data representing the rotated position of zooming ring ZR, and the produced data are applied to lens circuit LEC. In lens circuit LEC, the received data are used for designating an address at which data KL is stored. Data KL are read out serially bit-by-bit and are supplied to a reading circuit LDC in the camera body. Code plate FCD is arranged in a predetermined code pattern so as to produce data corresponding to the rotated position of zooming ring ZR. The lens circuit LEC includes a memory, such as a ROM, in which various data KL corresponding to various focal length set by zooming ring ZR are stored at different addresses determined by code plate FCD.

Moreover, the term KB in equation (5) is a data determined by the rate of speed reduction $\mu B$ within the camera body, and is stored in a camera controller 111.

From reading circuit LDC of the camera body to lens circuit LEC of the lens, electric power is supplied through terminals JB1 and JL1, synchronizing clock pulses are applied through terminals JB2 and JL2, and a read-start signal is applied through terminals JB3 and JL3. Also, from lens circuit LEC to reading circuit LDC, data KL are transmitted in series through terminals JL4 and LB4. Now, terminals JB5 and JL5 are connected with each other as a common ground.

Therefore, when the read-start signal is applied, lens circuit LEC produces bit-by-bit the data KL corresponding to the focal length set by the zooming ring in a synchronized manner with the clock pulses. And, the produced data KL are applied serially through terminals JL4 and JB4 to reading circuit LDC in which the data KL are aligned parallelly.

Camera controller 111 receives data KL from reading circuit LDC and calculates:

$$KB \cdot KL = K$$

in which data KB is stored in camera controller 111. AF controller 113 calculates the defocus amount $|\Delta L|$ using the data of the object transmitted from interface circuit 112, and further calculates:

$$K \cdot |\Delta L| = N$$

using the defocus amount $|\Delta L|$, just obtained, and the data K from camera controller 111, thereby calculating the number N of pulses to be detected by encoder ENC. A motor control circuit 114 drives motor MO in a clockwise or counterclockwise direction depending on the direction signal, calculated from the data of the object, obtained from AF controller 113. The amount of rotation of motor MO is controlled by the data N obtained from AF controller 113 and the pulses obtained from the encoder ENC, such that motor MO stops when N pulses are produced from encoder ENC. When this is done, focusing lens FL is shifted a distance $\Delta d$ towards an in-focus position.

According to the above description, the data K is obtained by multiplying the data KL, from the lens circuit, by the data KB which is intrinsic to each type of camera body and is stored as a fixed data in the camera body. Instead of the above steps, the data K can be obtained through other methods.

For example, in the case where a zoom lens LZ, which can be matched to different types of camera body having different values for the data KB, is prepared, such a zoom lens LZ should have a lens circuit LEC that produces data $$K1 = KL \times KB1$$

which corresponds to a particular camera body having a particular value for the data KB, in response to the setting of the focal length. In this particular camera body, data KB stored in camera controller 111 and the calculation $KL \times KB$ as carried out in camera controller 111 are not necessary. Instead, data K1 from reading circuit LDC is applied to AF controller 113.

When the above-mentioned zoom lens LZ is mounted on another particular camera body having data KB2 ($\neq$KB1), camera controller 111 carries data KB2/KB1 so as to calculate:

$$K2 = K1 \times KB2 / KB1 = KL \times KB2$$

in camera controller 111, thereby obtaining a wanted data $KL \times KB2$.

For the zoom lens having a focusing system in which focusing lens FL is disposed in front of zooming lens ZL, i.e., for the zoom lens of front lens shifting type, the above given amount Kop can be expressed as follows:

$$Kop = f1^2 / f^2, \quad (7)$$

wherein f1 is a focal length of focusing lens FL. Thus, one zoom lens has a wide variation of a value KL. To memorize a wide variation of a value KL, the data of each value KL are defined by bits representing the significant digits and bits representing the floating point coefficient. For example, if the data is 8-bit long, the upper four bits may be used as a part for designating the floating point coefficient, and the lower four bits may be used as a part for designating the significant digits. In the preferred embodiment shown in FIG. 1, the lower four bits of the data received from reading circuit LDC of the camera body is shifted to change its floating point in accordance with the data of the floating point coefficient. With this arrangement, the value of the data KL or K can be selected from a wide variation without using a large capacity of a memory unit.

In the description given above in connection with FIG. 1, a camera system having an auto-focus system according to the present invention is described from the view point of a hardwares, using a block diagram, so as to facilitate the understanding of function and operation of the system, but according to a preferred embodiment, various functions of the circuits are accomplished by microcomputers as will be described below.

Figure 2:
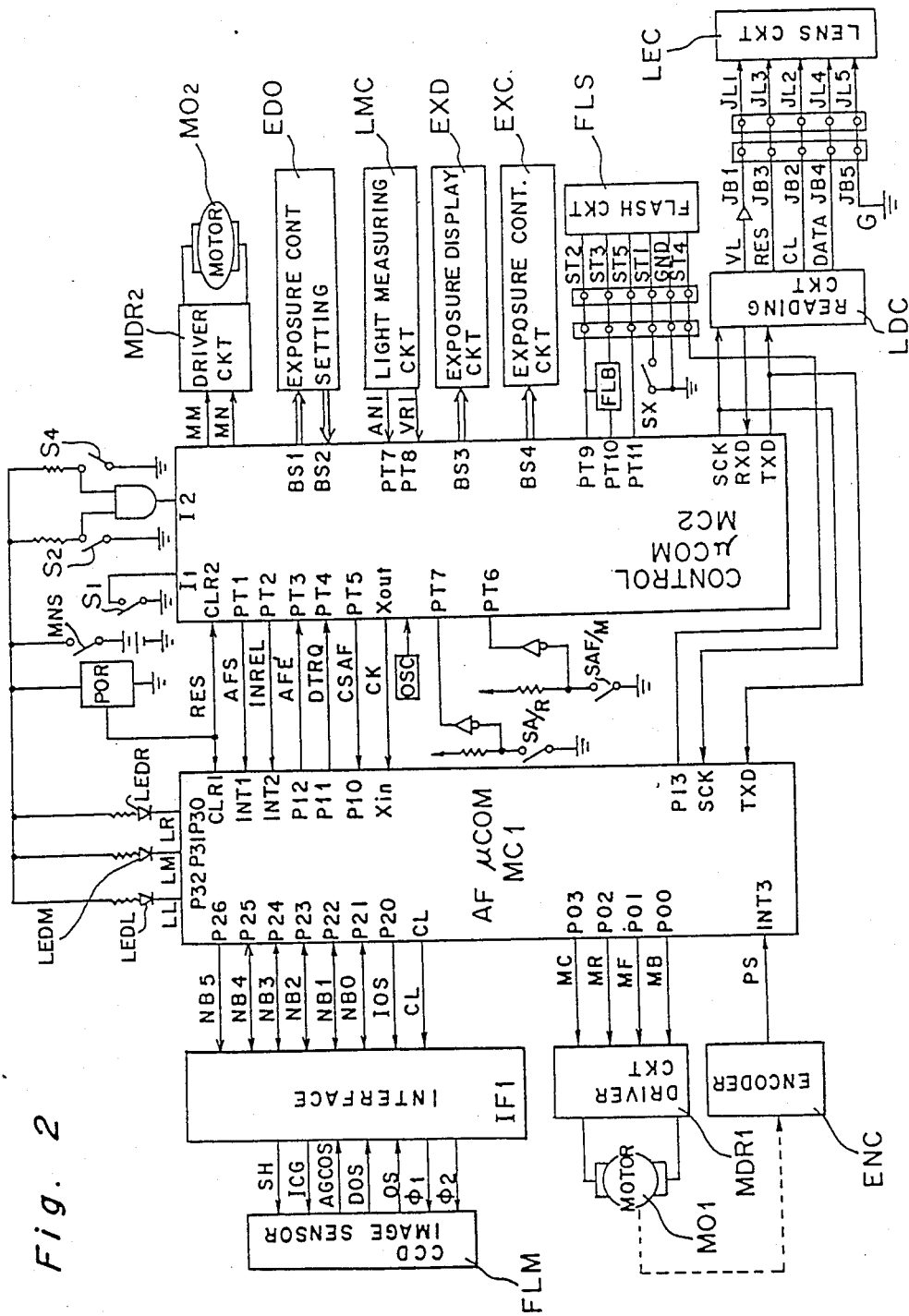
FIG. 2 is a circuit diagram of a camera system according to the present invention.

Referring to FIG. 2, a block diagram of a circuit provided in the camera body is shown, together with a block diagram of a lens circuit provided in an interchangeable lens and a flash circuit provided in a flash light device.

When a power switch MNS turns on, an electric power is supplied through a power line to a power-on reset circuit POR, which is provided for resetting microcomputers MC1 and MC2. A switch S1 is a normally-open switch and it closes when a shutter release button (not shown) is depressed halfway. When switch S1 closes, the operations of light measuring and automatic focus adjustment start. A switch S2 is a normally-open switch, and it closes when the shutter button is depressed all the way. When switch S2 closes, the exposure operation starts. A switch S4 closes when the film winding is completed to advance the film by one frame.

Microcomputer MC2 is provided to operate as camera controller 111 shown in FIG. 1; it governs the sequence of the overall operation of the camera system, and therefore, it is referred to as a control microcomputer. The control microcomputer has a terminal I1 connected to switch S1 and a terminal I2 connected, through an AND gate, to switches S2 and S4. An oscillator OSC is also connected for providing clock pulses.

Microcomputer MC1 is provided to operate as AF controller 113 shown in FIG. 1; it sequentially carry out the automatic focus adjustment, and therefore, it is referred to as an AF microcomputer. The calculated result representing the focusing condition is displayed in a viewfinder by the generation of light from either one of light emitting diodes LEDL, LEDM and LEDR.

A switch SAF/M is a mode selecting switch. When switch SAF/M is turned on, an automatic focusing adjustment mode (AF mode) is selected. When it is turned off, a manual focusing adjustment mode (non-AF mode) is selected. An SAF/M signal representing either AF mode or non-AF mode is applied to control microcomputer MC2 at terminal PT6. The non-AF mode has two sub-modes: an FA mode in which the focusing condition is displayed through the viewfinder, but the lens must be moved manually; and a MANUAL mode in which a display of the focusing condition is not even available.

A switch SA/R is also a mode selecting switch for selecting a desired sequence of operations of auto-focusing and shutter release. When switch SA/R is turned on, an AF priority mode is selected. Under the AF priority mode, the shutter release is effected only after the completion of the auto-focusing operation. When switch SA/R is turned off, a release priority mode is selected. Under this mode, the shutter release is effected immediately in response to the turn on of switch S2 even when the auto-focusing operation is incomplete. An SA/R signal representing either AF priority mode or release priority mode is applied to control microcomputer MC2 at terminal PT7.

A driver circuit MDR2 is provided for driving a motor MO2 which winds or rewinds the film. By the combination of signals MM and MN applied to driver circuit MDR2 from control microcomputer MC2, the direction and amount of rotation of motor MO2 are controlled in a manner indicated in Table 1 below.

TABLE 1

| Signal MM | Signal MN | Operation of Motor MO2 |
| --- | --- | --- |
| 0 | 1 | Clockwise |
| 1 | 0 | Counterclockwise |
| 0 | 0 | Brake effect |
| 1 | 1 | OFF |

An exposure control setting circuit EDO is provided for transmitting to control microcomputer MC2 a signal representing a mode manually selected from various exposure control modes, such as program mode, shutter speed priority mode, aperture size priority mode and manual mode. Furthermore, exposure control setting circuit EDO transmits to control microcomputer MC2 data necessary to carry out the exposure control for the selected mode, such as shutter speed, aperture size, film speed, exposure compensation value, etc. The data are transmitted through data lines BS1 and BS2.

A light measuring circuit LMC produces an ANI signal which indicates a reference voltage for the analog-to-digital conversion, and also a VRI signal which represents the measured light signal. Signals ANI and VRI are applied to control microcomputer MC2 through terminals PT7 and PT8, respectively.

An exposure display circuit EXD is provided for displaying the exposure data, such as shutter speed and aperture value, calculated in control microcomputer MC2. The data to exposure display circuit EXD are transmitted through data line BS3. An exposure control circuit EXC carries out the exposure control in accordance with the exposure values (shutter speed value, aperture size value, etc.) as set or calculated in control microcomputer MC2. The data to exposure control circuit EXC are transmitted through data line BS4.

A flash circuit FLS is provided in an electronic flash light device. When the electronic flash light device (not shown) is mounted on the camera body at the accessory shoe, terminals ST1, ST2, ST3, ST4, ST5 and GND are connected to corresponding terminals for the circuit in the camera body. A detail of flash circuit FLS will be described below in connection with FIG. 3.

Figure 3:
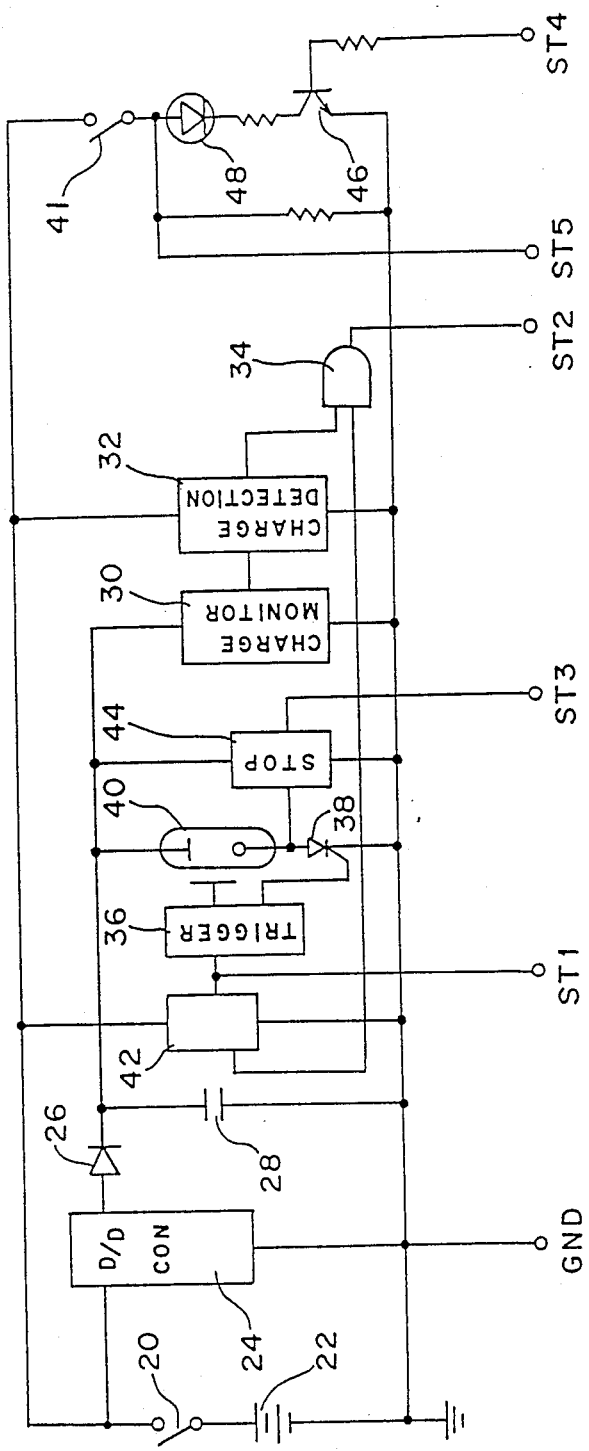
FIG. 3 is a circuit diagram of a flash circuit shown in FIG. 2.

Referring to FIG. 3, flash circuit FLS includes a main switch 20 connected to a power source 22. When main switch 20 closes, the voltage from power source 22 is raised by a DC/DC converter 24. A high voltage produced from DC/DC converter 24 is applied through a diode 26 to a main capacitor 28. A terminal GND is a ground terminal. A voltage charged across main capacitor 28 is monitored by a charge monitor circuit 30 which is coupled to a charge detection circuit 32. When charge monitor circuit 30 indicates that the voltage across main capacitor 28 has reached a predetermined level, charge detection circuit 32 produces a charge completion signal which is transmitted through AND gate 34 to terminal ST2, and further to a camera side. In the camera side, the charge completion signal permits to generate an emission start signal, which is applied through terminal ST1 to a trigger circuit 36. In response to the emission start signal, trigger circuit 36 is so triggered as to conduct a thyristor SCR 38, thereby emitting light from a xenon tube 40 by the power supply from main capacitor 28. The emission start signal is also applied to an emission start monitor 42 which, upon receipt of the emission start signal, provides a low level signal to an AND gate 34. Thus, AND gate 34 is disabled to prevent the further supply of charge completion signal from to terminal ST2. When it is detected by light measuring circuit LMC in the camera side that an appropriate amount of light is exposed, an emission stop signal is transmitted from the camera side to terminal ST3. Upon receipt of the emission stop signal, an emission stop circuit 44 stops the light emission by the xenon tube 40.

A switch 41 is a normally open switch which closes by an external force, such as when manually operated, or when an electronic flash device is mounted on the camera body. When switch 41 closes, a HIGH level signal (OK signal) is transmitted from battery 22 through switches 20 and 41 to terminal ST5 and further to the camera side, indicating that an auxiliary light for the auto-focus detection can be emitted. Then, when it is detected in the camera side that the object to be photographed is so dark that the auxiliary light is necessary to properly carry out the auto-focus detection, an auxiliary light emission signal is transmitted from the camera side to terminal ST4, thereby turning transistor 46 on. Thus, a light emitting diode 48 conducts to emit the auxiliary light toward the object to be photographed.

Referring back to FIG. 2, a reference character Sx is a synchronizing switch of the camera, and FLB is a light emission control circuit for controlling the time period for emitting the flash light from the xenon tube. Reference characters LEC and LDC are, respectively, the lens circuit provided in the lens and the reading circuit provided in the camera body. When the lens is mounted on the camera body, both circuits LEC and LDC are connected through terminals JB1–JB5 and terminals JL1–JL5. In FIG. 2, VL represents an electric power; RES represents a read start signal; CL represents clock pulses; DATA represents data; and G represents a ground. Reading circuit LDC receives clock pulses from terminal SCK of control microcomputer MC2, and in response to the serial data produced from terminal TXD of microcomputer MC2, circuit LDC outputs lens data serially to terminal RXD.

A reference character FLM designates the CCD image sensor shown in FIG. 1; IF1 designates an interface circuit for driving the CCD image sensor; MDR1 designates the driver circuit for driving the lens motor MO1 and it corresponds to circuit 114 shown in FIG. 1; and ENC designates an encoder which is the same as that shown in FIG. 1.

Figure 4:
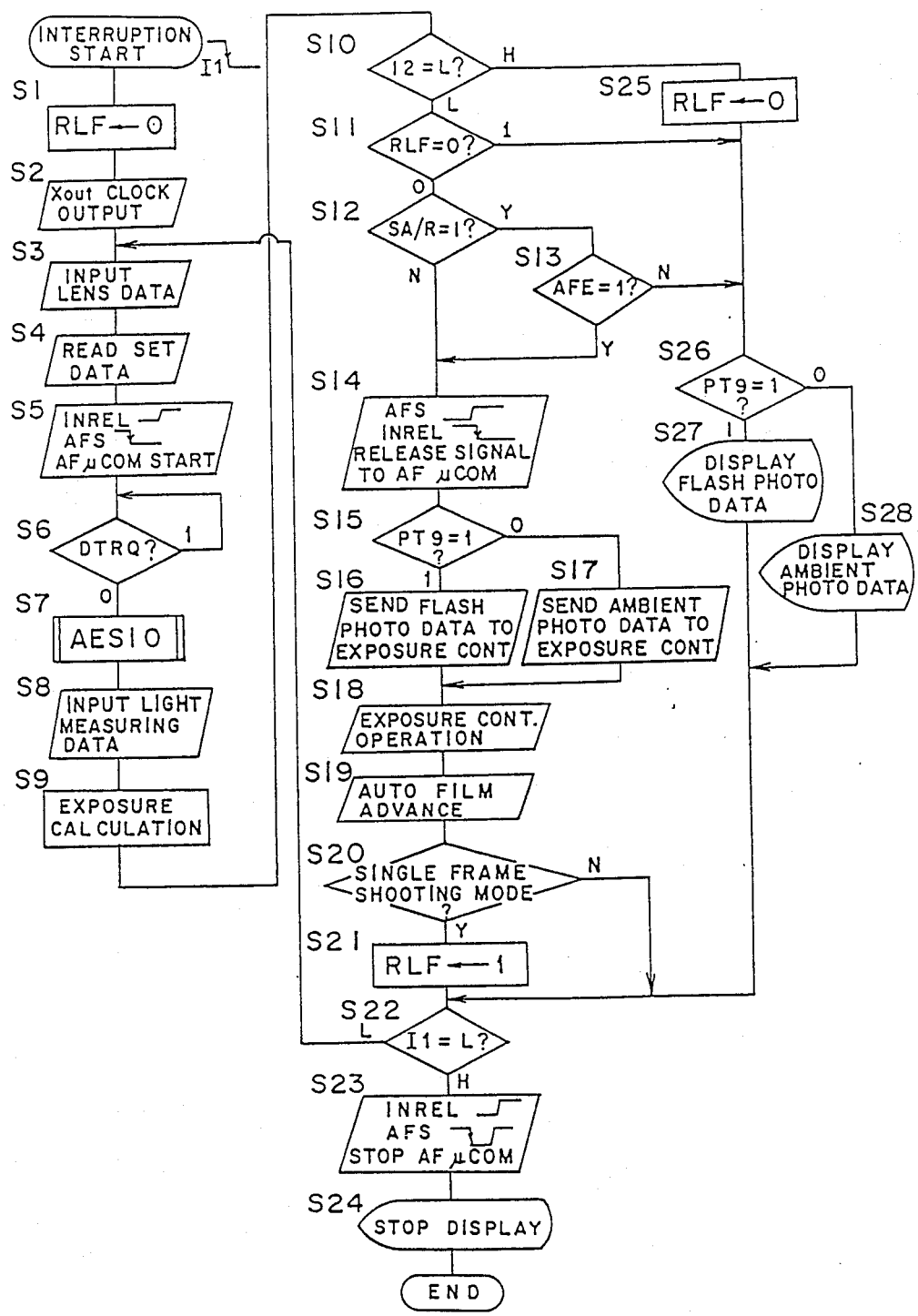
FIGS. 4 and 5 is a flow chart showing an operation of the control microcomputer shown in FIG. 2.
Figure 5:
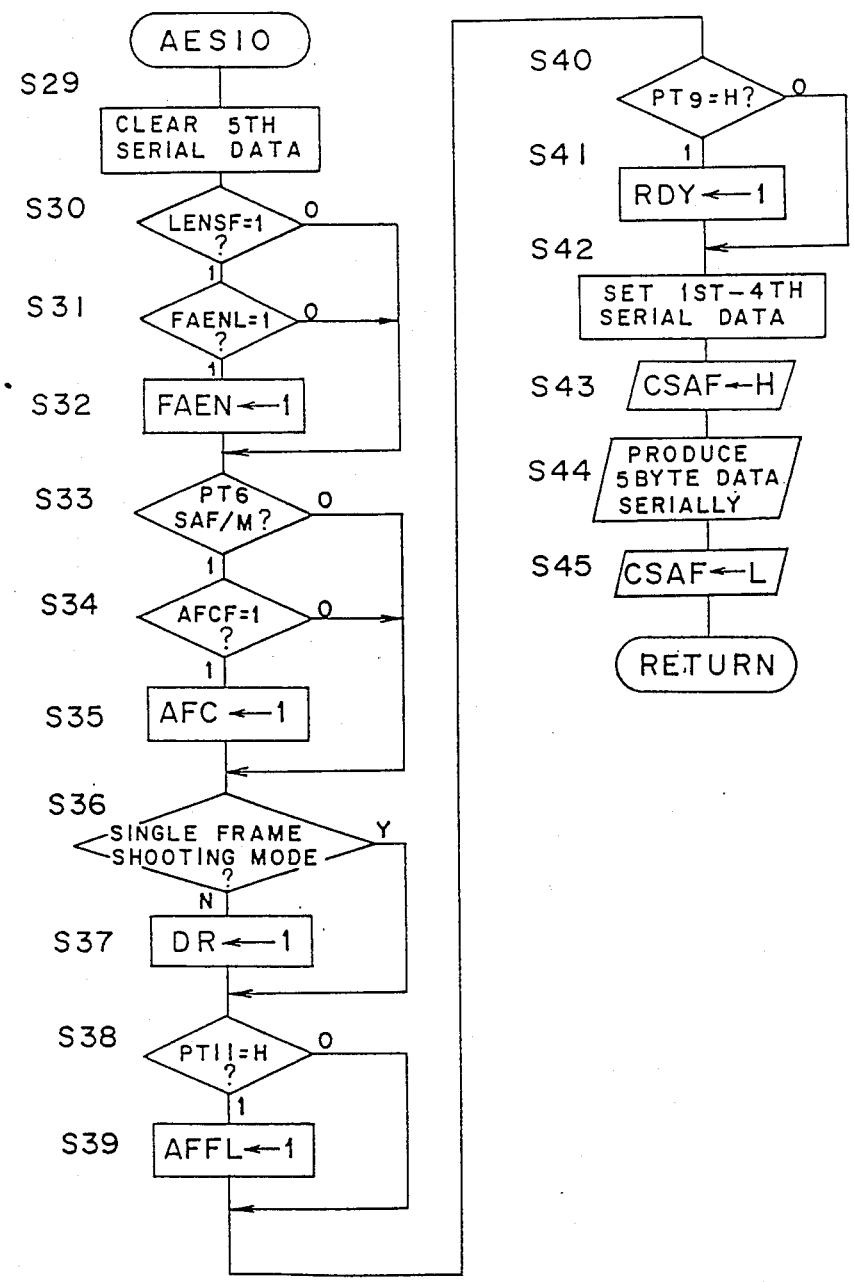

FIGS. 4 and 5 are flow charts showing operations carried out in microcomputer MC2 of FIG. 2. Before the description proceeds to the steps of the flow charts of FIGS. 4 and 5, the names and the meanings of the flags used in the present embodiment will be given in Tables 2 and 3 below.

TABLE 2

(Flags used in microcomputer MC2)

| Name | Meaning 0 | 1 | Comments |
|---|---|---|---|
| LENSF | No lens | With Lens | Presence and absence of the lens is detected by the data from lens circuit LEC |
| FAENL | Focus detection impossible | Focus detection possible | Focus detection type lens or not is detected by the data from lens circuit LEC |
| AFCF | No axle | With axle | Presence and absence of a coupling axle for AF operation is detected by the data from lens circuit LEC |
| RLF | Release possible | Release impossible | A flag sets "1" when shutter is released, under the single frame shooting mode |

TABLE 3

(Flags used in microcomputers MC2 and MC1 for the data to be transferred from MC2 to MC1)

| Name | Meaning 0 | 1 | Comments |
|---|---|---|---|
| AFFL | No auxiliary light | Auxiliary light ready | The detection is done by the condition of switch 41 |
| RDY | Charge incomplete | Charge complete | Main capacitor for the flash is charged or not |
| DR | Single frame shooting mode | Sequence shooting mode | Whether the mode is the single frame shooting or sequence shooting mode |
| AFC | No coupler | With coupler | The lens has the AF coupler and, at the same time, the switch is turned to AF |
| FAEN | Focus detection possible | Focus detection impossible | The mounted lens is a type which can detect the focusing condition, or not |

Now, the flow chart of FIG. 4 will be described. When switch S1 (FIG. 2) turns on, terminal I1 receives a signal which initiates the interruption procedure shown in FIG. 4, thereby starting the operation of control microcomputer MC2. At step S1, release flag RLF is cleared. Flag RLF will be used to distinguish between the single frame shooting mode in which one frame is taken by one full depression of the shutter release button (i.e., turn on of switch S2) and the sequence shooting mode in which photographies are sequentially taken in a plurality of frames while the shutter release button is depressed (i.e., the switch S2 is maintained on). Then, at step S2, clock pulses are supplied from terminal Xout of microcomputer MC2 to AF microcomputer MC1 for driving the AF microcomputer MC1. At step S3, a serial input/output operation is carried out for a plurality of times so as to read a plurality of data from lens circuit LEC. Then, a plurality of data are stored in the memory area of control microcomputer MC2, such data are: a conversion coefficient data KROM necessary for adjusting the auto-focusing; a data ΔIR for correcting the difference in the focusing condition between the detection using the near infrared light and the detection using the visible rays; a backlash data BKLSH; a fully opened aperture value data AFAV0 for the auto-focusing operation for detecting whether or not the focus detection calculate is possible for use in AF mode or in FA mode; a data LENSF indicating whether or not the lens is properly mounted; a data AFCF indicating whether or not the coupling axle for the auto-focus operation is present; and a data FAENL indicating whether focusing condition of the mounted lens can be detected or not. At step S4, data are read from exposure control setting circuit EDO which produces data for setting exposure control and data indicating the single frame shooting mode or sequence shooting mode. At step S5, the AFS signal produced from terminal PT1 of microcomputer MC2 is made LOW. The AFS signal is applied to an interruption terminal INT1 of AF microcomputer MC1. By the step down of the AFS signal, AF microcomputer MC1 starts its operation. At the same time as the above, the INREL signal produced from terminal PT2 is made HIGH, which is applied to terminal INT2 of AF microcomputer MC1. Since the interruption procedure starts in response to a LOW level signal, no interruption procedure will start by the change of INREL signal to HIGH.

In the flow chart of FIG. 4, there will be a case when the program is looped from step S5 to S10, and from step S22 to S3. When the program proceeds in the loop, step S5 is effected for a number of times, effecting the step up of INREL signal and step down of AFS signal repeatedly. However, since AFS signal is already at LOW and INREL signal is already at HIGH, no interruption procedure of microcomputer MC1 will start at step S5 during the looped procedure. When microcomputer MC1 starts, it first receives various set data from microcomputer MC2 and serial data from the lens. In a synchronized manner with the clock pulses, 5 byte data, each 8-bit long, are serially read out from terminal TXD of microcomputer MC2 and are applied to terminal TXD of microcomputer MC1 and are stored in a RAM. The meaning of the each data is described herein below in connection with Table 4.

TABLE 4
(Serial data transmitted from MC2 to MC1)

| 1 | AFAV0 | (fully opened aperture value data for use in AF adjustment) | | | | | | |
|---|---|---|---|---|---|---|---|---|
| 2 | KROM | (a conversion coefficient data for driving a lens) | | | | | | |
| 3 | ΔIR | (data for correcting the difference in the focusing condition between the detection using near infrared light and that using visible light) | | | | | | |
| 4 | BKLSH | (backlash data) | | | | | | |
| 5 | data | AFFL | RDY | DR | AFCF | FAEN | / | / | / |
| | bit No | B7 | B6 | B5 | B4 | B3 | B2 | B1 | B0 |

When AF microcomputer MC1 provides from its terminal P11 a DTRQ signal to terminal PT4 of control microcomputer MC2, control microcomputer MC2 starts to produce data. At step S6 of microcomputer MC2, it is waited until the DTRQ signal becomes LOW. When it becomes LOW, the program goes to step S7 for sending data, as effected by a subroutine AESIO, a detail of which is shown in FIG. 5. Briefly, in subroutine AESIO, data necessary for detecting the operation mode of the microcomputer is built and sent serially.

Referring to FIG. 5, the subroutine AESIO in microcomputer MC2 starts from step S29 at which the area of the RAM stored with the fifth byte data (AFFL, RDY, DR, AFCF and FAEN) is cleared. At steps S30, S31 and S32, flag FAEN is determined. More specifically, at step S30, if the LENSF signal obtained from lens circuit LEC is carrying "0" indicating that no lens is mounted, the program goes to step S33 with the flag FAEN maintained "0". If the LENSF signal is carrying "1", indicating that the lens is mounted, it is further detected (step S31) whether or not the signal FAENL is carrying "1". If signal FAENL is carrying "1" indicating that the mounted lens is a type that can detect the focusing condition, the program goes to step S32 to set "1" for the signal FAEN. If signal FAENL is carrying "0", signal FAEN continues to carry "0".

Next, in steps S33 to S35, flag AFC is determined. At step S33, an SAF/M signal is checked. The SAF/M signal is controlled in response to the manual switching operation for changing the mode of operation between the automatic focusing operation and non automatic focusing operation, and it is applied to terminal PT6. When the SAF/M signal is "HIGH", AF mode (This is a mode in which the focusing condition of the mounted objective lens is detected inside the camera body, and based on the detected result, the objective lens is automatically moved to the in-focus position.) is established, and when it is "LOW", non-AF mode is established. At step S33, if SAF/M signal is "0", the program goes to step S36 with the AFC signal maintained "0", but if SAF/M signal is "1", the program goes to step S34 to detect the AFCF signal from the lens circuit. At step S34, if the AFCF signal is "1", indicating that the lens has a coupling axle for the AF operation, the program goes to step S35 so as to set "1" in flag AFC. Thus, when the mounted lens has the coupling axle for the AF operation and, at the same time, if the mode selecting switch (SAF/M) provided on the camera body is turned on to select the AF mode, the AFC signal carries "1". Other than that, the AFC signal carries "0".

At steps S36 and S37, it is detected whether the single frame shooting mode is selected or the sequence shooting mode is selected. If the sequence shooting mode is selected, flag DR is set with "1", and if the single frame shooting mode is selected, flag DR continues to carry "0". Then, at steps S38 and S39, the signal obtained from the electronic flash device mounted on the camera body is checked. If the electronic flash device is mounted and if switch 41 is on for demanding the auxiliary light for the AF operation, terminal ST5 of flash circuit FLS produces HIGH, which is applied to terminal PT11. At step S38, if it is detected that terminal PT11 is receiving a HIGH level signal, flag AFFL carries "1" at step S39. This signal informs microcomputer MC1 that the auxiliary light is available. The detail will be described later.

At step S40 and S41, the RDY signal is set. When the electronic flash device is charged, a HIGH level signal is produced from terminal ST2 of flash circuit FLS, which is applied to terminal PT9. Thus, at step S40, if it is detected that terminal PT9 is receiving a HIGH level signal, the program goes to step S41 to set "1" in RDY signal. This signal is also used in the focus detection with the auxiliary light (this operation is referred to as an auxiliary light AF mode). Then, at step S42, the data transmitted from the lens circuit is temporarily stored in a register for the serial read out to AF microcomputer MC1. Then, at step S43, CSAF signal carries "1" for starting the serial read out. This is a response to the signal DTRQ from AF microcomputer MC1 demanding the serial transfer of data. Then, when CSAF signal becomes "HIGH", AF microcomputer MC1 starts to read data applied serially. At step S44, 5 byte data, each 8-bit long, are transferred AF microcomputer MC1. Then, at step S45, CSAF signal now carries a LOW level signal, thereby completing the data transfer serially.

Referring back to FIG. 4, in the main routine, the program advances to step S8. At step S8, VRI signal representing the output of the light measuring circuit LMC and ANI signal representing the reference voltage for the A/D conversion are taken, and the output signal of the light measuring circuit LMC is converted to digital signal for use in the exposure calculation in the later stage. Then, at step S10, a signal at terminal I2 of microcomputer MC2 is checked, whether or not it is a LOW level signal indicating that the shutter is released. If the shutter is charged and if the shutter release button is depressed all the way with switch S4 being on, switch S2 closes and therefor, terminal I2 will receive a LOW level signal. On the contrary, if terminal I2 is receiving a HIGH level signal, no shutter release is effected and, therefore, the program advances to step S25. At step S25, release flag RLF is cleared. Then, at step S26, it is checked if a charge completion signal is transmitted from the electronic flash device. If the charge completion signal is present, the program goes to step S27 so as to send the data for the flash photographing to the exposure display circuit EXD. If the charge completion signal is not present, the program goes to step S28 so as to send the data for the photographing under the ambient light to the exposure display circuit EXD. Thereafter, the program goes to step S22 at which it is detected whether or not the switch S1 is maintained on. If switch S1 is maintained on, terminal I1 continues to receive a LOW level signal. In this case, the program returns to step S3 to repeat the same procedure as described above.

At step S22, if terminal I1 is receiving a HIGH level signal, the program goes to step S23 so as to stop the operation of AF microcomputer MC1. This is done in the following manner. First, an AFS signal is applied to terminal INT1 of AF microcomputer MC1 so as to interrupt microcomputer MC1. In order to distinguish between the AFS signal for starting the microcomputer MC1 and the AFS signal for stopping the microcomputer MC1, the AFS signal for stopping the microcomputer MC1 is defined by a step down and a step up with an interval therebetween being less than 50 microseconds. In the case where the interruption takes place during the steps of light measuring (S26–S28), AFS signal is maintained LOW. Thus, the AFS signal first changes to HIGH and then becomes LOW, so as to stop the microcomputer MC1. In the case where the interruption takes place during the steps of shutter release (S11–S21), AFS signal is maintained HIGH. Thus, the AFS signal immediately becomes LOW, so as to stop the microcomputer MC1. By this interruption, AF microcomputer MC1 enters in to a stop mode and, therefore, the automatic focus adjustment operation also stops. At step S24, the display on display circuit EXD is extinguished and, at the same time, control microcomputer MC2 stops its operation.

While repeating the light measuring operation and when the shutter is released during the program flow in a looped condition, terminal I2 receives a LOW level signal. Then, after step S10 the program proceeds to step S11 in which release flag RLF is checked. If release flag RLF is carrying "1", the program goes to step S26. Thus, under the single frame shooting mode, if the shutter button is depressed once, release flag RLF is set (steps S21 and S22) and maintained "1", and as long as the shutter button is depressed all the way to maintain switch S2 on, the shutter will not be released again. If switch S2 is turned off while switch S1 is held on, the program goes to step S10 to S25, thereby clearing the release flag RLF. In other words, if switch S2 is turned on again, the program goes from step S11 to S12 to release the shutter again.

At step S12, the signal applied to terminal PT7 for selecting the mode between AF priority mode and release priority mode is checked. Here, the AF priority mode means that the shutter release is permitted, even when switch S2 is turned on, only when the automatic focus adjustment is completed to set the lens in the in-focus condition; and the release priority mode means that the shutter release is effected immediately to the closure of switch S2 even if the automatic focus adjustment is not completed. At step S12, if it is detected that SA/R signal is carrying "1" indicating that the AF priority mode is selected, the program goes to step S13 to further check the AFE signal. The AFE signal is produced from terminal P12 of AF microcomputer MC1, and it carries "1" when AF microcomputer MC1 determines that the lens is shifted to the in-focus position. Thus, at step S13, it is detected whether or not the lens is shifted to the in-focus position. If the lens is shifted to the in-focus position, the AFE signal carries "1", and thereafter, the program goes to step S14 for starting the shutter release operation. At step S13, if AFE signal is carrying "0", the program goes to step S26 for effecting no shutter release operation. At step S12, if it is so detected that the mode is release priority mode, the program goes to step S14 to effect the shutter release operation. The SA/R signal as examined in step S12 is produced not only in response to the manual operation of a switch (not shown) mounted on the camera body, but also to a self-timer switch (not shown). When the self-timer is operated, the mode is forcibly changed to the release priority mode even when the AF priority mode is selected. In other words, the camera will be automatically set to the release priority mode when a picture is to be taken by use of the self-timer. When the self-timer is used, a counter counts a predetermined time, such as 10 seconds, at the step which will be located between steps S14 and S15. Also, terminal PT7 is connected to switch SA/R which is provided on the camera body, or in a controllable back lid of the camera body. Furthermore, such a switch SA/R may be provided in a remote control unit.

Next, at step S14, terminal PT2 produces a signal INREL indicating that the shutter release has been executed and, this signal is applied to AF microcomputer MC1 at terminal INT2 so as to start the interruption in response to the step down of the signal INREL. Thus, microcomputer MC1 starts a release routine. Thus, even if the camera is in the automatic focus adjustment mode and the lens is now being shifted, the movement stops and the display is extinguished, until the end of the shutter release. At step S14, for the completion of the next shutter release operation and for starting the operation of AF microcomputer MC1, AFS signal is maintained HIGH. Then, at next step S15, it is detected whether or not a charge completion signal is applied from flash circuit FLS to terminal PT9. If the charge completion signal is present at terminal PT9, the program goes to step S16 for sending the exposure control data based on the flash photographing to exposure control circuit EXC. If the charge completion signal is not present, exposure control data based on the ambient light are sent to exposure control circuit EXC (step S17). Then, at step S18, the exposure control operation starts.

When the exposure control operation completes, an automatic film advancing operation by one frame is effected at step S19. Then, if the mode is the single frame shooting mode, "1" is set in release flag RLF at steps S20 and S21. Thereafter, the program goes to step S22. Thereafter, if switch S1 is maintained on to provide a LOW level signal to terminal I1 of control microcomputer MC2, the program goes to step S3 to carry out the data reading, calculation and display repeatedly. However, if switch S1 is not on, the program goes to step S23 to carry out a similar operation as described above and, thereafter, control microcomputer MC2 stops its operation. This is the end of the description of the thorough operation of control microcomputer MC2.

Figure 6:
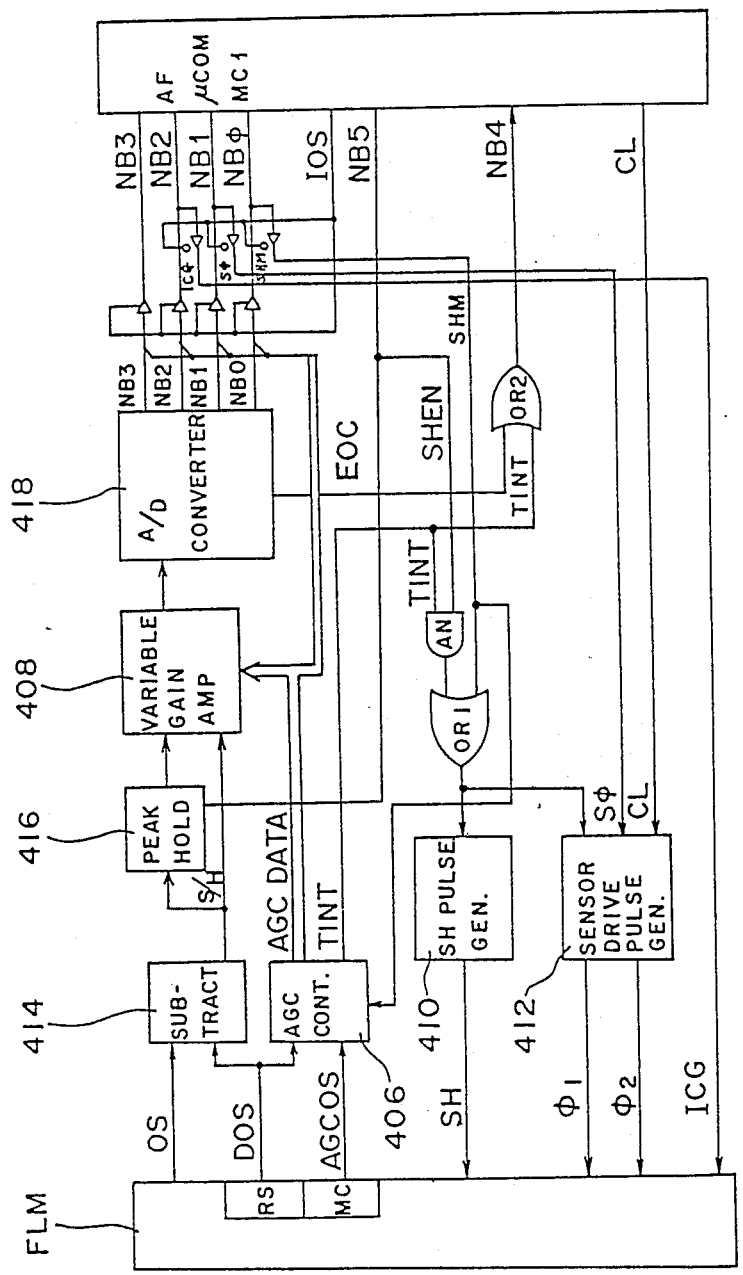
FIG. 6 is a circuit diagram of the interface circuit shown in FIG. 2.

Referring to FIG. 6, a circuit diagram of an interface circuit IF1 of the preferred embodiment is shown. The description hereinbelow is directed particularly to the interface circuit together with its operation.

When control microcomputer MC2 detects the closure of switch S1 in response to the depression of shutter button halfway, control microcomputer MC2 produces a signal which triggers AF microcomputer MC1 to start the focus adjustment operation.

First, when AF microcomputer MC1 produces an IOS signal carrying "0", gates for transmitting signals along lines NB0 to NB3 are so actuated as to permit the signal transmission in one direction, i.e., from AF microcomputer MC1 to interface circuit IF1. Then, AF microcomputer MC1 produces a pulse, which is an integration clear signal ICG, on line NB2. This pulse signal ICG is applied to CCD image sensor FLM. Accordingly, CCD image sensor FLM is so initialized as to set each picture element in the initial condition and, at the same time, a brightness monitoring circuit MC incorporated in the CCD image sensor is reset so that its output signal AGCOS becomes equal to the level of the power voltage. Also, simultaneously with the generation of pulse signal ICG, AF microcomputer MC1 produces from its terminal NB5 a HIGH level signal which is signal SHEN for permitting the generation of a shift pulse. Then, in response to the trailing edge of integration clear pulse ICG, each picture element in CCD image sensor FLM starts integration of a photocurrent generated in each picture element and, at the same time, the level of the output signal AGCOS of brightness monitoring circuit MC starts to decrease at a rate corresponding to the brightness of the object. However, the level of a reference signal DOS produced from a reference signal generator RS provided in the CCD image sensor FLM is maintained at a predetermined level. Signals AGCOS and DOS are applied to an AGC controller 406 in which both signal are compared. AGC controller 406 detects the rate of decrease of signal AGCOS with respect to signal DOS in a predetermined time (such as 100 milliseconds under the focus detection procedure), and the detected result is used to control the gain of a differential amplifier 408, which is a type that can change its gain. If AGC controller 406 detects that the signal AGCOS decreases so fast that the decreased amount within said predetermined time from the trailing edge of integration clear pulse ICG is more than a predetermined amount, it produces a HIGH level signal (TINT signal) which is applied through AND gate AN and OR gate OR1 to a shift pulse generation circuit 410. Upon receipt of TINT signal, shift pulse generation circuit 410 produces a shift pulse SH. The TINT signal is also applied through OR gate OR2 to terminal NB4 of AF microcomputer MC1, thereby informing AF microcomputer MC1 that the integration operation in the CCD image sensor is completed. The shift pulse SH is applied to CCD image sensor FLM to shift the integrated charges in the CCD image sensor shift registers to corresponding cells, parallelly, thereby completing the integration of photocurrent in each picture element. Also, in a synchronized relationship with the clock pulses CL from AF microcomputer MC1, sensor drive pulse generation circuit 412 generates sensor drive pulses $\phi 1$ and $\phi 2$ which have the phase difference of 180°. The sensor drive pulses $\phi 1$ and $\phi 2$ are applied to CCD image sensor FLM. The CCD image sensor FLM operates in a synchronized manner with the step up of the pulse $\phi 1$ such that the charges accumulated in the picture elements moved to a shift register and are serially produced from the end of the shift register, thereby forming an image signal OS. The image signal has a voltage level in relation to the intensity of the light applied to the CCD image sensor. Thus, to make the image signal OS always within a certain range, the image signal OS is subtracted from a reference voltage signal DOS in a subtractor 414, thereby producing a picture signal (DOS−OS). If a predetermined time passes without producing a TINT signal from the time when the integration clear signal ICG disappears, AF microcomputer MC1 produces from its terminal NB0 a HIGH level signal representing the shift-pulse generation signal SHM. Therefore, if AGC controller 406 does not produce a HIGH level TINT signal even when the predetermined time passes from the time when the integration clear signal ICG disappears, shift pulse generator 410 produces a shift pulse SH in response to the shift-pulse generation signal SHM.

In the above described operation, AF microcomputer MC1 operations such that a sample/hold signal S/H is produced while the picture signals corresponding to the seventh to tenth picture elements of the CCD image sensor are produced. This portion in the CCD image sensor is covered with an aluminum mask so as to cut off the light thereby producing a dark signal. This signal is used to remove the dark signal component from the obtained image signal. By the sample/hold signal, a peak value holding circuit 416 holds a difference between the output signal OS obtained from the masked portion of the CCD image sensor and the signal DOS. The obtained difference and the picture element signal are applied to the differential amplifier 408, which amplifies the difference between the obtained difference and the picture element signal at a gain determined by AGC controller 406. The signal produced from amplifier 408 is converted to a digital form at A/D converter 418 and, thereafter, the digital signal is transferred to AF microcomputer MC1 as the picture element signal data.

When the picture element signal data is transferred to AF microcomputer MC1, a signal IOS from microcomputer MC1 becomes HIGH, whereby lines NB0 to NB3 are so actuated as to permit the signal transmission in the opposite direction, i.e., from interface circuit IF1 to AF microcomputer MC1. In A/D converter 418 the A/D conversion is effected for 8-bit long data, but to AF microcomputer MC1, the upper 4-bit portion and the lower 4-bit portion are sent separately. The timing for sending the upper and lower 4-bit portions are controlled by EOC signal which is transmitted to AF microcomputer MC1 along line NB4 through OR gate OR2. The other input of OR gate OR2 is applied with TINT signal. In response to the HIGH and LOW states of EOC signal on line NB4, AF microcomputer reads the picture element signal data through lines NB0 to NB3. Before reading the picture element signal data, AF microcomputer reads AGC data from AGC controller 406 through the same lines NB∅ to NB3. As will be described later, the AGC data will be used as a judging level. The signal Sφ produced from terminal NB1 of AF microcomputer MC1 is for switching between the initialize operation for initializing the CCD image sensor and the normal operation for integrating the light from the object.

After the above operation, AF microcomputer MC1 sequentially stores the picture element signal data in an internal memory. When all the data corresponding to the total picture elements on the CCD image sensor are stored, the defocus amount and the direction of defocus are calculated through a predetermined program. The calculated results are displayed through the display circuit and, at the same time, the results are used to effect the automatic focus adjustment by a lens driving arrangement which drives the objective lens to an in-focus position.

According to the present embodiment, the procedures of CCD image sensor integration, data damping, and focus detection calculation are carried out repeatedly to improve the accuracy of the focus detection.

In the drawings from FIG. 7 to FIG. 16, a flow chart of operation of AF microcomputer MC1 is shown. Before the description therefor proceeds, the flags used in the flow chart are listed in the following Tables 5-1, 5-2 and 5-3.

TABLE 5-1

(Flags used in microcomputer MC1)

| Name | Meaning 0 | 1 | Comments |
| --- | --- | --- | --- |
| renormalized integration F | Not OK | OK | Focus detection calculation is permitted or not while CCD integration is carried out |
| 1-cut shot F | Under 50 ms | Over 50 ms | CCD integration time exceeded 50 ms or not |
| Present low contrast F | Present not low contrast | Present low contrast | Calculated result obtained at the present focus detection indicates low contrast or not |
| Previous low contrast F | Previous not low contrast | Previous low contrast | Calculated result obtained at the previous focus detection indicates low contrast or not |
| Scanning F | not scanning | scanning | Lens is scanning or not under the condition that calculated result of the focus detection indicates low contrast |
| Scan inhibit F | permit scanning | inhibit scanning | Lens can be scanned or not |
| Scanning struck F | Lens has struck the end of scan once | Lens has not yet struck the end | Lens has struck the scan end at least once |
| AF.F | AF mode | Not AF mode | AF mode or not |
| FA.F | FA mode | Not FA mode | FA mode or not |
| Release F | Shutter has not yet released | Shutter has released | Program has followed the release loop by the release interruption |

TABLE 5-2

(Flags used in microcomputer MC1)

| Name | Meaning 0 | 1 | Comments |
| --- | --- | --- | --- |
| near zone F | outside the near zone | inside the near zone | Lens is being driven or being stopped |
| drive F | Lens being stopped | Lens being driven | Lens is driven or stopped |
| Reverse F | non reversed | reversed | Lens driving direction |

TABLE 5-2-continued (Flags used in microcomputer MC1)

| Name | Meaning 0 | 1 | Comments |
| --- | --- | --- | --- |
| | reversed | | is reversed and backlash correction is carried out, or not |
| End F | Not at the end | At the end | Lens is located at the end of the scan, or not |
| End 2 F | Not at the end | At the end | Lens is located at the end of the scan, or not (second check) |
| End position F | Infinite focusing position | Near focusing position | Which one of the two ends of the lens shift |
| Low light F | Not low light (not low brightness) | low light (low brightness) | Object has brightness below a certain level, or not |
| Auxiliary light MF | Not auxiliary light AF mode | Auxiliary light AF mode | Focus detection using auxiliary light or not |
| Auxiliary light 1st F | 1-st PASS | Not 1-st PASS | First focus detection in the loop of auxiliary light AF mode |
| 200 ms F | Max 100 ms | Max 200 ms | Maximum CCD integration time is 200 ms or 100 ms |

TABLE 5-3

(Flags used in microcomputer MC1)

| Name | Meaning 0 | 1 | Comments |
| --- | --- | --- | --- |
| Previous direction F | Positive direction | Negative direction | Present moving direction of lens based on defocus direction obtained previously |
| Present direction F | Positive direction | Negative direction | Present moving direction of lens based on defocus direction obtained in the present focus detection calculation |

There are four entries to start the operation of the AF microcomputer MC1. The first entry is "RESET" (step #1 shown in FIG. 7), wherein operation starts in response to the closure of the power switch MNS, namely the operation starts when signal RES is applied to terminal CLR1 of the AF microcomputer MC1, shown in FIG. 2. The second entry is "INT1S" (step #8 shown in FIG. 7), wherein operation starts when signal AFS is inputted to terminal INT1 of the AF microcomputer MC1. Signal AFS is produced to start the AF operation (automatic focus adjustment operation) or the FA operation (focus assessment operation), and is outputted from terminal PT1 of controlling microcomputer MC2. The third entry is "INT2S" (step #27 shown in FIG. 8), wherein operation starts when signal INREL is inputted to terminal INT2 of the AF microcomputer MC1. Signal INREL is produced in response to the shutter release and is transmitted from terminal PT2 of controlling microcomputer MC2 to the AF microcomputer MC1. The fourth entry is "INT3S" (step #27 shown in FIG. 16), wherein the operation starts when signal PS, from encoder ENC, is inputted to terminal INT3 of the AF microcomputer MC1. The main routine of the automatic focus adjustment operation flow starts from "INT1S" (step #8 in FIG. 7), and proceeds to "AF-START" (step #33 in FIG. 9), "CDINTS" (step #44 in FIG. 10), and then to "MAIN1" (step #86 in FIG. 11). The routine is roughly divided into three flows from "MAIN1", as described below. The first flow, which is a low contrast mode, wherein the contrast of an object is low, starts from "LOWCON" (step #165 in FIG. 13). The second flow, which is the auxiliary light AF mode, wherein auxiliary light LED (48) is used to illuminate an object and to detect focus condition when focus detection is impossible under dark condition, starts from "LSAVE" (step #238 in FIG. 14). The third flow, which is the ordinary AF mode, wherein the contrast of an object is sufficiently high, starts from "NLOC1" (step #91 in FIG. 11). There are two subroutines for the above described main routine. The first subroutine, wherein serial data from controlling microcomputer MC2 is inputted and processed, starts from "SIOSET" (step #241 in FIG. 15). The other subroutine, wherein the terminal position of the lens is detected and processed, starts from "CKLOCK" (step #196 in FIG. 14). Referring to the flow chart, the automatic focus-adjustment operation (this is called the AF operation in the following description) and the focus-assessment operation (this is called the FA operation in the following description) are further described in the present embodiment.

At first, in response to the closure of power switch MNS, reset signal RES is outputted from power-on-reset circuit POR. And, in response to reset signal, controlling microcomputer MC2 starts its operation from a specific address. At the same time, clock pulse CK is outputted from terminal (Xout) in controlling microcomputer MC2 and inputted to terminal (Xin) in the AF microcomputer MC1. When reset signal RES is inputted to terminal CLR1, under clock pulse CK, from controlling microcomputer MC2, the AF microcomputer MC1 starts its operation from "RESET" (step #1). At step #1, all flags (shown in Tables 5-1, 5-2 and 5-3) used in the flow chart are cleared. Each flag is initially set to "0". After step #2, the stop signal, described hereinafter, is inputted to the AF microcomputer MC1 from controlling microcomputer MC2 to stop the AF or FA operation. The program passes through step #2, also when the stop signal is inputted.

At step #2, the signal at terminal ST4, which is inputted to terminal P13, is set to produce "LOW" thereby terminating the illumination of auxiliary light LED 48. This operation is to stop the illumination of the auxiliary light when the focus-detection operation is halted by the turn off the switch S1 while the auxiliary light is on under the auxiliary-light AF mode. At step #3, the display showing the focus-adjustment condition or the defocus direction under the AF or FA operation is switched off, this is accomplished by a HIGH level signal produced from each of terminals P32-P30, thereby setting each terminal to the input mode. Even if the display is switched off by the above described operation, the displayed output state is memorized in the output-port register and the memorized content can be displayed again by setting this port to the output mode. This function will be utilized in a later stage.

At step #4, the lens is stopped with no brake applied, so that the lens can be manually moved while the AF microcomputer MC1 is in the inoperative condition and, at the same time, electricity is conserved. The controls of lens-motor-driving signals MC, MR, ME, and MB, which are inputted to driver circuit MDR1 from the AF microcomputer MC1, are indicated in Table 6. When signals MC, MR, MF and MB, at terminals P03-P00, are set to produce "HIGH". The power to motor M01 is cut, and thus, the lens stops with no making effect.

TABLE 6

| (motor drive signals for driving lens) | | | | | | |
|---|---|---|---|---|---|---|
| terminal | signal | high-speed | low-speed | send-in direction | pay-out direction | brake | stop without brake |
| P03 | MC | H | L | * | * | * | * |
| P02 | MR | * | * | L | H | H | H |
| P01 | MF | * | * | H | L | H | H |
| P00 | MB | H | H | H | H | L | H |

In Table 6, * mark indicates that either "H" or "L" is permissible.

At step #5, the release flag (release F in Table 5-1) and the auxiliary light flag (auxiliary light F in Table 5-2) are cleared. This operation attempts to continuously release the release operation or the auxiliary-light AF mode when the stop instruction is outputted from controlling microcomputer MC2, during the release operation or the auxiliary-light AF mode. Step #6 is a control step which inhibits the interruptions other than INT1 and INT2 in the next flow start. Thus, after AF microcomputer MC1 stops its operation, it is permitted to start the operation from "INT1S" (step #8) or "INT2S" (step #28). From a practical viewpoint, a camera is constituted such that by pushing the shutter-release button halfway, which is not shown in the drawings, switch S1 (shown in FIG. 2) closes and controlling microcomputer MC2 causes an interruption at "INT1". Then, by pushing down said shutter-release button all the way, switch S2 is closed and the release interruption is inputted at "INT2". Accordingly, the next flow-chart begins from "INT1S" (step #8). At step #7, AF microcomputer MC1 enters the stop mode. Here, the stop mode means that the AF microcomputer MC1 enters the electricity-saving mode and the operation of the AF microcomputer stops. At this time, only terminal P13 produces "LOW" and all the other terminals produce "HIGH". Also, LED 48 for auxiliary-light illumination, is switched off, and display-LEDs (LEDL), (LEDM), and (LEDR), are extinguished. Moreover, the lens is in the stop condition and interface circuit IF1 is also in the stop state. The program, in the above described state, is waiting for the interruption start signal to be inputted to terminal INT1 from controlling microcomputer MC2.

Figures 7, 17A, 17B:
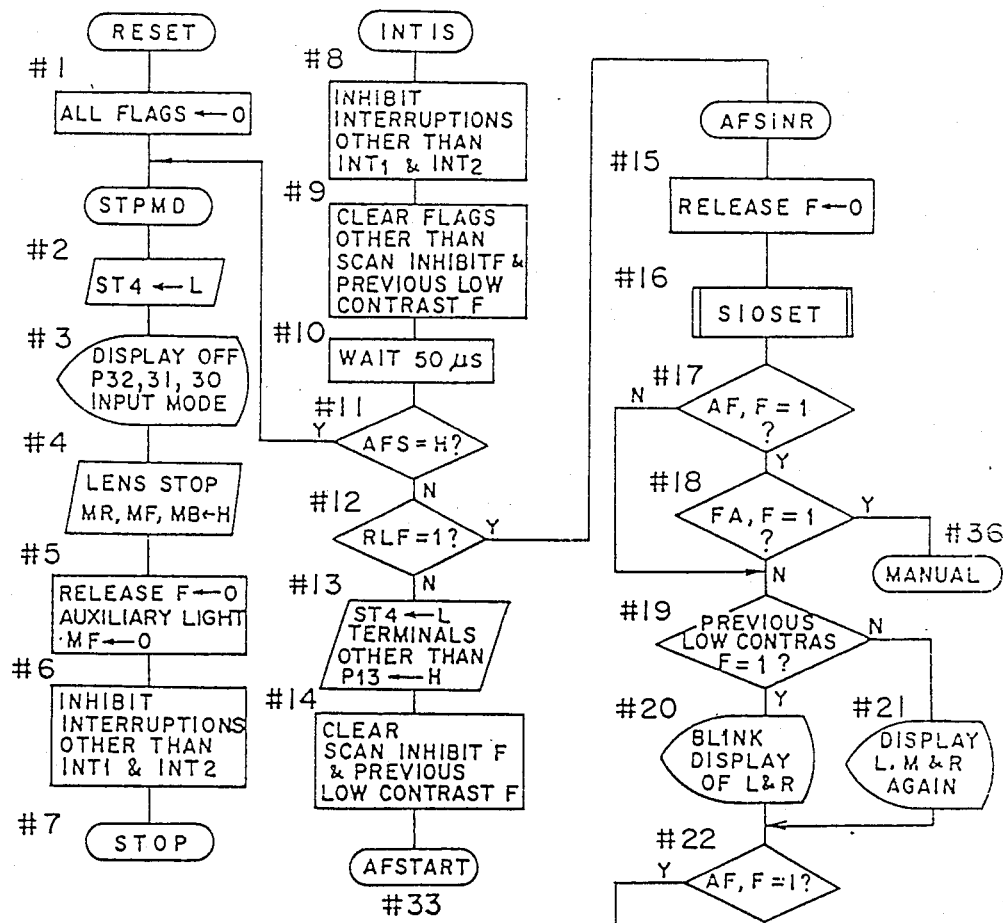
FIGS. 7-16 is a flow chart showing an operation of the AF microcomputer shown in FIG. 2, in which FIGS. 10a and 10b should be taken together as shown in FIG. 10, FIGS. 11a and 11b should be taken together as shown in FIG. 11, FIGS. 12a and 12b should be taken together as shown in FIG. 12, and FIGS. 14a and 14b should be taken together as shown FIG. 14.
FIGS. 17a and 17b show waveforms of signals for starting and stopping the interruptions.

Next, the description is directed to the second entry, "INT1S" (step #8). The interruption "INT1S" can be started from any time; it is not inhibited during the total flow of the AF microcomputer MC1. This entry has three interruption roles. The first one is a start of the AF or FA operation, the second one is a stop of the AF or FA operation, and the third one is the operation of the focus-adjustment condition display reset and the sequence shooting mode. The three roles can be distinguished in the following manner. The first and second roles can be distinguished by the inputted signal to terminal INT1. Namely, as shown in FIG. 17(A), in order to start the AF or FA operation, it is necessary that signal AFS should change from "HIGH" to "LOW" and the "LOW" state should be maintained longer than 50 microseconds. On the contrary, in order to stop the AF or FA operation, as shown in FIG. 17(B), it is necessary that signal AFS should change from "HIGH" to "LOW" and then rises from "LOW" to "HIGH" within 50 microseconds. The distinguish between the third operation and the first operation including the AF or FA operation is done by the use of a flag. When a release interruption, which will be described later, starts, a release flag Release F (shown in Table 5-1) is set to carry "1" in the release flow. Then, when the next flow "INT1S" starts, it is detected whether or not flag Release F is carrying "1". The difference between the third and the first operation is decided by this flag. The flow from step #8 is described, including these operations. At step #8, all interruptions, excluding "INT1" and "INT2", are inhibited. The inhibited interruptions include the event-counter interruption "INT3" and an internal interruption for the timer which decides the flashing interval of display LED. At step #9, the flags in use are cleared, although two flags expressing the conditions are not cleared for use in "AFSINR" from step #15. These two flags are the scan inhibit flag (Scan inhibit F in Table 5-1) and the previous low contrast flag (Previous low contrast F). The reason why the scan inhibit flag is not cleared, is as follows. As in the case of not only the single frame shooting mode, but also the sequence shooting mode, as long as switch S1 is maintained on, if the defocus amount has once been calculated when the contrast of the object is sufficiently high for the focus detection, or if the low contrast scanning has once been attempted, a further low contrast scanning is inhibited by the scan inhibit flag. Also the reason why the previous low contrast flag is not cleared, is as follows. In the case where the program is in "AFSINR" starting from step #15 as started by signal AFS after the release, if switch S1 is maintained on even after the release operation, the focus-detection-calculation obtained before the release will be displayed again. Namely, the defocus direction display by the LED is extinguished during the release operation, and when the release operation completes, the display appears again after the release operation. For this purpose, the flag, by which it is detected whether or not LED has flashed at the low contrast, is left as it was before.

The program waits, at step #10 for 50 microseconds and it is detected at step #11 whether the inputted interruption to "INT1S" is the AF- or FA- stop interruption. When a signal, inputted to terminal INT1 of the AF microcomputer MC1, is the same as shown in FIG. 17(A), signal AFS is now "LOW" so that the flow proceeds to step #12. When the signal is the same as shown as in FIG. 17(B), signal AFS is "HIGH". Thus, the program advances to the stop-mode-processing flow, "STPMD" (step #2) and the AF microcomputer MC1 operation stops. At step #12, it is detected whether the program should advance to interruption flow "AFSINR" as caused by signal AFS after the release, or to the interruption flow as caused by signal AFS initially obtained. If the release flag (Release F) is set, the flow proceeds to "AFSINR" (step #15). If the release flag (Release F) is not set, the flow proceeds to the next step #13. At step #13, each terminal of the AF microcomputer MC1 is initialized. That is, only auxiliary-light-emission terminal P13 in auxiliary-light-AF mode is set to produce "LOW", and the other terminals are all set to produce "HIGH". However, when the AF microcomputer MC1 enters this step, by an interruption start from the stop mode, each terminal is in the same state as the above described state, that is, only terminal P13 is in "LOW" and the other terminals are all in "HIGH".

At step #14, the scan inhibit flag and previous low contrast flag, which are not cleared in step #9, are cleared. Then, the program advances to "AFSTART" (step #33 shown in FIG. 9), thereafter the focus-adjustment condition is detected. In response to the detection result, the lens is driven and the focus-adjustment condition is displayed. The focus-adjustment condition display means that input signals LL and LR produce "HIGH" and input signal LM produces "LOW", thereby the green LED is flashed, where LL, LM, and LR are input signals applied to the display LEDs LEDL, LEDM and LEDR. When switch S2 is closed after confirmation of this display, or when the focus adjustment operation is completed by the automatic focus-adjustment operation under the closure of switches S1 and S2, controlling microcomputer MC2 starts the release operation. At the same time, interruption signal INREL, announcing the release operation to the AF microcomputer MC1, is outputted. When AF microcomputer MC1 receives the interruption signal INREL at terminal INT2, it carries out the release interruption. The flow, starting from "INT2S" (step #27 in FIG. 8), corresponds to the above described operation.

At step #27, all the interruptions excluding INT1 and INT2 are inhibited. At step #28, the signal from terminal ST4 produces "LOW", thereby the auxiliary light LED 48 is extinguished. This step is required only under the release-priority mode and is not required under the AF-priority mode, because under the AF-priority mode the focus adjustment has already been completed and the auxiliary-light illumination has been extinguished. Step #29, which stops lens-drive motor M01, is also required under the release-priority mode, wherein no brake is applied to motor M01. The reason why no brake is applied to the motor is described as follows: Under the release-priority mode, the release-operation timing is not always after the infocus condition; there may be a case when the shutter is released before the completion of the focus adjustment. When the shutter is released during the lens moving towards the infocus position, a better photograph can be taken if no brake is applied to motor M01 so as to let the lens move nearer to the infocus position by inertia, when compared with a case in which a brake is applied to the motor and the lens is forced to stop on the way to the infocus position. At step #30, the focus-adjustment condition display or defocus-direction display using LEDs LEDL, LEDM and LEDR is extinguished, because during the release operation of a single-lens reflex camera, the mirror is pushed up resulting in a complete darkness in the view finder so that it is not only meaningless but also undesirable that these displays are maintained on and unnecessary light is generated in the camera during film exposure.

At step #31, by the setting of release flag "release F" to carry "1", the release operation is recorded by said flag. Then, the program advances to step #32 and waits for the interruption "INT1" or "INT2". When a release interruption is continuously inputted at this step, the program returns to "INT2S" (step #27) and restarts. This operation corresponds to the cases where the open and closure of switch S2 is repeated under the closure of switch S1, shown in FIG. 2. In this manner, the release operation is repeated under the AF-lock condition. Under the AF-lock condition, the lens is not driven and fixed at the infocus position. If switch S1 remains close after the closure of switch S2 and the release operation, signal AFS is inputted again to the AF microcomputer MC1 causing interruption INT1, as shown in the flow chart of controlling microcomputer MC2. Then, the flow from "INT1S" (step #8) advances to "AFSINR" (step #15 in FIG. 7) because at this time, release flag (Release F) is carrying "1". The steps after step #15 will be described later.

When switches S1 and S2 are both opened after the release operation, under the closure of switch S2, as shown in the flow chart in FIG. 5, a signal AFS to stop the AF microcomputer MC1 is inputted from controlling microcomputer MC2 to the AF microcomputer MC1 causing interruption INT1. Then, the AF microcomputer MC1 enters the stop mode and waits for the next interruption.

The interruption-start flow caused by signal AFS after the release operation is further described. The entry for this flow is "INT1S" (step #8 in FIG. 7). At this time, since release flag RLF is carrying "1", the program branches at step #12 and advances to "AFSINR" (step #15). At step #15, by passing through this flow, release flag "release F" is reset. At step #16, serial data is inputted from controlling microcomputer MC2 in order to detect whether or not the operation mode of the AF microcomputer MC1 is changed. This flow, which starts from step #15 and advances to "AFSINR" is a flow after the release operation. If the operation mode is changed during or before the release operation, this flow must be changed correspondingly to the change of the operation mode. (There are operation modes such as AF-mode, FA-mode, and MANUAL-mode. The AF-mode is divided into the single frame shooting mode and sequence shooting mode.) At step #16, the information about the mode is inputted from controlling microcomputer MC2. Step #16 is the subroutine "SIOSET" which starts from step #241 shown in FIG. 15.

In this subroutine each mode is checked and the mode flags are controlled. At step #241, signal DTRQ in terminal P11 produces "LOW" and the serial data is requested to controlling microcomputer MC2. When signal DTRQ is applied, controlling microcomputer MC2 outputs the serial data shown in Table 4. At step #242, this serial data is inputted to the AF microcomputer MC1 and thereafter signal DTRQ becomes "HIGH" at step #243. The following 9 data are involved in data transferred by serial transmission: fully opened F value for the AF operation "AFAVO"; conversion coefficient data for the lens-driving "KROM"; AF-correction data for auxiliary light "ΔIR"; backlash-correction data at lens-driving counter-rotation "BKLSH"; auxiliary-light-OK signal "AFFL"; charge completion signal "RDY"; sequence/single frame shooting mode signal "DR"; AF-coupler-axle signal "AFCF"; and FA-enable/disable signal "FAEN". Each signal is transferred by the serial transmission and stored in the RAM of the AF microcomputer MC1. The data stored in RAM are used whenever they are needed. The use of each data will be described later in accordance with the flow chart.

After step #244, each mode is examined. At step #244, fully opened F value for the AF operation AFAVO is detected. The light-receiving element for focus detection has an available limit. When the fully opened F value of the lens is small, the incident light to said element for focus detection is obstructed at the exit pupil of the lens so that focus detection cannot be accurately calculated. For example, in the case where the limit-F value for the focus detection of said light receiving element is assumed to be F/7.0, the focus detection can be completed for a lens which has the fully opened F value of F/5.6 for AF operation. However, when a 2X teleconverter is attached to said lens, the F-value reaches 11.2 and focus detection is impossible. Said fully opened F value for AF operation means an F-value obtained when the aperture of the lens is not at all reduced. For a lens with a F-value varied by zooming or focusing, said fully opened F value is a signal to detect whether or not the light-receiving element for focus detection is obstructed. Accordingly, said fully opened F value is set to be the smallest fully opened F value of F-values varied by zooming or focusing. At step #244, when the fully opened F value for the AF operation AFAVO is larger than F/7.0, the program proceeds to step #251, and AF mode flag ("AF.F" in Table 5-1) is set to carry "1". Then, at step #250, by setting the FA mode flag ("FA.F" in Table 5-1) "1", the flag condition is set to the MANUAL mode, and then, the program returns to step #16. When the fully opened F value for the AF operation AFAVO is smaller than F/7.0, the program advances to step #245, because the lens F value means that the focus detection is possible.

At step #245, it is detected whether or not the present mode is the AF mode. When the AF mode flag is carrying "0" indicating that the present mode is the AF mode, the program proceeds to step #246. When the AF mode flag is carrying "1" indicating that mode is not an AF mode, it is further detected whether it is a FA mode or MANUAL mode. At step #246, it is detected whether or not the coupling axle for the AF operation exists. When signal AFC is carrying "1" indicating that the coupling axle exists, the program returns with the AF mode maintained. When the signal AFC is carrying "0" indicating that no coupling axle exists, the program proceeds to step #247. At step #247, AF mode flag is set to carry "1", thereby inhibiting the automatic-focus-adjustment operation. The coupling axle for the AF operation is an axle used for transmitting the driving power from motor M01 provided in camera body to the lens-focusing mechanism in the lens. At step #248 in FIG. 15, it is detected whether or not the mounted lens is a type which can detect focus condition. When the mounted lens is a focus detectable type lens, FA flag ("FA.F") is set to carry "0" at step #249, and accordingly, the program enters to the FA mode. When the mounted lens is a type which can not carry out the focus detection, the FA flag is set to carry "1". In this case, since the AF flag is also carrying "1" at step #250, it can be so determined that the present mode is the MANUAL mode. Here, FAEN=1 means that a lens is properly mounted on the camera body and, at the same time, said lens is a type which can detect the focus condition. If the condition is other than this, flag FAEN carries "0". The types of lens which can not detect focus condition are reflecting-telescopic lenses which can not detect it even if light receiving element have a small fully opened F value for the AF operation; specially designed lenses such as a variable softness lens and a shift lens which may generate great aberrations. In this subroutine, the change from the FA mode to the AF mode is not detected, but such a change will be detected in the later step #86, described later in connection with FIG. 11a.

Figure 15:
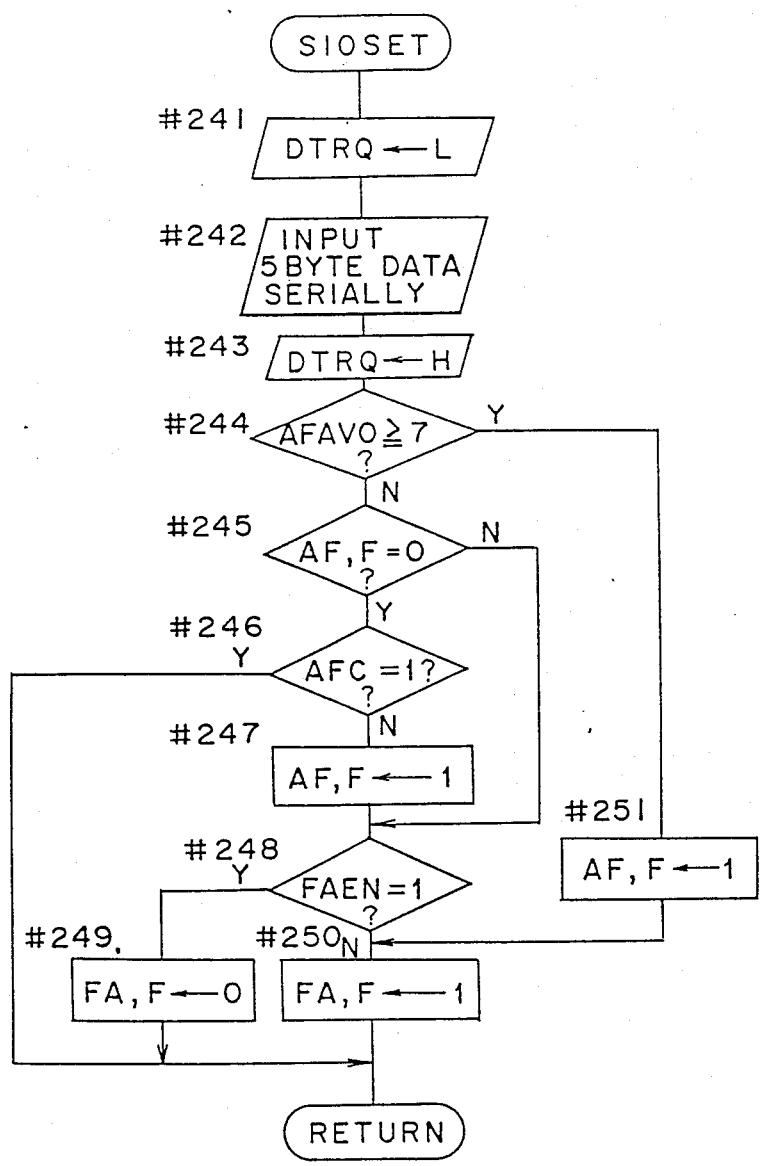

After the subroutine shown in FIG. 15, the program returns to step #17 (FIG. 7) at which it is detected whether the present mode is AF mode, or not. When the present mode is the AF mode, the program advances to step #19. When it is not the AF mode, it is further detected whether or not it is the FA mode, at step #18. If it is not the FA mode, the program advances to "MANUAL" flow from step #36.

At step #19, the previous condition is detected. When the previous condition, i.e., the condition before the release operation is "Low contrast", the display device reverts to such a condition that is shows low-contrast, at step #20. The low-contrast display is done in such a manner that the LEDs "LEDL" and "LEDR" located at the opposite ends of the LED array of "LEDL", "LEDM" and "LEDR" flash on and off repeatedly at 2 Hz. When the previous condition is not "low contrast", the display device reverts to a condition to display the focus adjustment condition or the direction of out-of-focus at step #21. Since the display effected before the release operation is stored in the display register, the previous display reverts by setting the port to the output mode. At step #22, it is detected whether or not the present mode is the AF mode, by checking of the AF mode flag "AF.F". When the present mode is the FA mode and not the AF mode, the program advances to ""CDINTA"" (step #39) and the focus detection is repeated. When switch S1 is on after the release operation under the FA mode, the focus detection operation is continued and displayed. Under the AF mode, it is detected whether or not the present mode is the single-frame shooting mode or sequence shooting mode based on signal DR at step #23. Here, DR=0 means that the present mode is the single-frame shooting mode. In this case, signal AFE at terminal P12 produces "HIGH". This signal is applied to control microcomputer MC2 for indicating that the automatic-focus-adjustment operation is completed, that is, the focus is correctly adjusted and the release operation is available. When the shutter-release button is pushed all the way, control microcomputer MC2 detects the AFE signal. If the signal AFE is "HIGH", under the AF-priority mode, release operation is permitted, but if it is "LOW", the release operation is inhibited. Namely, under the single-frame shooting mode, after the focus has once been adjusted and the release operation has been carried and if the release button is held halfway depressed where switch S1 is on the program advances to "AFSINR" starting from step #15, provided that no interruption such as signal AFS enters. In this case, since signal AFE produces "HIGH" at step #25, the release operation is permitted even when the object, which is moved toward or away from the camera, is out of focus. Also, in this case, since the program waits for the release interruption or the stop interruption of the AF microcomputer MC1 in next step #26, the lens is focused in the same condition. This sequence may be called an "AF lock". When the present mode is the sequence shooting mode, the program advances from step #23 to step #24 to examined whether or not the present mode is the auxiliary-light-AF mode. If it is under the auxiliary-light-AF mode, the present mode is the sequence shooting-mode and, at the same time, auxiliary-light-AF mode. Thus, the automatic focus-adjustment operation and the release operation are permitted only once. Thus, once the release operation is carried out, a further release operation or automatic focus-adjustment are inhibited. To this end, the program goes to step #26 without setting signal AFE "HIGH". Under the sequence shooting mode, but not in the auxiliary-light AF mode, the program advances to "CDINTA", starting from step #39, and starts the next focus detection.

Figure 9:
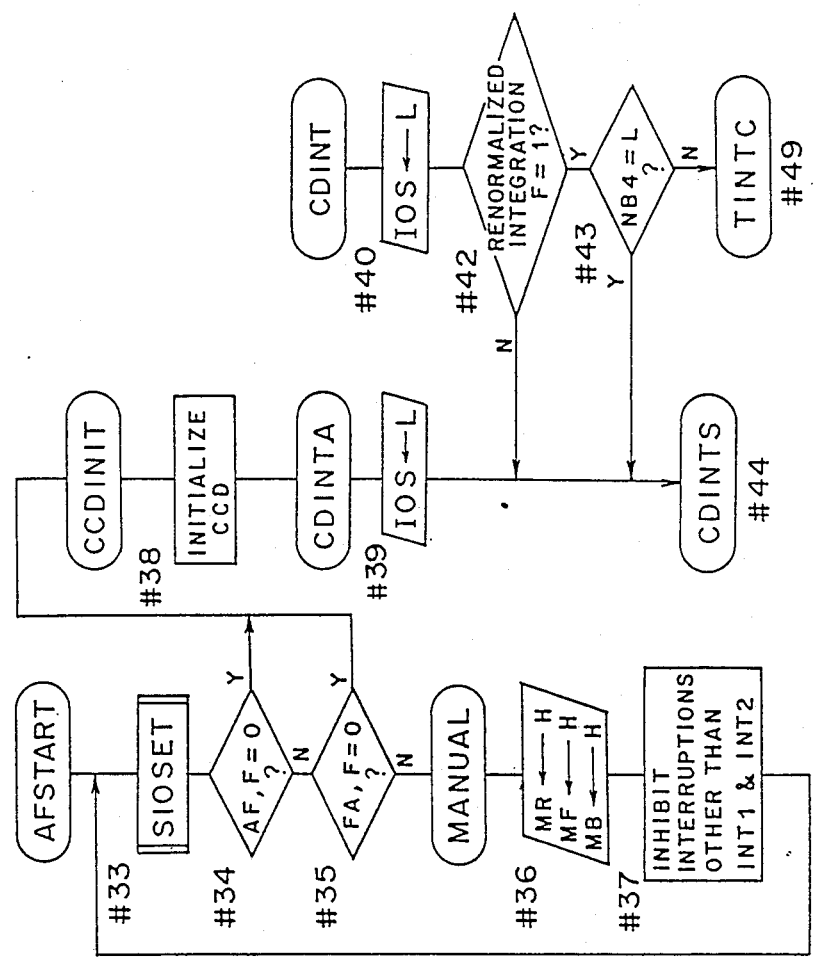
Figure 8:
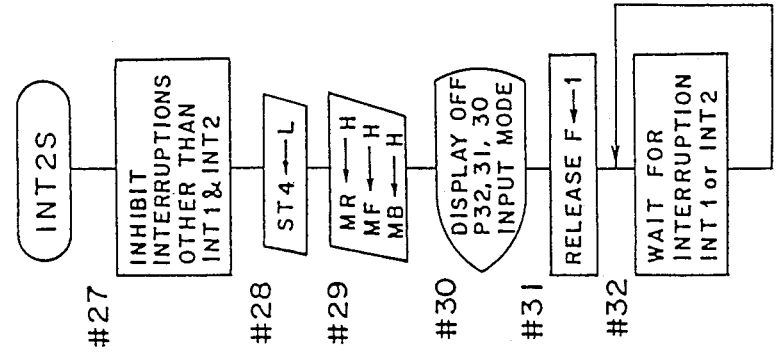
Figure 10B:
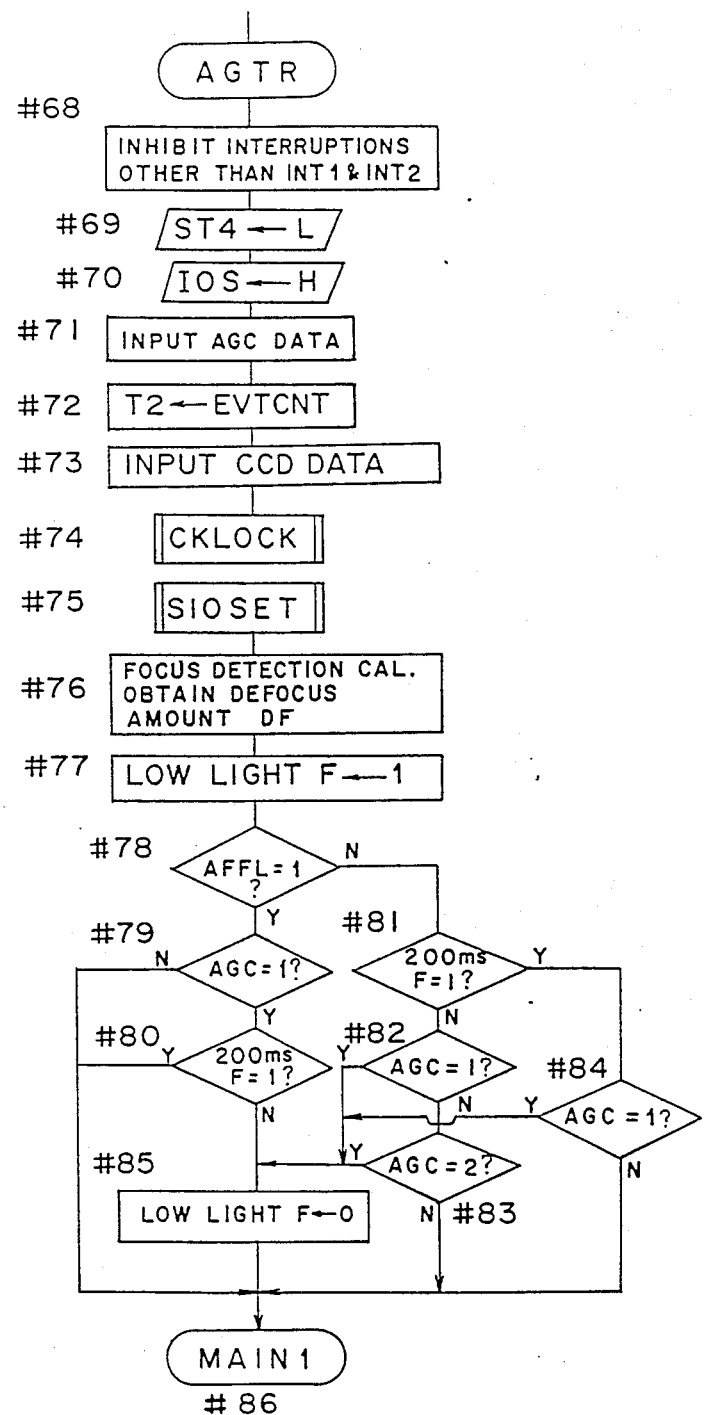

Referring to FIG. 9, the flow starting from "AF-START" (step #33) continues from step #14. At step #33, subroutine "SIOSET", shown in FIG. 15, is requested. Receiving various data from control microcomputer MC2, the AF microcomputer MC1 starts and decides which operation mode should be carried out. The decided operation mode is automatically written into mode register RG in the AF microcomputer MC1. This register RG is used later in order to examine whether or not the mode is changed. At steps #34 and #35, the operation mode is detected. When the mode is neither the AF mode nor the FA mode, but the MANUAL mode, the program advances to step #36. At step #36, in case that this flow is entered from some other flow, signals MR, MF, and MB, which are applied to driver circuit MDR1, are all set to produce "HIGH" so as to stop the lens motor MO1. At step #37, any interruptions except INT1 and INT2 are inhibited and the program returns back to step #33 to repeat the loop. Under the AF or FA mode, the program advances to step #38 to initialize the CCD image sensor FLM, thereby warming up the sensor. At step #39, signal IOS, at terminal P20, is set to produce "LOW" so as to set interface circuit IF1 to the mode where the signals from the AF microcomputer MC1 are inputted, and at the same time, so as to establish a mode for integrating the output from the CCD image sensor FLM. Then the program advances to step #44 in FIG. 10. At this step, 1-cut shot flag (1-cut shot F shown in Table 5-1), which detects whether or not the integration time exceeds 50 milliseconds, is cleared. At step #45, signal AFE outputted from terminal P12, is set to produce "LOW", because the program is looped and repeatedly returns to this step after the infocus condition is acquired. Since signal AFE produces "HIGH" when the infocus condition is acquired, the AFE signal is forcibly set to produce "LOW" at this step so as to be ready for the next calculation. At step #46, signal NB2 is outputted from terminal P23 for starting the integration at the CCD image sensor. At step #47, lens-driving pulse count EVTCNT, which will be used to correct the lens shifting amount during the focus-detection calculation and the integration operation, is read and stored in memory T1. At step #48, a 50 millisecond integration time is set, which is equal to half the maximum integration time (100 milliseconds) in the CCD image sensor FLM. In FIG. 9, a flow "CDINT" which starts from step #40 is shown parallel to the flow "CDINTA", and it take a separate procedure up to step #53. This flow "CDINT" is referred to as a "renormalization integration" and will be described later.

Referring to FIG. 10a, the program advances from step #48 to a flow "TINT∅" starting from step #55. At step #55, all interruption routines are permitted. At step #56, signal NB4 inputted to terminal P25 is detected. In the case where the signal NB4 is "LOW" indicating that the CCD Image sensor FLM has completed the integration to a level corresponding to the brightness of the object, the program advances to a flow "CDINT2" (step #64). When the signal NB4 is "HIGH" indicating that the sensor FLM is still continuing the integration operation, the program advances to step #57, at which it is examined whether or not the maximum integration time, as initially set, has been passed. More specifically, it is examined whether or not the integration time has exceeded one of the follows; 50 milliseconds set at step #48, 40 milliseconds set at step #53, 50 milliseconds or 150 milliseconds which will be set at steps #61 or 62, respectively. When it is not passed, the program returns to step #56 and repeats the loop. If the maximum integration time is passed, the program advances to step #58. Here, when 1-cut shot flag (1-cut shot F) is not carrying "1", the program advances to step #59 and sets this flag to carry "1". Since the program advances to step #63 only in the case where 1-cut shot flag is carrying "1", the program always passes through step #59 or #49 to reach step #63. At step #60, it is detected whether or not 200 ms flag (200 ms F shown in Table 5-2) is carrying "1". In the case where it is not carrying "1", it is so determined that the normal maximum integration time is 100 milliseconds. Thus, the remaining 50 milliseconds, which is the remaining of the 50 milliseconds set for the integration time at step #48, is set at step #61 and, thereafter, the program returns to step #56 for checking signal NB4. When a 200 ms flag is carrying "1" at step #60 (This is a special case particularly permitted to set the maximum integration time 200 milliseconds at the later flow.) the remaining 150 milliseconds, which is the remaining of the 50 milliseconds set for the integration time is set at step #48, at this step and, thereafter, the program returns to step #56 to examine signal NB4. When the output from the CCD image sensor FLM is high enough, the program advances from step #56 to step #64. Even when the output does not reach to an adequately high level, the integration operation has to be stopped after the maximum integration time. In this case the program advances to step #63 from step #58. Since at step #58, 1-cut shot flag is carrying "1", the program always advances to step #63 to produce forced integration stop signal NB0 from terminal P21 to interface circuit IF1.

Then, the program proceeds to a flow "CDINT2" starting from step #64. The steps from #64 to #67 are for the flow "renormalization integration" and will be described later. At Step #68, any interruptions except INT1 and INT2 are inhibited so that during the data-receiving period, the data-receiving operation will not be interrupted by the interruption procedures. Since interruptions INT1 and INT2 start from the beginning of the main flow, they are not inhibited. When auxiliary-light LED 48 is switched on during the CCD integration operation, signal ST4 at terminal P13 is set to produce "LOW" at step #69 so that the auxiliary-light LED 48 is extinguished. At step #70, signal IOS at terminal P20 is set to produce "HIGH" so that the interface circuit IF1 is changed over to the data output mode. Thus, signal lines NB4–NB0 are altered to the lines for data transmission from the interface circuit IF1 to the AF microcomputer MC1. Each of the transmitted data is 8 bit long and is transferred 4 bit (NB3–NB0) at a time parallelly. Thus, it is necessary to send data in two parts. When a signal on line NB4 is "HIGH", the upper 4 bit of the data is transferred, and when the signal on line NB4 is "LOW", the lower 4 bit of the data is transferred. The AF microcomputer MC1 combines the upper and lower 4 bit to 8 bit long data and takes it in. The first data transferred from interface circuit IF1 to the AF microcomputer MC1 is AGC data which is the gain value decided in AGC controller 406 and is either x1, x2, x4 or x8. (This value is referred to as AGC data hereinafter.) The AF microcomputer MC1 takes the AGC data in, at step #71 shown in FIG. 10b. After the integration operation by the CCD image sensor FLM, the timing for outputting these data is decided by interface circuit IF1. Thus, AGC data has to be taken in immediately after the integration operation. AGC data is outputted for a predetermined period of time. After the period, picture-element data from the CCD image sensor FLM is transferred with the predetermined timing. During a short time after the AGC data is received, lens-driving-pulse count EVTCNT obtained at the completion of integration operation is read and stored in memory T2 at step #72. This step corresponds to step #47 at the start of integration operation.

Next, at step #73, picture-element data from the CCD image sensor FLM are inputted and stored in the memory of the AF microcomputer MC1. Step #74 is a subroutine for detecting whether the lens is shifted to the infinite-focusing position or the nearest-focusing position. When the lens is shifted to either the infinite or nearest-focusing position, lens-driving motor MO1 is stopped or is driven in the opposite direction.

Figure 13:
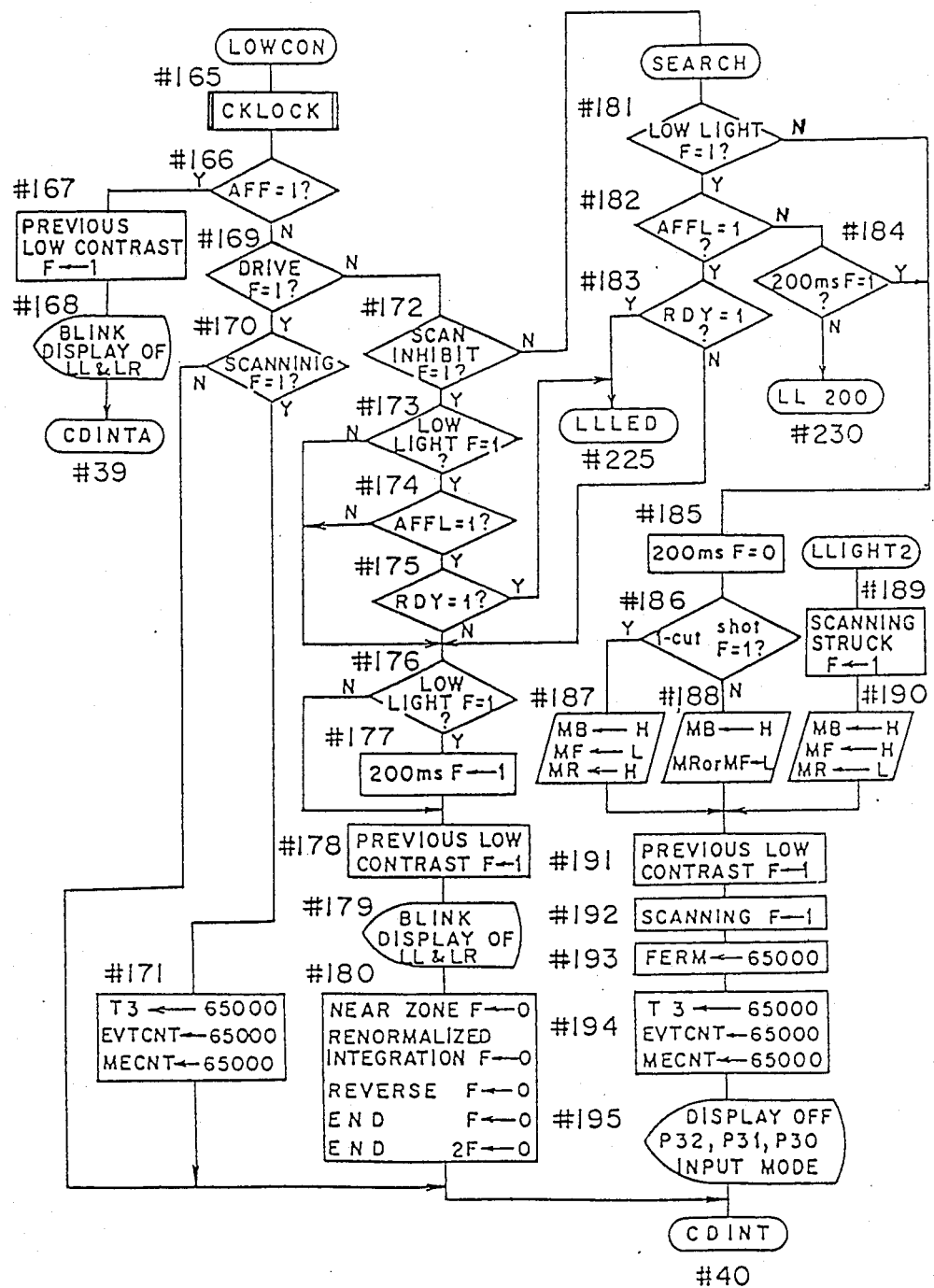

Referring to FIG. 13, a subroutine "CKLOCK" will be described later. At step #75, data for driving the lens is received by serial transmission from controlling microcomputer MC2. Although the same data has been once received at step #33, the same procedure of the serial data transmission is repeated again. This is because the program does not pass through step #33 in the repeating loop, and therefore, if the conversion coefficient for lens driving KROM changes during the operation, or the microcomputer-operation mode is changed, said data will change. In fact, in some type of lens, the coefficient KROM will change relatively to the focusing operation or zooming operation. Therefore, "SIO-SET" is provided at step #75 in order to repeatedly read the same data.

At step #76, the focus-detection calculation is carried out using data from the CCD image sensor FLM, received at step #73. This method has already been disclosed in pending U.S. Pat. Application Ser. No. 570,012 filed Jan. 10, 1984 and assigned to the same assignee as the present application, wherein the defocus value DF can be determined. Since this method is not relevant to the present invention, the description therefor is omitted. In the flow from step #77 to step #85, it is examined whether or not the brightness of the object is lower than the predetermined level. This is detected by the level of AGC data. When the brightness of the object is lower than the predetermined level, the condition is referred to as "low light". In this case, a step #77, the low light flag (low light F in Table 5-2) is set to carry "1". When an electronic flash device is attached to the camera and auxiliary-light switch 41 is closed, signal AFFL, transferred by the serial transmission, becomes "1" and then the program advances to step #79. Thus, if the auxiliary-light emission is ready and the maximum-integration time is set to 100 milliseconds, the condition is determined as low light in the case where the AGC data is either of x2, x4 or x8. In this case, the program proceeds to "MAIN1" (step #86). On the contrary, when the AGC data is x1, the program advances through step #80 to step #85, where the low light flag is cleared to "0", and then to step #86. In the cases where the maximum integration time is set to 200 milliseconds, the condition is determined as low light in all the cases (x1, x2, x4 and x8), so that the program advances from step #80 to step #86.

On the other hand, when the auxiliary-light emission mode is not ready, the program advances from step #78 to step #81. If the maximum-integration time is set to 100 milliseconds, the condition is determined as the low light in the case where the AGC data is either x4 or x8. In this case, the program advances to steps #82, #83, and #86. When the AGC data is x1 or x2, the program advances to step #82 or #83 and then goes to step #85, where the low light flag is cleared, and finally to step #86. In the mode where the maximum integration time is set to 200 milliseconds, the condition is determined as the low light, in the case where the AGC data is either x2, x4 or x8. In this case, the program advances from step #84 to step #86. However, when the AGC data is x1, the program advances from step #84 to step #85, where the low light flag is cleared, and then proceeds to step #86. It is to be noted that the determination of the low light condition done under the case wherein the auxiliary-light emission is ready, is one level brighter than the case wherein the auxiliary-light emission is not ready. This determination is advantageous in the case where an object contrast is low and the brightness is also low so that the focus-detection calculation is impossible and the automatic focus-adjustment operation is also given up. In other words, when the auxiliary-light emission is ready, the mode is switched at the early stage from the mode using no auxiliary light to the auxiliary-light mode.

If the auxiliary-light emission is not ready, the focus detection is carried out only under the ambient light as dark as possible. When it becomes so dark resulting in the low contrast and low brightness, the automatic-focus adjustment is given up and the lens is shifted in. Thereafter the operation stops. In this embodiment, before giving up the focus detection operation, the lens is shifted in and out one more to search the position where the contrast can be detected. This search is described in the flow, "LOWCON" starting from step #165 in FIG. 13. The detection of the object brightness is dependent on the AGC data in this embodiment, however it may be dependent on the integration time. For example, among the flags used in this embodiment, 1-cut shot flag which carries "1" when the integration time for the CCD image sensor FLM becomes longer than 50 milliseconds, may be used.

Figures 11, 11A:
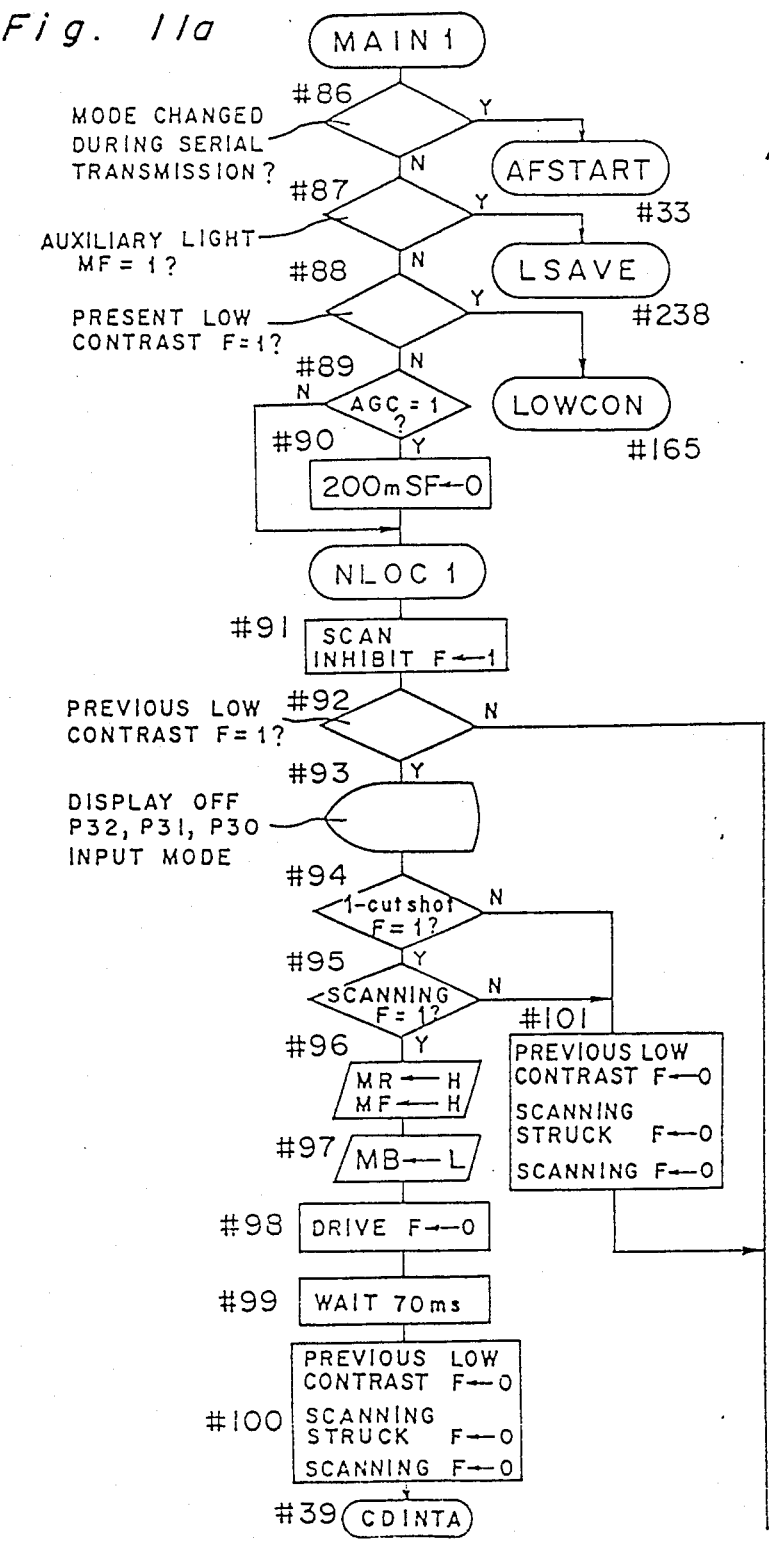
Figure 11B:
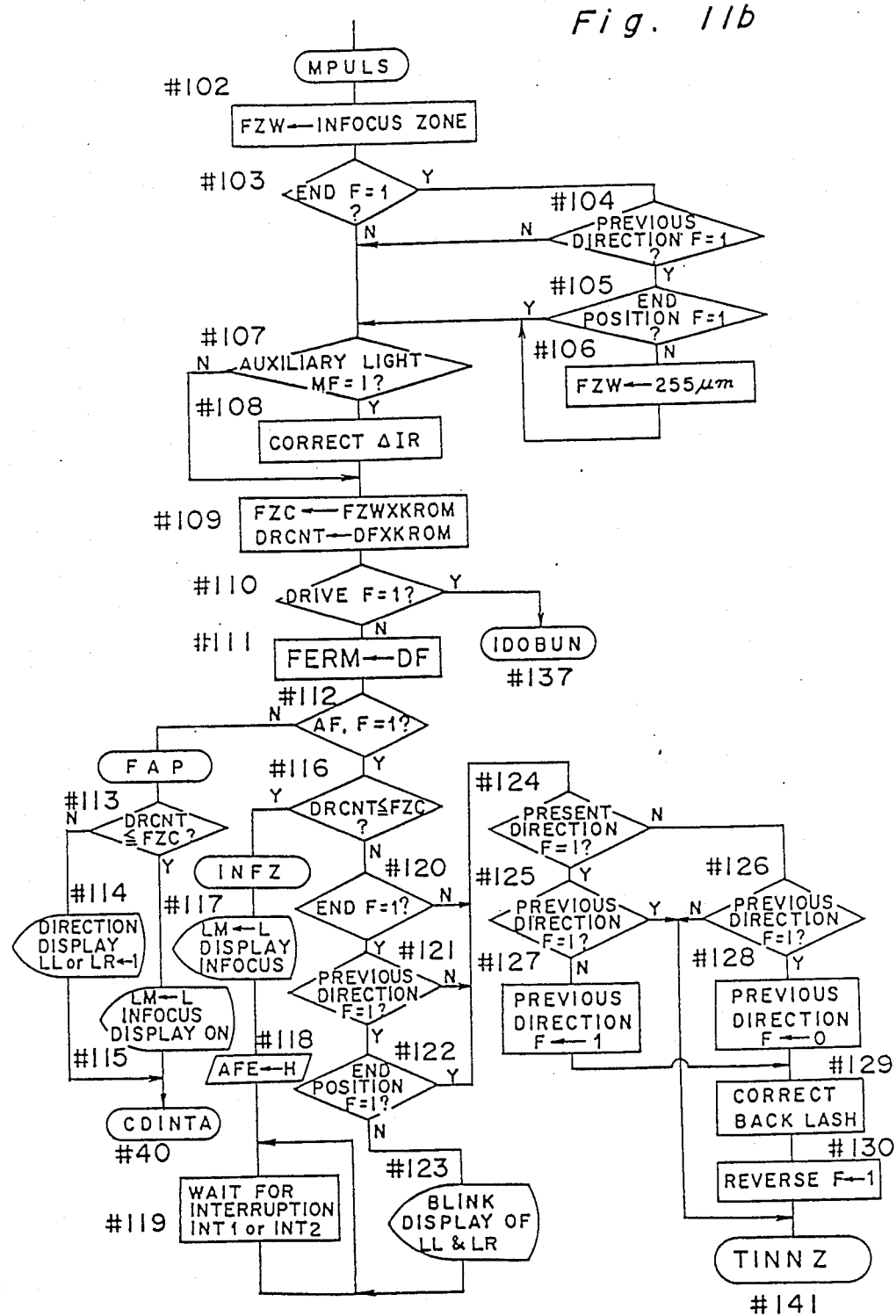
Figures 14, 14A:
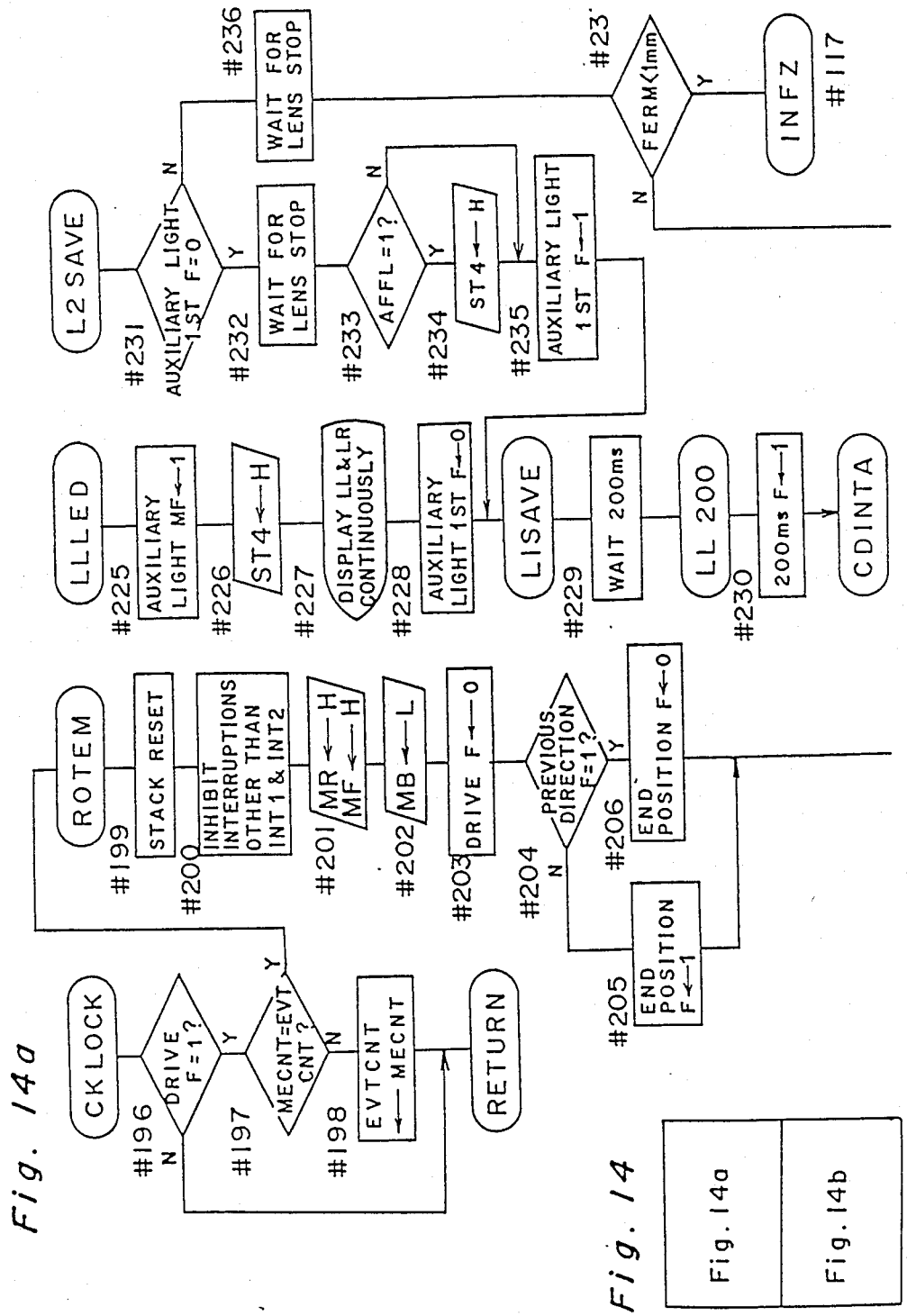
Figure 14B:
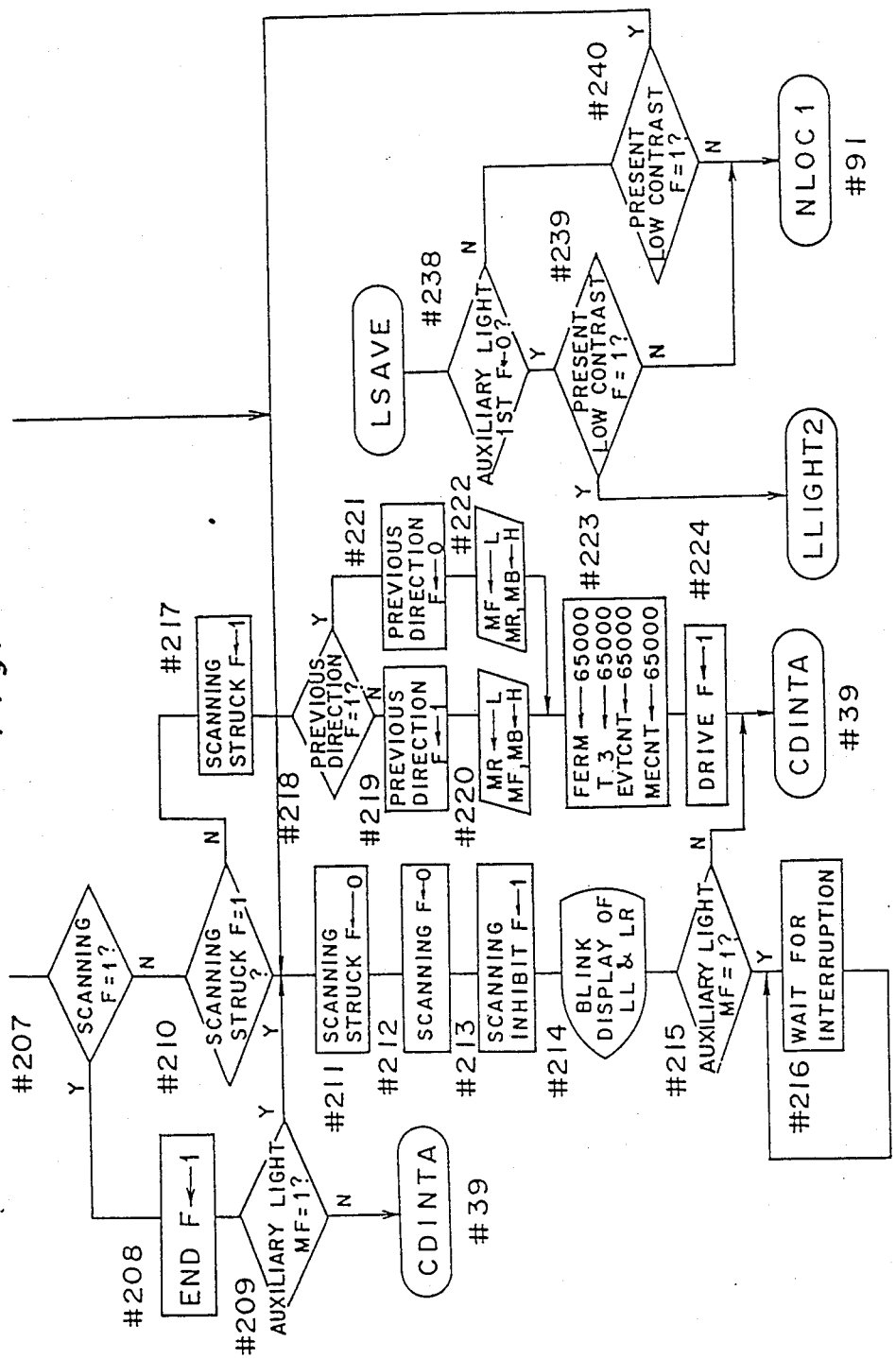

Referring to FIGS. 11a and 11b the adjustment operation of the lens will be described. At step #86, from which "MAIN1" starts, the serial data obtained at step #75 is compared with the mode the microcomputer AF has operated. If the mode is changed, the program restarts from "AFSTART" (step #33). In other word, step #86 compares the content of the register RG set after the previous serial transmission (step #33), and showing either one of the AF mode, the FA mode and the MANUAL mode, and either one of the single frame shooting mode and sequence shooting mode, with the flag for focus detection (AF mode flag, FA mode flag) and the flag DR representing the single frame shooting mode. If there is a change between the content of register RG and the flags, the program advances to step #33. A new mode is automatically written in the mode register RG at step #33. At step #87, it is detected whether the mode is able to carry out the focus detection operation using the auxiliary light, or not. If it is determined that the mode is focus detection mode with use of the auxiliary light (hereinafter referred to as an auxiliary light AF mode) the program goes to step #238 for starting the focus detection flow "LSAVE" that uses the auxiliary light, as shown in FIGS. 14a and 14b. Since the condition for starting the auxiliary light AF mode is such that the object has low contrast and low brightness, this mode enters from step #165 at which the low-contrast flow "LOWCON", shown in FIG. 13, starts.

When it is detected that the program is not under the auxiliary light AF mode, at step #87, the present condition of the present low contrast flag (present low contrast F shown in Table 5-1) is detected to determine whether the contrast calculated for focus detection under this mode is low, or not. If the contrast is determined as low, the program advances to the flow starting from "LOWCON" (step #165) shown in FIG. 13. The present low contrast flag set at step #88 is detected and set at step #76. If it is determined that the contrast is not low, the program advances to step #89 for examining the AGC data, inputted at step #71, shown in FIG. 10. If AGC data is indicated as x1, 200 ms flag is cleared at step #90. This is because it is preferable to have the integration time as short, if possible. If AGC data is set as x1, it is unnecessary to set the program under the 200 millisecond mode. As described previously, if an object is dark, a specific condition is provided where the maximum integration time is set at the 200 millisecond mode. However, the above setting is carried out because a picture element output, in the condition where the integration time is 200 milliseconds and AGC data is set as x1, is assumed to be the same as the picture element output in the condition where integration time is 100 milliseconds and AGC data is set as x2. Also, there is a probability that the image becomes poor as the integration period becomes long due to a movement of a user. In consideration of the above fact, when there is a bit of contrast of the object, the 100 milliseconds mode is selected.

The flow "NLOC1" starting from step #91 is the flow at the time when a sufficient contrast of an object is detected. In this case, the scan inhibition flag is set to carry "1" at step #91. According to the camera system of the invention, once the sufficient contrast of an object is detected, low contrast scan operation is inhibited, while switch "S1" is being closed. Low contrast scan is effected such that the focus detection is carried out by moving the focusing lens in search for a high contrast position when the contrast of an object is low. The reason for inhibiting the low contrast scan is because frequent scannings make an automatic focus adjusting camera inconvenient to use, and in addition, because once a sufficient contrast has been detected there is a great probability that the contrast will be detected again in the vicinity of the position where the lens is placed. In other words, it is inefficient to start the low contrast scan just because the contrast of the object has become low.

Another reason why low contrast scan manipulation is inhibited is that there is a situation in which scanning has been carried out once in low contrast. The flow starting from step #92 to step #101 shows the adjustment made when a clear contrast is found during low contrast scan manipulations. There are two ways to make adjustments: One is when the period of time integrated by CCD image sensor is over 50 milliseconds and the other is when it is below 50 milliseconds. In the former, if an object is very dark, the lens is stopped completely when a contrast is detected during low contrast scan operation and thereafter, focus detection is carried out by moving the lens to the infocus position according to result of the focus detection. While the lens is moving, focus detections are not carried out. This is because, if the lens is moved and the integration period of time becomes long, the image of an object may move, causing a negative influence on the calculated defocus amount. When the integration period of time becomes long and the magnification of AGC becomes great, the noise caused by the increase of dispersion of the dark signal from CCD image sensor. If an object image moves under this conditions correct focusing cannot be carried out.

In the case when the integration period is over 50 milliseconds, focus detections are carried out according to the value which is calculated only when the lens has stopped moving. This method of focus detection is referred to as 1-cut shot mode, which is indicated by a 1-cut shot mode flag in Table 5-1. This flag is already set at step #49 or #59.

A description will be made of a case in which an object is so bright that the integration time period is below 50 milliseconds. Focus detection calculation is carried out by using the data of the clear contrast found during low contrast scanning without stopping the lens. The lens is moved to the infocus position according to the calculated value. Before the lens is set to the infocus position, focus detection calculation is repeated. And then, focusing is carried out by adjusting the lens. The amount of movement of the lens is renewed each time the calculation is carried out. This method of repeating focus detections during lens movement is called multi shot mode in this invention. According to the above described method of focus detection, without stopping the movement of the lens in low contrast scan, the position of the lens is different between the time when CCD image sensor (FLM) is integrated and the time when the shift amount of the lens is determined. The preparation for correcting this difference is carried out in "LOWCON" flow, described below. The detailed description of correcting this difference is omitted herein because it is described detail in Japanese Patent Publication (unexamined) No. 68713/1984 assigned to the same assignee as the present invention.

There is a possibility that the inputted low contrast data comes out even after operation of the multi-shot mode following a contrast found in a low contrast scan. In this case, the inputted low contrast data is ignored and the lens shifts to the position which it supposes is in focus, in accordance with the lens shift amount set before low contrast. The lens is shifted by the inputted contrast data. The judgement of the time when to leave the low contrast condition is carried out by checking the previous low contrast flag (previous low contrast F in Table 5-1). This flag is set in "LOWCON" flow starting from step #165 in FIG. 13 when the previous low contrast calculation was determined. The advance of the program to step #92 means that a contrast is found in the present focus detection. Accordingly, if the previous low contrast flag carries "1" at step #92, it is understood that the program has advanced from low contrast condition and advances to step #93. If 25 the previous low contrast flag carries "0", it is understood that a contrast has already been found and that the program advances from step #92 to step #102 which is the course the program goes through when a contrast is found. At step #93, the indication of focus adjustment is cancelled. This cancellation is carried out when a contrast is found. When the lens is stopped from moving in low contrast, indication of inability to detect focus condition is performed, however, such indication is cancelled since the sufficient contrast for focus detection is detected. If 1-cut shot flag is not set at step #94, the program advances to step #101 without stopping the movement of the lens even if in low contrast. At step #101, the previous low contrast flag, scanning struck flag (scanning struck F in Table 5-1) and scanning flag (scanning F in Table 5-1) are all cleared. This resets the flags showing that low contrast scan has been carried out or that the lens is scanning. The scan inhibition flag is not reset at this time.

The program is now under the 1-cut shot mode at step #95 and detects whether or not the program has advanced to the low contrast scanning stage by detecting the scanning flag. If scanning has not been carried out, the program advances to step #101 to move the lens in accordance with the present calculation. If scanning is being carried out, the lens driving motor "M01" is de-energized at steps #96 and #97 to stop operation according to the signal pattern shown in Table 6. The drive flag (drive flag F in Table 5-2) is cleared at step #98 to memorize the condition when the lens has been stopped. It takes 70 milliseconds for the lens to make a complete stop, at step #99. The flag at step #100, having a function similar to the flag, at step #101 is cleared. Thereafter, the program returns to "CDINTA" (step #39) and the next focus detection is carried out. The reason for waiting performed at step #99 is to prevent an object image from moving when it takes a long time for a sensor to integrate and the lens is moving. Also it is possible to obtain a connect focusing if the next sensor integration starts after the movement of the lens has been completely stopped. Otherwise, an exact correction of an error between an integrated data and shift amount of the lens is difficult when the lens is shifting at negative acceleration.

The following flow is "MPULS" which converts the defocus amount of the calculation for focus detection to a pulse count value for driving the lens. The defocus range, that is, the range in which an image can be focused is set in the register FZW as the infocus zone at step #102. It is to be noted that the in-focus zone range of the automatic focus adjustment condition (AF mode) is distinguished from the in-focus zone range of the focus adjustment indication condition (FA mode). A wider range of values are set at the FA mode than at the AF mode. The flow from steps #103 through #106 is the flow when the lens stops movement at termination. The end flag (end F in Table 5-2) at step #103 is set in termination detection subroutine to which the program has proceeded. When the lens stops movement at the termination, the program advances to step #104, and the direction in which the lens was shifting is checked by detecting the previous direction flag (previous direction F in Table 5-3). When the lens is in infinite focusing position and it is detected that the infocus point of the lens is further infinite side, the program advances to step #105. In this case, detection on whether the termination position is infinite or nearest is carried out at the end position flag (end position F in Table 5-2). If the end position is infinite, the program advances to step #106 and the infocus zone is determined at as great as 255 μm. If the position of the lens is at nearest focusing position, the program advances to step #107. In this system, there is a possibility that the calculation result indicates that the infocus point of the lens is located at a further infinite focusing position, due to the stagger of focus detection data, even when the lens is already located at the infinite focusing position. This may happen when a narrow in-focus zone is set. Also, the infinite focusing position of the lens now being set may not be the true infinite focusing position because the lens movement is interrupted by an external force. In the present embodiment, the above errors can not be distinguished. Thus, according to the present embodiment, if the lens is located at the infinite focusing position, but the calculated result indicates that the in-focus point is located further on the infinite side, the infocus zone is widened as great as 255 μm. If the infocus point of the lens is detected to be within this zone, an infocus indication is carried out. If not, an indication (on/off indication of LEDs) that the infocus point cannot be detected is carried out. This is to carry out an on/off indication of the LED if the point where the lens has stopped moving is not in the infocus zone when the focal point of the lens is about to move towards an infinite point during an automatic focus adjustment and forced to stop movement at this time. The indication flow of this corresponds to step #120 through step #123.

When the lens is located at the nearest focusing position, but the object is located at a further near to the camera, or when the lens located at an intermediate position cannot move to a further near focusing position by some hindrance, an indication is produced, requiring the lens movement further toward the nearest focusing position, provided that the lens is not located in the infocus zone. The flow for indicating the above operation corresponds to steps #147 through #152 in FIG. 12. When the lens is not located at the infinite focusing position, the program advances to step #107 with the infocus zone data set at step #102.

At step #107, it is detected whether or not the auxiliary light AF mode has been set in accordance with the auxiliary light mode flag. If it is found that the program is under the auxiliary light AF mode, chromatic abberation correction is carried out at step #107. Because the light to be used for the illumination light under the auxiliary light AF mode is near the infrared wavelength, the focal point was a gap during flash photography due to the difference of wavelength between the auxiliary light and the flash light. Accordingly, the focal point gap amount must be corrected if program is under the auxiliary light mode. The corrected data IR to correct the gap above case is sent from the control microcomputer MC2 by means of a serial signal as shown in Table 4. This data is calculated at step #108 relative to the defocus amount DF previously obtained. The defocus amount is converted to a pulse count value for shifting the lens, at step #109. The coefficients for the conversion are different from a lens to lens. Accordingly, the data KROM serially transmitted is used as in the case of the above data ΔIR. The pulse count value DRCNT for shifting the lens is obtained by multiplying the conversion coefficient KROM by the previously obtained defocus amount DF. The infocus zone FZW is converted to a pulse count value FZC by multiplying data KROM by FZW. The description of the conversion to these pulse count values is omitted herein because such is described in detail in U.S. Pat. No. 4,509,842 assigned to the same assignee as the present invention.

Whether or not an automatic focus adjustment operation is being made is detected at step #110 based on the data of the drive flag (drive F in Table 5-2). When it is detected that the lens is driven, the flow jumps to "IDOBUN" (step #131). When it is detected that the lens is not driven, such as in the case when the program starts for the first time, when the infocus position is acknowledged after an automatic focus adjustment has been made, or when FA mode has been set, the program advances to step #111. The defocus amount DF while the lens has stopped its movement is stored at the memory FERM (step #111). The stored defocus amount will be used in a later stage for determining whether or not the program should advance to the loop for acknowledging the infocus position after an automatic focus adjustment has been made. At step #112, the detection is carried out to determine whether or not the FA mode has been set, in accordance with FA mode flag. If the program is under the FA mode, the program goes to "FAP" (step #113), which means that if the program is not under the AF mode, the program is under the FA mode.

Step #113 detects whether or not the lens is within the infocus zone. The detection carried out at #113 is made by comparing the lens driving pulse count value DRCNT with the infocus zone pulse count value FZC. The detection may also be carried out by comparing the defocus amount DF with the infocus zone amount FZW. If the procedure "FAP" at step #113 detects that the lens is within the infocus zone, infocus indication is carried out at step #115. This indication is carried out by rendering the intensity signal LM of terminal "P31" "LOW" and by lighting only the center LED LEDM with the signals intensity of LL and LR rendered "HIGH". If "FAP" detects that the lens is outside the infocus zone, the program advances to step #114 where the direction in which the lens should be driven is shown. For example, if lens is shifted outwardly, the left LED LEDL is lit with signal LL of the terminal P32 rendered "LOW". If the lens is shifted inwardly right LED LEDR is lit with signal LR of the terminal P30 rendered "LOW". The program is looped to "CDINTA" (step #40) for the next focus detection.

When the program is under the AF mode at step #112, a detection is carried out at step #116 whether or not the lens is in or out of focus. When the lens driving pulse count value DRCNT is smaller than the infocus zone pulse count value FZC, it is determined that the lens is infocus. The program advances to "INFZ" (step #117). The indication that the lens is infocus is carried out at step #117 like the case of step #115 under the FA mode. At step #118, the intensity of the signal AEE of the terminal P12 is rendered "HIGH". The control microcomputer MC2 detects this signal and determines that the automatic focus adjustment has been completed when the signal AFE becomes "HIGH". When the program is in the AF priority mode, it is not until the signal AFE becomes "HIGH" that a release operation is carried out. Step #119 waits for the interruption of INT1 or INT2. This method is the one-shot AF operation mode under which an automatic focus adjustment is carried out only once upon closure of the switch in FIG. 2. In this one-shot AF operation mode, infocus indication is not changed and the lens is not driven again, even if an object to be focused is changed after focus adjustment is completed once. Also, an automatic focus adjustment is carried out by the following method; Instead of allowing step #119 to be interrupted, the program is returned from step #119 passing to "CDINTA" (step #39) or to "CDINT" (step #40) whereby focus detections are repeated and automatic focus adjustments are carried out by always following an object, i.e., continuous AF operation mode.

When it is detected that the lens is not located in the infocus zone at step #116, the program advances to step #120. As described above, the end flag (end F in Table 5-2) is examined at this stage. If the program detects that the end flag is set (step #120), the program advances to step #121 at which the previous direction flag is checked. If the result is such that the infocus position is located further toward the infinite focusing position, but the position where the lens has stopped moving is at the infinite focusing position (step #122), the program advances to step #123, at which without driving the lens, two LEDs LEDL and LEDR, located at both sides, are switched on and off so as to indicate that focus detection cannot be performed. Step #119 waits for an interruption and the next focus detection is discontinued any longer. The program advances to step #124 except for the above described conditions.

Reverse of the detected direction of defocus is checked in the procedure from step #124 to step #130. In other words, this is to correct the backlash amount of the lens if it is determined that defocus direction should be reversed by comparing the previously calculated defocus direction calculated in the present loop. The coupler portion for transmitting driving force to the lens from the camera body has a predetermined play. Because of this construction, when the drive direction of the lens is reversed due to e.g., the change of the detected amount of defocus, the lens cannot be shifted to the calculated infocus position due to the idling of motor "M01". Therefore, it is necessary to correct the calculated result of the backlash amount. Each photographic lens has different backlash values which is obtained through serial transmission. The above described defocus direction in the first loop after the closure of switch S1 is memorized as the last drive direction of lens in the previous sequence, that is, the defocus direction is memorized even when microcomputers MC1, MC2 are in the stop mode before switch S1 is closed. This backlash correction is carried out not immediately after the obtaining of the calculated result indicating that the focus direction has been reversed, but while the lens is not moving. When it is detected that the lens should be moved in the reverse direction, the lens does not move immediately in the reverse direction, but it merely stops. Also, the previous direction flag will not be set. The backlash correction can be carried out only when the calculation result of the next focus detection as carried out after the lens stop indicates that the lens should be moved in the reverse direction. This operation is carried out in view of a possible deviation of the calculated result in the vicinity of the infocus position, more particularly, this is to prevent the lens from making a hunting operation for the correct infocus position due to errors in calculating the backlash amount.

Figure 12B:
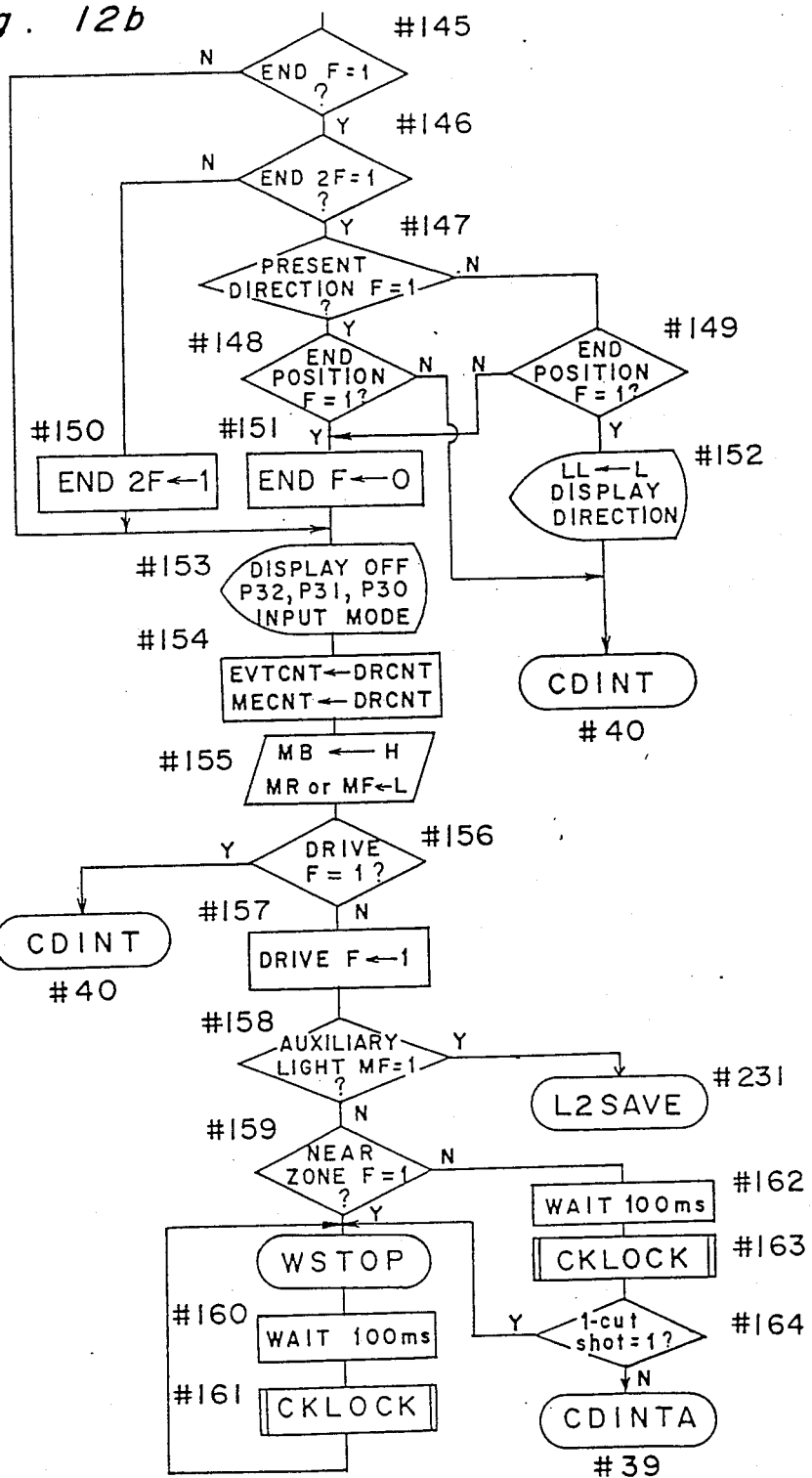

The flow on the above mentioned phenomenon is accomplished by the combination of steps #124 through #130 and step #134 through #140 in FIG. 12, which is the steps carried out while the lens is moving. After the present direction flag (the present direction F in Table 5-3) is examined at step #124 and the present defocus direction is examined, and, or the other hand, the previous defocus direction is examined at step #125 and #126. If the previous defocus direction is different from the present one, the flows advance to step #127 and #128, respectively so as to rewrite the previous direction flag. If the previous is the same as the present, the program skips to "TINNZ" (step #141). At step #129, correction data "BKLSH" for backlash sent through serial transmission is corrected relative to lens drive pulse count value DRCNT and at step #130 the reverse flag (reverse F in Table 5-2) indicating backlash correction by reversal is set, and thereafter, the program advances to step #141.

With reference to FIG. 12, the description will be made of the flow "IDOBUN" (step #131) which branches from step #110. At step #131, from which the flow starts, it is determined whether or not the lens has reached at the termination is examined. Step #132 reads the third event count value "EVTCNT" whereby correction the amounts of lens shift is carried out. The value read at step #132 is memorized at register T3, which accomplishes memory of all the data for shift amount correction of the lens. The data mentioned includes T1 (memorized) at integration starting time, T2 at the integration finishing time and T3 at the focus detection calculation finishing time by the sensor. By using these three values, a calculation of focus detection by picture element data obtained by integration and the amount of lens shift before the calculation is finished and the amount of lens shift is set. The lens shift amount Tx, obtained in pulse count is during integration, is $Tx = T1 - T2$, where $T1 > T2$ and Tx is positive because the event counter is subtracted. The lens shift amount Ty for the period of time for calculating focus detection is obtained by the equation $Ty = T2 - T3$. Assuming that the lens shifts at a constant velocity and the middle point during the sensor integration period is taken as the position where the data of an object has been obtained, the shift amount Tz of the lens is obtained by the following equation $Tz = Tx/2 + Ty$. The lens shift amount correction is made by subtracting Tz from the count value DRCNT obtained in the present calculated value. The next procedure replaces DRCNT−T2 with DRCNT, at step #133, which is the value to be set as the next lens drive pulse count value.

The flow from step #134 through #140 shows, as described above, that the defocus direction is reversed during lens movement. At step #134, the present direction flag and the present defocus direction are detected. At step #135 and #136, the previous defocus direction are detected by checking of the previous direction flag. If it is detected that the direction is reversed, the program advances to step #137. If not, the program advances to step #141. At step #137 and #138, the lens driving motor MO1 is de-energized and brakes the operation of the motor. At step #139, a drive flag indicating that the lens is being driven is checked. At step #140, the program waits for 70 ms until the lens stops shifting and thereafter advances to "CDINTA" (step #39).

"TINNZ", starting from step #141, is the flow started when the lens is being shifted and is stopped, where the lens drive pulse count value DRCNT is set and the lens is driven. The velocity for driving the lens according to this embodiment is based on a two speed system; The lens shifts at high velocity when it is far away from the infocus position and at low velocity when it is near the infocus position. The portion controlling lens at low velocity is called "near zone." At step #141, whether or not the lens drive pulse count value DRCNT is within the pulse count value NZC representing the near zone. If the lens is in the near zone, the program advances to step #143 and the near zone flag (near zone F in Table 5-2) is set. At step #144, the signal MC sent from the terminal PO3 produces "LOW" and the lens drive motor MO1 is driven at a low velocity, as shown in Table 6. If the lens is outside the near zone, the program advances to step #142 and the signal MC is set to carry "HIGH" to drive the lens drive motor MO1 at a high velocity.

The flow from steps #145 through #152 is the flow performed when the lens stops at the end position. Part of this flow has already been described. The detection of whether or not the lens has moved to the end position is carried out not by a switch but by the judgement that no further pulse is sent for a predetermined time to the interruption port INT3 from the encoder ENC which monitors the motor driven amount inputted. This judgement will be described below in connection with the subroutine stating from "CKLOCK" in FIG. 14. In summary, if the lens stops shifting, but the motor is still being driven, it can be so judged that the lens has reached the end position, thereby stopping the motor and setting the end flag. According to this method, the termination to the end will be judged even when the lens is not reaching the end position such as when it is forced to stop for a short time (several 100s milliseconds order) on the way to the end position.

To prevent this, even if the lens stops for the first time, another trial to move the lens is effected. The termination of the lens at its end position is actually determined when the subroutine "CKLOCK" defects again for the second time that the lens has reached the end position. The end 2 flag (end 2 F in Table 5-2) detects this. At step #145, if the end flag (end F in Table 5-2) set is set to carry "1" in the subroutine "CKLOCK", the end 2 flag is detected at step #146. Because the end 2 flag is set to carry "0" at the initial condition, the program advances to step #150 where the end 2 flag is set and the lens is driven by the lens driving flow from step #153. When the program advances to step #146 in the next loop, it is determined that the lens has reached the end position, and thereafter, the program advances to step #147.

At step #147, the present defocus direction is examined and the end position flag is detected at steps #148 and #149, to determine at which end position the lens has reached, when the present defocus condition is in a front focus condition (present direction flag=1) and if the lens is located at the infinite focusing position, the lens must be driven toward a further infinite position. In this case, the program advances from step #148 to step #40 and as described above, so that the infocus zone is enlarged and examines the infocus condition at the next loop starting from "CDINT".

When the present defocus condition is in a rear focus condition (present direction flag=0) and if lens is located at the nearest focusing position (end position flag=1), the lens must be driven further toward the near focusing position. In this case, the program advances from step #149 to step #152 to produce "LOW" for the LL signal and direction indication from terminal P32 thereby turning on a light that indicates that the lens should be driven toward the nearest focusing position. Next, the program advances to the next loop starting from step #40 to repeat focus detection with the lens has stopped moving. When the object position changes and the defocus direction is reversed, the program advances from step #147 to step #148 and step #151 in the loop and thereafter, clears the end flag and starts the lens driving loop which begins from step #153. The present direction flag is used to check the defocus direction of step #147 in this embodiment, but the previous direction flag may be used. In this case, the lens remains stopped when an object shifts from the present nearest position than the previous focus position to the zone where the lens can focus. The latter is suitable for a one shot AF operation mode, and the former is suitable for a continuous AF operation mode.

In the latter case, when the low contrast condition is detected once, the end flag is cleared in the flow "LOWCON" (step #165) shown in FIG. 13, thereby enabling the lens shift from the nearest focusing position. Thus, the lens can be driven again, and the automatic focus adjustment becomes possible. When the lens is not positioned at the end or when the lens is positioned at the end but is about to shift in reverse, the program advances to the lens driving flow starting from step #153 in FIG. 12. At step #153, LEDs indicating the focus adjustment condition are all switched off. This switch-off is carried out based on the principle that the defocus direction indication is not performed while the lens is being driven. In the condition where the lens has stopped moving, when the lens is infocus, infocus indication is carried out by way of switching on the centrally positioned LED "LEDM", and when the lens is moved to the nearest or infinite focusing position, LED "LEDL" or "LEDR" is switched on, respectively, to indicate the defocus direction, and when in low contrast condition is detected, LEDs LEDL, LEDR are switched on or off repeatedly. At step #154, the lens driving pulse count value DRCNT is set at both the event counter EVTCNT and the terminal checking register MECNT. The value DRCNT set at the event counter EVCNT is subtracted in the interruption flow (INT3S in FIG. 16) when the pulse sent from the encoder ENC is inputted and the AF microcomputer MC1 is interrupted. Thus, the lens is focused by stopping the lens from moving when the count value DRCNT becomes "0".

At step #155, the lens driving motor MO1 is energized to drive the lens. The lens is driven according to the previous direction flag; this flag remains set to record the previously driven direction. This is because the content of the previous direction flag is the same as the present direction flag caused by the flow from step #124 in FIG. 11 when the lens has stopped moving. When the previous direction flag is set to carry "0" (rear focus condition), the signal MF sent from the terminal PO1 is rendered "LOW" to shift the lens, as shown in Table 6. When the previous direction flag is set to carry "1" (front focus condition), the signal MR sent from the terminal PO0 is rendered "LOW", thereby to drive the lens shift inwardly. At step #156, the drive flag is examined to determine whether or not the lens has been driven. If the lens has been driven ("has been driven" means that the lens has been automatically adjusted out of the near zone, the description of which will be given below), step #156 is looped to "CDINT" (step #40) to detect the next focus detection. If it is found that the lens has not been driven, the drive flag is set at step #157 because the lens has started moving. At step #158, the auxiliary light flag is examined to determine whether or not the program is under the auxiliary light AF mode. If under the auxiliary light AF mode, the program branches to "L2SAVE" starting from step #231 in FIG. 14. If not, the near zone flag is examined to determine whether or not the lens is being driven in the near zone at step #159. If the lens is driven in the near zone, the program advances to "WSTOP" starting from step #160. At steps #160 and #161, terminal checks are repeated at the interval of 100 ms and the program does not return to the next focus detection loop. It is not until the lens makes a complete stop at the infocus position that the lens shifts to the focus point.

While the program is looping "WSTOP", "INT3S" (step #252) interrupts the "WSTOP" loop, thereby, to control the lens.

The reason lens focus detection is not carried out in the near zone while the lens is shifting, is as follows: The lens does not shift at a constant velocity, but at an accelerated velocity in the near zone, that is, when the lens has begun to be driven to shift, the lens shifts at a positive velocity and before the lens stops shifting the lens shifts at a negative velocity. When the velocity of the lens becomes low in the near zone, the lens shifts at a negative velocity. The near zone count amount NZC is determined based on the velocity value counted from the cut off of the power to motor MO1 until the actual stop of the lens. This value is not for the zone where the motor is driven at a constant speed. The description that the motor is not driven at a constant speed means that in spite of the integration of the sensor the middle point of integration period is not represented as the point where an object data have been obtained. Accordingly, the above described shift amount correction is not an exact correction, resulting in a miscalculation of the lens drive pulse. Therefore, it is preferable not to integrate the sensor output when the lens is not shifting at a constant velocity. In this embodiment, focus detections are not carried out when the lens is shifting at an accelerated velocity or at a decreased velocity.

When it is detected that the lens is not in the near zone at step #159, the program branches to step #162 and waits until the velocity of the lens, which has been accelerated at the start time becomes constant. The waiting time is 100 ms. At step #163, a terminal checking is carried out. Neither exececssive long nor excessive short period checking is good for terminal checking. If the period for checking is shorter than the encoder pulse interval corresponding to the lens shift, it may be detected that the lens has stopped shifting, whereas if longer, there will be problems with motor, gear, clutch and the like and also problems in making a quick reverse drive. Therefore, the waiting period is from about 10 ms to 200 ms. At step #164, the 1-cut shot flag is examined. If under 1-cut shot mode, the program advances to step "WSTOP" (at step #160) since the mode is not the mode which does not detect focus condition while the lens is shifting. At step #160, the program waits until the lens stops shifting and a focus detection is carried out to determine whether or not the lens is infocus zone when the lens stops shifting. If the program is not under 1-cut shot mode, the program loops to "CDINTA" (step #39). This is the end to the description for the main routine of the automatic focus adjustment.

The description will be given to the branch routine and the subroutine shown in FIG. 13. "LOWCON" flow starting from step #165 in FIG. 13 is the flow to which the program branches from step #88 of the main routine when the focus detection calculates low contrast. After examining terminal checking at step #165, it is examined whether or not the program is under the AF mode, at step #166. If under the AF mode, the program advances to step #167 and the previous low contrast flag is set. To indicate low contrast at step #163, the switch-on and off indication LED ("LEDL" and "LEDR") is carried out by repeating the indication of "LOW" and "HIGH" with respect to signal LL of "P32" and LR of "P30". Thereafter the program loops to detect the next focus condition. If not under the AF mode, the program advances to step #166 to #169 to examine whether or not the motor MO1 is in operation by checking the drive flag. If the motor is in operation, scanning flag is examined to distinguish low contrast scan from the low contrast during an automatic focus adjustment. If it is detected that the program is carrying out an automatic focus adjustment, the program immediately advances to "CDINT" (step #40) and carries out the next focus detection because the result of low contrast is ignored until the lens is stopped from shifting as described above. When the program advances to step #170 during low contrast scanning, the program advances to step #171 so as to escape the low contrast and the event count value T3 is set to carry the maximum count value 65,000, upon completion of calculation for correction of shift amount of the lens at the time of integration when an automatic focus adjustment is started. (A detailed description will be described below.) Also motor driving event count value EVTCNT and terminal detecting count value MECNT, are set to carry the maximum count value, 65,000. The program loops to "CDINT" (step #40).

When the contrast of an object image becomes low while the lens stops, the program advances from step #169 to step #172. When the scan inhibit flag, indicating the inhibition of low contrast scanning, is set, the program advances to step #173. The setting of a scan inhibit flag indicates that the low contrast scanning has been terminated once, or that contrast has appeared.

Steps #173 to #175 and #181 to #183 are those steps which judge whether or not the program enters the auxiliary-light AF mode. The conditions whereby the program can enter the auxiliary-light AF-mode are as follows: AF mode is set; the object has low contrast; the lens is stopped and low light; an electronic flash device equipped with an auxiliary-light emitter is mounted on the camera (FIG. 3); the AFFL signal is present showing that the auxiliary-light emission is ready; and RDY signal is present showing that the charge is completed. The program does not enter the auxiliary-light AF mode until these conditions are satisfied. The low light flag at step #173, the OK signal AFFL of auxiliary-light at step #174, and the charge completion signal RDY at step #175 are detected, and when all these signals carry "1", the program goes to step #225 for starting the procedure "LLLED" for the auxiliary-light AF mode. If these conditions are not satisfied, it is necessary to check the state of low light on the basis of the low light flag at step #176, and if it is detected as the low light, the program goes to step #177 to double the sensor's maximum integration time to 200 ms. If AGC data is set at x8 with an integration time set at 100 ms, and when the object has low contrast and low light, an increase in the integration time by one step may result in the withdrawn of the low contrast state, thereby enabling the focus detection. However, because the focus detection may result in the error detection when the detection is carried out while the lens is driven with a long integration time, it is so determined that the maximum integration time of 200 ms mode is available only at the time when the lens is stopped.

The previous low contrast flag is set at step #178; the flashing indication of the LEDs LEDL and LEDR shows the state of low contrast performed at step #179; the near zone flag, the renormalized integration flag (renormalized integration F shown in Table 5-1), the reverse flag, the end flag, and the end 2 flag are cleared at step #180. Thereafter, the program loops to "CDINT", at step #40.

If low contrast scanning is not prohibited at step #172, the flow advances to "SEARCH" starting from step #181. The flow from step #181 to step #183 is provided for starting the low contrast scanning. First, the flow of steps #181 to #183, similar to that of steps #173 to #175, detects whether or not the condition for entering the auxiliary-light AF mode. When the condition is satisfied, the program follows the procedure "LLLED" at steps #183 to #225 and enter the auxiliary-light AF mode control. Although the object is in the condition of low light, there may be a case when the auxiliary-light emitter is not yet ready, and therefore, AFFL signal is not yet carrying "1". In such a case, the program advances from step #181 through step #182 to step #184 where it is checked whether or not the maximum integration time is set as 200 ms.

If the maximum integration time is not set as 200 ms, the program advances to "LL200" at step #230 shown in FIG. 14, thereby setting the 200 ms flag. Then, the program goes to "CDINTA" at step #39. There are cases when the object has low contrast as detected in spite of the maximum 200 ms mode at step #184, or when the object has not low light as detected at step #181 but low contrast. In such cases, the program advances to step #185 to clear the 200 ms flag.

The 200 ms flag is cleared, and the maximum integration time is set at the 100 ms mode, because of the following reasons. When the integration time is long while the low contrast scan is effected, as mentioned above, the object image flows and is liable to be in low contrast. Another reason is that when the integration time and the focus detection time are maximum, the lens may have moved past the infocus zone before the focus is newly detected at the next stopped point of the lens, that is, it is possible that there exists a lens with a large drive ratio.

Next, the method of starting the lens scan at low contrast scanning is determined by the flow of step #186 to step #190. When the object is bright, low contrast scanning starts in a direction determined by focus-detecting calculation. In some cases, the defocus direction is determined even if the defocus amount is not determined because of a low contrast decision. Thus, scanning occurs according to the calculated direction. When the lens moves to the area where the defocus amount can be determined, during this low contrast scanning, it starts automatic focus-adjustment, as mentioned above. When the lens is shifted to one end, its movement is reversed, and then, when the lens is shifted to the opposite end, the scanning operation ends. The degree of luminous intensity of the object is checked by using the 1-cut shot flag which judges whether or not the integration time is above 50 ms. The degree can be checked also by using AGC data. It may be judged as dark, when the AGC data represents magnification greater than x2, x4 or x8. On the other hand, when the degree of luminous intensity of an object is judged as dark, the program advances step #187, and low contrast scanning is started by moving the lens first outwardly. In this way, the position of the final lens stoppage at the conclusion of low contrast scanning ends, and the position corresponds to the infinite focusing position. This implies that lens-movement terminates in the inserted position, making the lens compact and convenient for stopping.

At this flow, if the purpose is more weighted on the point to end the operation with the lens moved to the inserted position than to find the contrast, it may be so arranged that the program advances not to step #187, but rather to "LLIGHT2", at step #189. In other words, the scanning struck flag (scanning struck F) which represents that the lens has struck the end once, is set at step #189, and then the MR signal is rendered "LOW" at step #190 to start the low contrast scanning in the inserting direction of the lens. When the lens strikes the infinite focusing position, the scanning struck flag set at step #189 is detected in the flow of "ROTEM" starting from step #199 shown in FIG. 14, thereby detecting the end of the scanning operation. Then, the lens stops. "LLIGHT2" is the flow effected during the flow of the auxiliary-light AF mode.

At step #191, "1" is set in the previous low contrast flag, and at step #192, the scanning flag is set. At step #193, the defocus amount FERM is set to a maximum 65,000 when the lens stops. At step #194, T3, EVTCNT, and MECNT are set to a maximum 65,000. At step #195, the indication is erased before the lens moves. Then, during scanning, the program returns to the next focus detection loop at step #40.

Next, the end check subroutine "CKLOCK" will be explained (FIG. 14). At step #196, the drive of the lens is checked by confirming the drive flag indicating the drive of the lens. When the lens is not moving, the program returns without checking the termination of the lens to the end. When the lens is driven, the program advances to step #197 and checks the lens termination to the end. During the lens movement, the content of the register MECNT for checking the lens termination, which was set with the same value as for the count value DRCNT of lens driving pulse is compared with the count value EVTCNT of the event counter, which was set as the count value DRCNT for lens driving. While the lens moves, one is subtracted from the value of EVTCNT every time the pulse is entered from the encoder ENC. Thus, the values differ from those of MECNT. When the lens strikes the end and stops, the pulse is not entered from the encoder ENC. Thus, the values of EVTCNT remain unchanged, maintaining the same value as the that of MECNT. Therefore, the lens is judged as not moving if it is detected that MECNT=EVTCNT at step #197. Then, the program advances to step #199, from which an end processing flow "ROTEM" starts. If MECNT≠EVTCNT, it is detected that the lens is moving. In this case, the program advances to step #198. At step #198, the value of EVTCNT is shifted to MECNT to prepare for the next end check. Then, the program returns to the main flow.

The terminal processing flow "ROTEM", from step #199, is separated from the subroutine first. Thus, the stack pointer of microcomputer is reset in advance. At step #200, interruption is prohibited except for INT1 and INT2. When it is assumed that the lens strikes the end, the electric power to motor MO1 is cut and the brake is applied to the lens at steps #201 and #202. At step #203, the drive flag is cleared due to the switching-off of the motor. At step #204, the previous direction flag is checked. If the flag is "0" (rear focus condition with the lens being shifted toward the nearest focusing position), "1" is set on the end position flag indicating that the lens is shifted to the position corresponding to the nearest focusing position, at step #205. If the flag indicating the previous direction is "1" (front focus condition with the lens being shifted toward the infinite focusing position), the end position flag is cleared indicating that the lens is shifted to the position corresponding to the infinite focusing position, at step #206. At step 207, it is examined whether or not the lens strikes the end of the scan during low contrast scanning. If the lens is reached to the end during low contrast scanning, the program advance to step #208 so as to set the end position flag indicating that the lens stops at the end of the scan. At step #209, it is further examined, based on the auxiliary light mode flag, whether or not the program is in the auxiliary-light AF mode. If the program is in the auxiliary-light AF mode, the next focus detection will not be carried out after the lens striking the end, even if the focus detection is made by the first auxiliary light emission. In this case, the flicker indication by the LED is performed to indicate the end the focus detection. The auxiliary-light AF mode operation will be described in detail in connection with flow "LLLED" starting from step #225. If the program is not in the auxiliary-light AF mode, it advances to the next focus detection loop "CDINTA" with the lens being terminated at the end of the scan.

When the lens comes to the end as detected at step #207 during low contrast scanning, the program advances to step #210, and it is checked whether or not the lens has ever struck the end during scanning, that is, whether the lens is moving toward the nearest focusing position or the infinite focusing position. If it is moving toward the nearest focusing position, program advances to step #217 to reverse the scanning direction. Since the lens has, at this time, come to the end, at step #217, the scanning struck flag is set. Next, the previous direction flag (indicating the direction of lens drive) is checked at step #218, and the flags are so set as to indicate reverse direction at the respective steps, #219 and #221. Then steps #220 and #222, the lens drive signal MR or MF produces "LOW" in accordance with the detected lens drive direction in the next scan. At this time, the brake signal MB is, of course, kept "HIGH". Then, the reverse drive of the lens is initiated. In the same manner as for the initiation of low contrast scanning, FERM, T3, EVTCNT, and MECNT are kept at a maximum 65,000, at step #223. At step #224, "1" is set on the drive flag, and the program advances to the next focus detection loop "CDINTA".

On the other hand, when the lens has struck the end for the second time, the program advances from step #210 to step #211. Since low contrast scanning defined by one outward and inward movement of the lens is now completed, the lens will not move any more. The scanning struck flag indicating that the lens has struck the end is cleared, at step #211. Then the scanning flag is cleared at step #212. Next, the scan inhibit flag is set at step #213 because once the scanning is completed no more scanning is necessary. The LED flicker indication is performed at step #214 indicating that, despite low contrast scanning, the focus detection could not be succeeded because sufficient contrast could not be found. Examination is made at step #215 as to whether or not the mode is in the auxiliary-light AF mode. If the mode is the auxiliary-light AF mode, the program advances to step #216 but does not start the next focus detection. Then, the program ends and waits for interruption. If, at step #215, the mode is not in the auxiliary-light AF mode, the program returns to "CDINTA" at step #39 after completing the scanning, so as to repeat focus detection by moving the lens from the end position. The above-mentioned flow end detecting routine is the program for detecting the termination of the lens at the end of the scan.

Next, the routine for the auxiliary-light AF mode is explained. The program enters the auxiliary-light AF mode by the routine "LOWCON" (FIG. 13). When the above-mentioned conditions are completed, the program advances from steps #175 or #183 to "LLLED", at step #225 and starts the flow of the auxiliary-light AF mode. First, at step #225 (FIG. 14), the flag indicating the auxiliary-light AF mode is set. At step #226, the signal from the terminal P13 to the terminal ST4 is made "HIGH". The flash circuit initiates the light emission of LED 48 for the auxiliary-light according to this signal. At step #227, the LL and LR signals are made "LOW" and LEDs (LEDL) and (LEDR) at both sides are lighted to notify that the program has entered the auxiliary-light AF mode. The LEDs remain lighted until the completion of the next focus detection calculation. Usually, the maximum lighting is 450 ms. This is equivalent to the sum of the time for waiting 200 ms at step #200, the calculation time for focus detection, and the time (200 ms) for the maximum integration time. When the object is considerably close and bright, the focus detection is completed below 450 ms. The purpose is to erase the indication during the lens drive. This indication is made at only one time that the program enters the auxiliary-light AF mode. On the other hand, LED 48 for auxiliary-light emits light two times. In the sequence of the auxiliary-light AF mode, LED 48 for the auxiliary-light emits light one time, thereby previously illuminating the object for the CCD image sensor FLM during 200 ms. The purpose for this is to raise the response ability of the CCD image sensor FLM. Then, CCD is integrated under the illumination of auxiliary-light in the mode of the maximum integration time of 200 ms. On the basis of the data, focus-detective calculation is performed, and the lens is driven. During this operation, focus detection is not performed. Then, when the lens stops, LED 48 for the auxiliary-light emits light for the second time. If the focus detection does not result is the detection of infocus zone after the time interval at the maximum 450 ms as in the same way as for the first time, the lens is again driven to adjust the focus. This is a basic movement of the lens.

Thus, it is necessary to distinguish the first-time illumination of LED 48 for auxiliary-light from the second time. To make this distinction, the first auxiliary light 1st flag is set up (the auxiliary light 1st flag shown in Table 5-2). This flag indicates the first illumination when "0" is carried, and it indicates the second illumination when "1" is carried. At step #228, "0" is applied to this flag. At step #229, the program waits 200 ms for the previous illumination time of the sensor. At step #230, the maximum integration time of the sensor is set so as to be in the mode of 200 ms. The auxiliary-light AF mode usually takes the integration time of 200 ms, and the flow usually loops to "CDINTA" in a manner similar to the AF mode operation.

From step #39 (FIG. 9), the flow enters and advances with the auxiliary-light being lighted, and at step #69 (FIG. 10), the auxiliary-light LED 48 is turned off. Thereafter, the focus is detected in the same way. When the flow comes to step #37 (FIG. 13), the program advances to flow "LSAVE" for the auxiliary-light AF mode at step 238 (FIG. 14). This flow starts from step #238.

At step #238, it is judged whether or not the focus detection under the auxiliary-light AF mode is carried out for the first time. When it is for the first time, the program advances to step #239. At this step, it is checked whether or not the calculation result of focus detection is low contrast. When it is low contrast, the program advances to "LLIGHT2" at step #189 to prohibit the second focus detection. Thereafter, the program advances from step #189 through step #190 (FIG. 13) to step #40 (FIG. 9). The program ends with the lens being inserted to the infinite focusing position. Since the lens is shifted toward the infinite focusing position with a further focus detection prohibited, no auxiliary light is emitted, and thus, it is not necessary to further follow the focus detection procedure. When it becomes brightened suddenly to increase the contrast, however, it is possible to detect the focus without the auxiliary-light by moving the lens from the shifted position. When the flow is not low contrast at step #239, the program advances to "NLOC1" at step #91 (FIG. 11) and enters the lens-driving flow for focus adjustment. In this case, the program starts from step #91 and then passes through step #102, and further, it passes through step #141 and begins to drive the lens at step #155 (FIG. 12). From step #158, the flow advances to "L2SAVE" (step #231 in FIG. 14) for the auxiliary-light AF mode.

At step #231 (FIG. 14), it is examined, based on the auxiliary light 1st flag, whether or not the auxiliary-light is emitted for the first time. When it is for the first time, the program advances to step #232. Here, the program waits until the lens is moved by an amount corresponding to the calculated count of focus detection. After the lens movement stops, the program advances to step #233 for the flow of the second emission of auxiliary-light. At step #233, when the auxiliary-light OK signal AFFL is "1" (OK), the second signal of auxiliary-light illumination is emitted at step #234 (that is, the signal at terminal ST4 is made "HIGH"). When the signal AFFL is "0", the second illumination is not emitted since the auxiliary-light emitter is switched off. Although in this embodiment, in this case, auxiliary AF mode is not released, it may be released.

At step #235, the auxiliary light 1st flag is set to indicate the second auxiliary-light AF mode. In the same way as for the first time, the program waits 200 ms at step #229, passes through step #230, and advances to "CDINTA" at step #39. At the second auxiliary-light AF mode, the program passes through the same flow, and further, it passes through step #39 (FIG. 9) and steps #44 and #68 (FIG. 10). In the case of the auxiliary-light AF mode, at step #87 (FIG. 11), the flow is divided and advances to "LSAVE" at step #238 (FIG. 14). In this case, the program advances to step #240 owing to the second auxiliary light AF mode. At step #240, it is examined whether or not the object is low contrast. When it is low contrast, the program advances to step #211. Unlike the first time, the lens remains stopped at the intermediate position without being shifted. Then, the flicker indication of LEDs LEDL and LEDR at both sides is effected, and the program waits for interruption.

If the object is not low contrast, the program advances from step #240 to step #91 (FIG. 11), entering the lens drive flow. This flow continues until step #158 (FIG. 12), and then enters "L2SAVE" for the auxiliary-light AF mode. Since the procedure at step #231 is the second auxiliary-light AF mode, the program advances to step #236, and waits for the lens stop to in the same way as for the first AF mode. If the program is not in auxiliary light AF mode, thereafter the program focus detection for infocus confirmation. However, the program does not advance to focus detection for infocus confirmation because the emission of the auxiliary-light has been restricted to two times. (Since the emission of the auxiliary-light is restricted to two times in this embodiment, the following procedure is taken without confirmation. However, if the number of emission of auxiliary-light is not restricted, the emission of the auxiliary-light can be repeated until the infocus condition is confirmed.)

This procedure is to check the focus detection calculated value FERM when the lens stops. In other words, if the defocus amount is less than 1 mm at the initiation of the second lens drive, it is judged that the lens can be carried in the infocus zone without making sufficient infocus confirmation, in consideration of the ability to detect the focus. In this case, the program advances to "INFZ" at step #117 (FIG. 11), for the procedure after the infocus condition is obtained, for indicating the infocus condition. When FERM indicates that the defocus amount is more than 1 mm, it is assumed that the focus detection was in error because the results of the first and second focus detections differ so much. In this case, the program advances to step #211, and causes the flicker indication of LEDs LEDL and LEDR at both sides with the lens maintained at the present position. The above-mentioned procedures are the routine for auxiliary-light AF mode.

The light-emitting frequency of LED 48 for auxiliary-light is restricted to two time. The reason is as follows: The light-emitting more than two times results in a high consumption of power supply, whereas single light-emitting results in the erroneous focus detection and erroneous backlash. Thus, the restriction to two times is judged reasonable. When it is impossible to perform the second focus detection, the lens is not in the infinite focusing position. The reason is as follows: When the switch S1 of the circuit is opened (turned off) once and then closed (turned on) again, that is, when the auxiliary-light AF mode is tried twice, the possibility that the lens starts to move from the vicinity of the infocus position is higher, and also, the possibility that the lens is properly moved to the infocus zone is higher.

Figure 16:
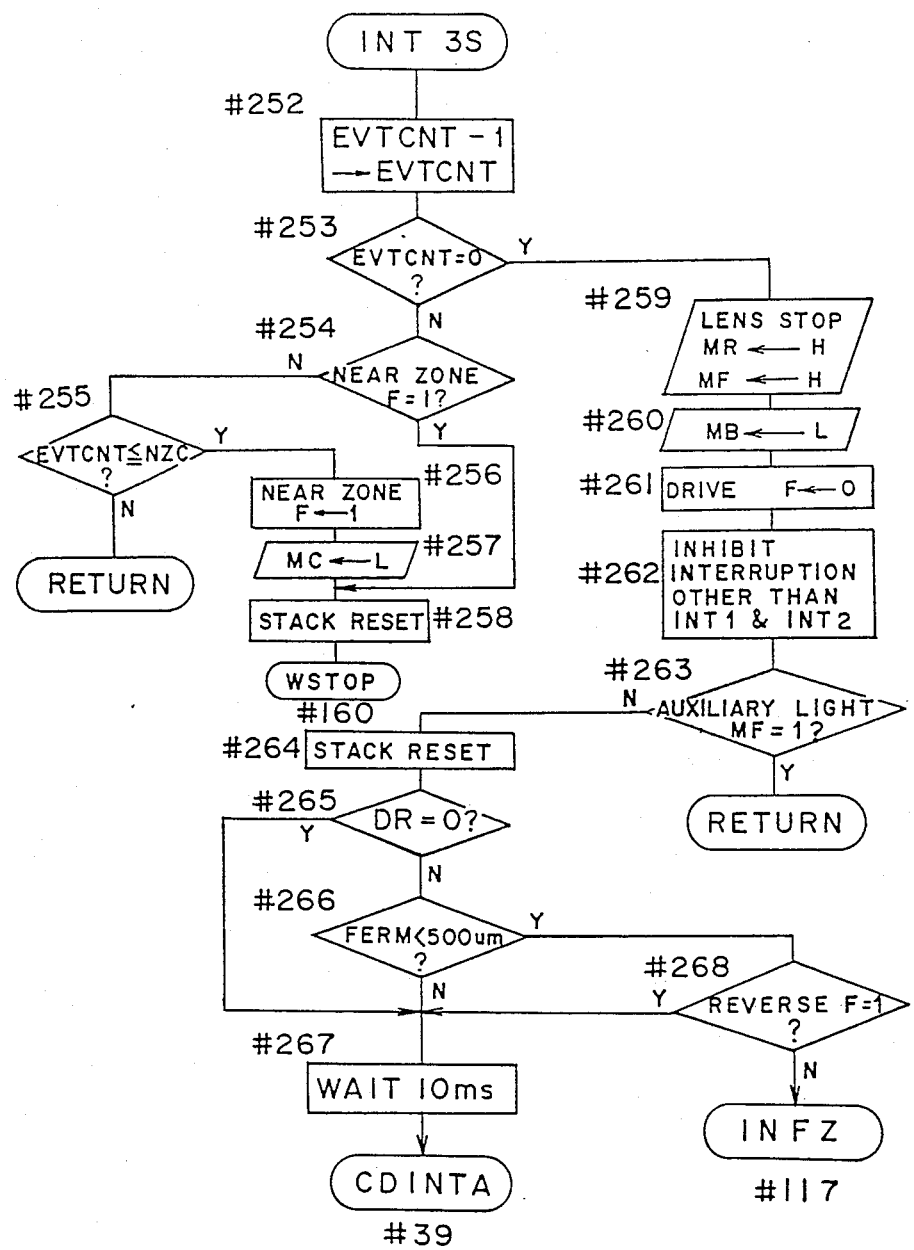

Next, "INT3S" as shown in FIG. 16, namely, event counter-interrupting flow, is explained. This flow controls lens-drive by using the pulse signal PS from the encoder ENC of the lens-driving motor MO1, which enters the interrupting terminal (INT3). The count value EVTCNT for driving lens is obtained by the focus detection calculation. By the interruption signal to terminal INT3, the lens-drive distance is always monitored, thereby controlling the speed of lens movement and the stop position of lens. First, the lens-drive count value EVTCNT is set to the event counter during lens-drive. Second, the lens-driving motor MO1 is energized. Thereupon, the lens starts to move, and pulse is emitted from the encoder ENC, thereby providing interruption, pulse to terminal INT3. Then, the flow "INT3S" starts from step #252.

When a pulse signal "1" is applied at step #252, the count value EVTCNT of the event counter is reduced by "1". Then, it is examined whether or not this count value EVTCNT has counted a predetermined value (i.e., "0"). When the value EVTCNT becomes "0", the lens is assumed to be at the infocus position, and the motor MO1 stops.

If the count value EVTCNT of event counter is not equal to "0", the program advances to step #254. Then, it is examined whether or not the lens is placed in the near zone according to the near zone flag. If the near zone flag is not "1", the program advances to step #255 to check whether or not the lens has entered the near zone by the present pulse. If the count value EVTCNT of event counter becomes less than the count value NZC of the near-zone counter at step #255, the lens is assumed to be, this time, in the near-zone. Then, the program advances to step #256. If the lens is out of the near-zone, the program returns from interrupting flow "INT3S" to the main flow. At step #256, on the other hand, a near zone flag is set because the lens has entered the near-zone for the first time. At step #257, the MC signal from the terminal PO3 is made "LOW", and the drive of the motor MO1 is switched into a low speed. At step #258, the program reset the stack-pointer of the interrupting flow and advances to "WSTOP" at step #160 (FIG. 12). Then, the program waits for the lens stop, while checking the termination of the lens to the end.

In other words, the interruption of "INT3S" starts while the program loops the flow of "WSTOP". When the interruption starts, the program repeats the flow from step #252 to step #254 and the flow at step #258. When the count value EVTCNT becomes "0", the program advances from this loop to step #259. When the lens is in the near-zone, the program advances to "WSTOP" at step #160. Then reason that the program does not return to the main flow is that, as mentioned above, the program does not detect the focus condition, while the lens is not moving at a constant speed. Thus, when the lens enter the near-zone, the speed of the lens movement is reduced. Thus, since the lens does not move at a constant speed, it is not so programmed as to detect the focus condition while the lens is moving in the near zone.

Next, at the time when the lens is moved by a distance determined by the count value EVTCNT of drive pulse, the program advances to step #259 because the count value EVTCNT becomes "0" according to the check effected at step #253. Then, the steps are taken as follows: the lens-driving motor MO1 is switched off; the brake is applied at step #260; the drive flag is cleared at step #261; the interruption of the event counter is prohibited at step #262; and the program advances to step #263. Then, at step #263 it is examined whether or not the program is in the auxiliary-light AF mode. If the program is in the auxiliary light AF mode, the program returns from the interruption of the event counter. The destination of this return is step #232 or step #236 (FIG. 14), as explained for the flow of the auxiliary-light AF mode. If the program is not in the auxiliary-light AF mode, at step #263, it resets the stack pointer at step #264, and the program goes to step #265.

The flow from this step judges whether to detect the focus condition in order to confirm the lens position in the infocus zone. First, after checking the DR signal sent from the controlling microcomputer MC2, it is examined whether the signal is in a single frame shorting mode or a sequence shooting mode. When the DR signal is "0", indicating the single frame shooting mode, the program waits 10 ms, at step #267, and enters the next focus detection loop after the lens, moving at a low speed, completely stops.

If it is confirmed in the next focus detection that the lens is stopped in the infocus zone, in other words, when the lens is detected as located in the infocus zone, at step #116 of the main flow (FIG. 11), the program advances to step #117, for displaying the infocus condition. If the lens stops at a position outside the infocus zone, the program repeats the same routine for driving lens, starting from step #120 (FIG. 11). This is the flow for confirmation the infocus condition. In the case of the sequence shooting mode, the program advances from step #265 to step #266 because the DR signal is "1". Here, the defocus amount FERM at the lens stopped position (when the driving is "0") is checked. If the value is above 500 micrometers, the program advances to step #267. In other words, under the sequence shooting mode, when the defocus amount before driving the lens is above 500 micrometers in under the infocus confirmation must be carried out. If the defocus amount FERM is less than 500 micrometers at step #266, the program advances to step #268 to check the setting of the reverse flag. When the reverse flag is set, it is assumed that backlash is corrected. Thus, the program advances to step #267 to confirm the infocus condition. When the reverse flag is not set at step #268, the program advances to the flow "INFZ" at step #117 for displaying the infocus indication.

The above procedure takes the advantage of the quick response. By the use of this method, the follow-up control of the object is improved while the object moves at a raised of the lens movement with respect to the moving object because the lens-driving speed is increased under the sequence shooting mode. By the above arrangement, even when automatic focus adjustments are performed with the defocus amount less than 500 micrometers and without correcting backlash the lens can be positively moved to the infocus zone with a favorable lineality, thereby requiring no confirmation of the infocus condition. Thus, the program can be immediately advanced to the step for displaying the infocus condition. In the case, other than this the program advances to confirm the infocus condition so as to improve the focus precision. If the ability to detect the focus condition is further improved and if the lens-driving system is complete, it is possible to regard the infocus confirmation as unnecessary. The above-mentioned is the sequence of automatic focus adjustment.

Figure 18A:
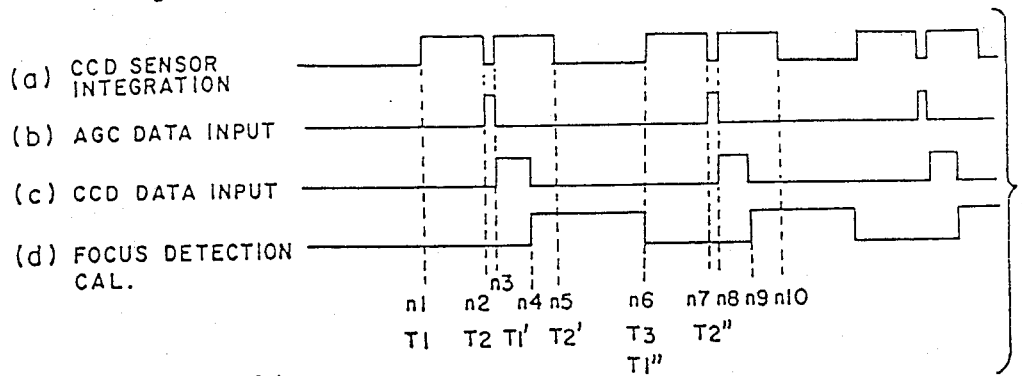
FIGS. 18a and 18b are time charts for showing the operation of renormalization integration.
Figure 18B:
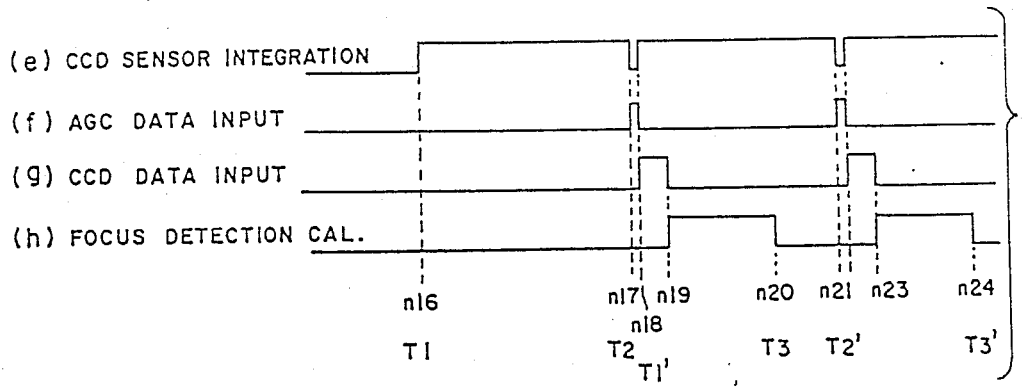
Figure 19:
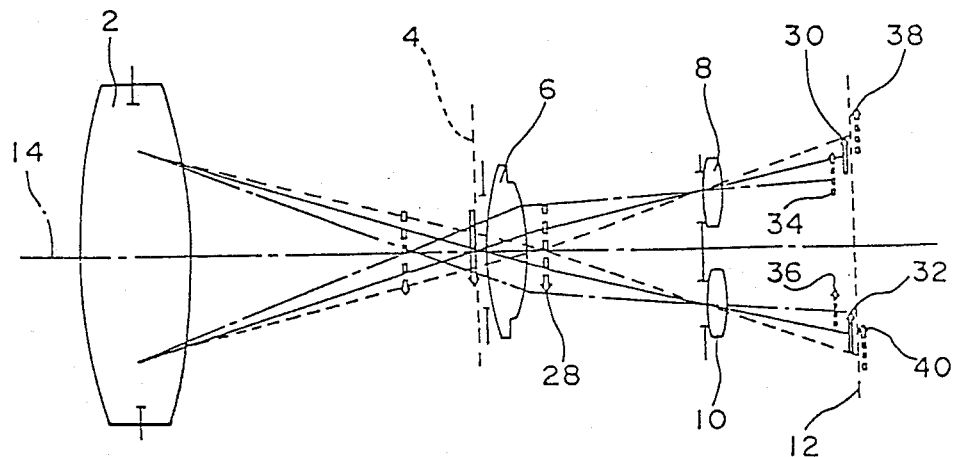
FIG. 19 is a prior art optical arrangement showing the principle of the focus detection.

Next, "renormalization integration" and correction of lens shift are explained in connection with the flow from step #40 to step #53 (FIG. 9) and the time charts shown in FIG. 18a and 18b. This is basically to shorten the time required for focus detection looping. FIG. 18a shows the case when the object is relatively bright and the integration time of the CCD image sensor is less than 60 ms. FIG. 18b shows the case when the object is so dark that the integration time is above 60 ms. The state called "normalization integration" is indicated in FIG. 18b.

When the object is bright, the value EVTCNT of the event counter produced at the time when the integration of the sensor is initiated i.e., at time n1 (FIG. 18a), is read and stored as a value T1. Further, the program stores a value T2 at time n2, i.e., when the integration completes. Then, immediately after the inputting the AGC data, the next integration starts at time n3. Since the times n2 and n3 are very close to each other, it is assumed that T1'=T2, therefore, the program will not read a value T1'. Simultaneously with initiation of the integration at time n3, the picture element data from the CCD image sensor are read in. Then, at time n4, the focus detection calculation starts. In the case of FIG. 18a, in which the object is bright, the second integration starts at time n3, and terminates at time n5 before the end of the focus detection calculation. Since the picture element data from the CCD image sensor are outputted immediately after the end of integration, it is impossible to hold the data until the end of the calculation.

If a microcomputer MC1 reads new data, the data under the present integration will be destroyed. Thus, the data of the second integration will not be used. However, if the next integration starts immediately after the end of the calculation at time n6, this integration time itself will be sufficient when the object is bright, further, resulting in a focus detection loop with a reasonable time period. In this case, the count value T2' at time n5 is disregarded. For a calculation of lens shift correction, the above-mentioned format can be used.

In other words, when Tx and Ty are defined as $Tx = T1 - T2$ and $Ty = T2 - T3$, the correction value $(Tz = Tx/2 + Ty)$ should be subtracted from the lens-drive count value DRCNT which was obtained through the calculation In the above formula, a value T3 is the event count value at the end of the calculation. The value DRCNT corrected at time n6 is set as the count value of a new event counter EVTCNT. At the beginning of the next integration, this count value is rendered as T1', and the same procedure is repeated.

Next, when the object is dark as shown in FIG. 18b, the event count value T1 at the beginning of the integration is stored at time n16. At time n17, the integration is ended, and value T2 is stored. Immediately after the AGC data is taken in, the next integration starts from time n18. After inputting the CCD data, the calculation of focus detection is initiated at time n19. At time n20, the calculation ends. After the value T3 is obtained, lens shift correction is performed in the same way as in the case of FIG. 18a. At the end of this integration, the second integration is not yet completed at time n20. If "renormalization integration" is used, new integration should start from time n20, and the program should wait for the time equivalent to the time length between times n16 and n17. However, since the integration is already initiated by "renormalization integration" at time n18 in the present embodiment, it is enough that the program waits for a time between times n21 and n22 until the end of integration. In other words, the total time is shortened by a time length between times n18 and n20. Thus, "renormalization integration" is effective when the integration time is longer than a time length between times n18 and n20. In the present embodiment, the integration time is fixed at 60 ms for the time length between times n18 and n20 and the maximum integration time for the time length between times n16 and n17 is fixed at 100 ms.

With respect to the lens shift correction in the case of FIG. 18b, it is impossible to use the same method as for the case of FIG. 18a. It is desirable to have the lens shift correction value at the end of the calculation, i.e., at time n24 obtained by using the following values: the count value T1' at integration starting time n18 (this value T1' is the value replaced by T2 because it can be considered that the count value T2 at the end of the previous integration is the same as the present count value T1'); a value T2' at the end of the integration; and a value T3' at the end of calculation. However, at previous calculation end time n20, the event count value EVTCNT for lens-drive is rewritten. In other words, since the values T1' and T2' have no relationship with each other, the formula in the expression for the correction calculation, $Tx = T1' - T2'$ is meaningless. The values T2' and T3' are converted into a new scale after the calculation result is obtained at time n20 and EVTCNT is set. Thus, it is necessary to convert T1' into a new scale.

The difference between the lens-drive count value DRCNT obtained at time n20 and the value T3 received at time n20 in the previous scale will be the correction value for conversion to a new scale. If the system operates ideally, the relationship DRCNT=T3 can be obtained. However, because of the various factors given below the relationship is always DRCNT≠T3. The factor are the sensor integration is performed while the lens moves with respect to the object; the conversion between the defocus amount and the lens-drive count value is quantized due to the small coefficient value; and the defocus value obtained by focus detection calculation is also made somewhat small for the purpose of preventing excessive lens driving, and not to include an error caused by the backlash correction effected when the lens returns by an over passed length. Thus, DRCNT-T3 becomes the correction value between the new scale and the old scale. When the correction is performed whole replacing T2 with T1', the new scale T1' is obtained upon correction, thereby enabling the lens shift correction at time n24. In the embodiment illustrated in the flow chart, a value (DRCNT−T3)+T2 is replaced with T1'. Then, the correction value Tz is obtained by $Tx = (T1' - T2')$.

In another embodiment, the correction value Tz can be obtained by the following equation: $Tx = (T2 - T3) + (DRCNT - T2')$. However, is this case, it is not necessary to perform the correction of (DRCNT−T3), but instead, it is necessary to make another routine in the case of renormalization integration at the time of lens shift correction; and prepare an equation $Tx = T1' - T2'$ in place of the above-mentioned equation Further, it is necessary to prepare another memory least T2 should not be erased by T2'.

Next, the program starts at step #66 (FIG. 10) according to "renormalization" in the flow chart. When the program checks the drive flag at step #65 and determines the lens as being driven, it starts the next integration, at step #66, irrespective of the state of "renormalization integration", and then it sets a renormalization integration flag (renormalization integration F in Table 5-1) at step #67. The top of the focus detection loop at the time that "renormalization integration" is necessary is defined as "CDINT", at step #40 (FIG. 9).

Now, the description is directed to the case when the condition shown in FIG. 18b is present. At step #40, the integration mode is set so as to enable the detection of the integration complete signal NB4. At step #42, the setting of the renormalization integration flag is checked. When the flag is not set, indicating that the mode is not the renormalization integration mode, the program advances to step #44. When the flag is set, the program advances to #43, at which the integration complete signal NB4 is examined to check the end of the integration. When the integration is not ended, as seen at time n20 of FIG. 18b, the program advances to "TINTC" at step #49. Thus, the flow from "TINTC" is for condition under the renormalization state, and "CDINTS" from step #44 is for the condition under the non-renormalization. At step #49, 1-cut shot flag is set as "1". At step #50, the AFE signal is made "LOW". As mentioned above, the value T1' is corrected for the lens shift correction at step #51. At step #53, the maximum remaining time length 40 ms for the integration is set, and the program advances to step #55. Thereafter, the program goes to the main routine. "Renormalization integration" functions so as to shorten the focus detection time. This ends the explanation of the flow of the AF microcomputer MC1.

As detailed above, the present invention has the following features: the focus adjustment of the camera lens is performed by a calculation based on a storage charge which is transmitted by a charge storage type image sensor receiving light from an object; it is examined whether or not the brightness is above the described degree on the automatic focus adjustment device which focuses the camera lens according to the calculation; when the brightness is determined as higher than the described degree, storage of the image sensor charge is performed even during focusing; the camera lens is focused according to the newly calculated condition of focus adjustment, and further, the image sensor is stored only during the stoppage of the camera lens when the brightness is determined as lower than the described degree; after the conclusion of the calculation, the control step is given by performing focusing according to the calculated condition of focus adjustment.

When the brightness of the object is higher than the described degree, focus is detected during lens-moving and while storing the image sensor charge. Thus, it is possible to perform rapid automatic focus adjustment. Since the flow of the image on the image sensor is thin, the precision of focus detection is favorable. When the brightness of the object is lower than the described degree (dark), the image sensor charge is stored after stopping the lens. Thus, favorable focus detection precision is favorable: more specifically, according to the present invention, when an object is bright the follow-up of the automatic focus adjustment on a moving object is favorable together with smooth camera movement Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An automatic focusing apparatus for automatically moving an objective lens comprising:
    driving means for moving said objective lens along an optical axis to effecting the focusing;
    end judging means for judging whether or not said objective lens is located at the end of a movable distance range; and
    control means for controlling said objective lens such that:
        when said end judging means judges that said objective lens is moved to the end for the first time, the objective lens is temporarily stopped and then, the objective lens is again moved by said driving means; and
        when said end judging means judges that said objective lens is moved to the end for the second time, the objective lens is stopped again.

2. An automatic focus adjusting apparatus for automatically adjusting a focus condition of an objective lens, comprising:
    lens shifting means for shifting the objective lens along the optical axis thereof in order to adjust the focus condition of the objective lens;
    monitoring means for monitoring the shifting of the objective lens by the lens shifting means;
    detecting means for detecting, in accordance with the result of the monitoring means, a state of no shifting of the objective lens during the operation of the lens shifting means, and
    determining means for determining that the objective lens reaches one end of its shiftable range when the detecting means detects a plural number of no shifting states of the objective lens.

* * * * *